US012662785B2

(12) United States Patent
Thatos et al.

(10) Patent No.: US 12,662,785 B2
(45) Date of Patent: **\*Jun. 23, 2026**

(54) SECURABLE DEVICE HAVING A CORKSCREW

(71) Applicant: Coastal Protection Holdings Corporation, Manhasset, NY (US)

(72) Inventors: Nicholas Thatos, Manhasset, NY (US); George Thatos, Manhasset, NY (US)

(73) Assignee: Coastal Protection Holdings Corporation, Manhasset, NY (US)

( \* ) Notice: Subject to any disclaimer, the term of this patent is extended or adjusted under 35 U.S.C. 154(b) by 70 days.

This patent is subject to a terminal disclaimer.

(21) Appl. No.: 18/740,472

(22) Filed: Jun. 11, 2024

(65) Prior Publication Data

US 2024/0352693 A1 Oct. 24, 2024

Related U.S. Application Data

(63) Continuation-in-part of application No. 17/886,539, filed on Aug. 12, 2022, now Pat. No. 12,146,284.

(60) Provisional application No. 63/307,220, filed on Feb. 7, 2022, provisional application No. 63/232,759, filed on Aug. 13, 2021.

(51) Int. Cl.
| | |
|---|---|
| *E02B 3/04* | (2006.01) |
| *A01K 61/73* | (2017.01) |
| *A01K 61/54* | (2017.01) |

(52) U.S. Cl.
CPC .............. *E02B 3/046* (2013.01); *A01K 61/73* (2017.01); *A01K 61/54* (2017.01)

(58) Field of Classification Search
CPC ............... E02B 3/04; E02B 3/06; E02B 3/062
See application file for complete search history.

(56) References Cited

U.S. PATENT DOCUMENTS

| | | | |
|---|---|---|---|
| 260,016 A | 6/1882 | Franklin | |
| 2,191,924 A | 2/1940 | Humphrey | |
| 2,319,170 A | 5/1943 | Royal | |
| 2,474,786 A | 6/1949 | Humphrey | |
| 2,731,799 A | 1/1956 | Lange et al. | |
| 3,191,202 A | 6/1965 | Handler | |
| 3,455,278 A \* | 7/1969 | Hunt ..................... | A01K 61/54 |
| | | | 119/238 |
| 3,726,096 A | 4/1973 | Bahre | |
| 3,846,990 A | 11/1974 | Bowley | |

(Continued)

FOREIGN PATENT DOCUMENTS

| | | |
|---|---|---|
| CN | 109440722 A | 3/2019 |
| EP | 0255495 A1 | 2/1988 |

(Continued)

OTHER PUBLICATIONS

International Search Report and Written Opinion mailed Aug. 5, 2025, in connection with International Patent Application No. PCT/US2025/033084, filed Jun. 10, 2025, 10 pgs.

(Continued)

*Primary Examiner* — Benjamin F Fiorello
(74) *Attorney, Agent, or Firm* — Chiesa Shahinian & Giantomasi PC

(57) ABSTRACT

A device comprising a corkscrew; and a protrusion comprising a sleeve and one or more protrusion cells. Methods of using the device are also disclosed.

19 Claims, 65 Drawing Sheets

(56) References Cited

U.S. PATENT DOCUMENTS

| | | | | |
|---|---|---|---|---|
| 4,006,598 | A | | 2/1977 | Hulsemann |
| 4,130,994 | A | | 12/1978 | van Moss, Jr. |
| 4,280,238 | A | | 7/1981 | van Heijst |
| 4,539,078 | A | | 9/1985 | Wingfield |
| 4,702,047 | A | * | 10/1987 | Stokes .................... E02D 5/801 |
| | | | | 114/294 |
| 4,727,672 | A | | 3/1988 | Hill et al. |
| 4,767,235 | A | | 8/1988 | Caradonna et al. |
| 4,894,873 | A | | 1/1990 | Kiefer et al. |
| 4,950,104 | A | * | 8/1990 | Streichenberger ..... A01K 61/54 |
| | | | | 405/24 |
| 5,526,774 | A | | 6/1996 | Swindall et al. |
| 5,700,108 | A | | 12/1997 | Bishop et al. |
| 6,056,476 | A | * | 5/2000 | Streichenberger ..... A01H 13/00 |
| | | | | 405/23 |
| 6,464,429 | B2 | | 10/2002 | Moore |
| 6,666,620 | B2 | | 12/2003 | Yang |
| 7,828,493 | B1 | | 11/2010 | Brignac |
| 8,511,936 | B2 | | 8/2013 | van de Riet et al. |
| 8,585,318 | B1 | | 11/2013 | Walker |
| 8,640,651 | B2 | | 2/2014 | Ewald |
| 8,814,469 | B2 | | 8/2014 | McCormick et al. |
| 9,560,838 | B1 | | 2/2017 | King et al. |
| 9,624,636 | B2 | | 4/2017 | Andrus et al. |
| 9,681,645 | B2 | | 6/2017 | Marsden |
| 9,992,988 | B2 | | 6/2018 | Davenport et al. |
| 10,975,537 | B1 | | 4/2021 | Escandell |
| 2002/0110422 | A1 | | 8/2002 | Hulsemann |
| 2004/0168649 | A1 | | 9/2004 | Harper et al. |
| 2005/0232700 | A1 | | 10/2005 | Timmerman |
| 2011/0299927 | A1 | | 12/2011 | McCormick et al. |
| 2013/0118413 | A1 | | 5/2013 | Bennett |
| 2014/0161532 | A1 | | 6/2014 | McCormick et al. |
| 2015/0063910 | A1 | | 3/2015 | Meltsov et al. |
| 2016/0115664 | A1 | | 4/2016 | Ru |
| 2022/0396925 | A1 | * | 12/2022 | Ascencio Ascencio .................... |
| | | | | E02B 3/046 |
| 2023/0051607 | A1 | | 2/2023 | Thatos et al. |

FOREIGN PATENT DOCUMENTS

| | | | |
|---|---|---|---|
| KR | 10-1668095 | B1 | 10/2016 |
| WO | 0049859 | A1 | 8/2000 |

OTHER PUBLICATIONS

Extended European Search Report mailed May 20, 2025, in connection with European Patent Application No. 22856643.6, 8 pgs.
Office Action mailed Oct. 28, 2025 in connection with Taiwan Patent Application No. 111130457, 9 pgs. (including translation).
Office Action mailed Mar. 2, 2026 in connection with U.S. Appl. No. 18/934,294, filed Nov. 1, 2024, 37 pgs.

* cited by examiner

134

126

130

132

128

1200

1265

1267

1273

1220

1228

1269

1256

1271

1300

1320

1328

1324

1302

1443

1445

1400

1441

1420

1428

1402

1400'

1448

1445'

1446

1428'

1443'

1452

1458

1400'

1444

1446

1443'

1466'

1458

1400'

1446

1443'

1466''   1466''

1462

1400'

1400'

1464

1400'

1464

1400'

1462

1400'

1728R1

1705

1730

1820

1828

1856

1800

SECURABLE DEVICE HAVING A CORKSCREW

CROSS REFERENCE TO RELATED APPLICATION

This application is a Continuation-in-Part of prior-filed U.S. Utility application Ser. No. 17/886,539, filed on Aug. 12, 2022, which claims the benefit of priority from: (i) U.S. Provisional Application No. 63/232,759 filed on Aug. 13, 2021; and (ii) U.S. Provisional Application No. 63/307,220 filed on Feb. 7, 2022; the disclosures of all of which are incorporated herein by reference in their entirety.

BACKGROUND OF THE DISCLOSURE

Erosion caused by hydraulic scouring of material and sediments has significant effects on hard structures, such as bridges, underwater supports, pipeline, cables, as well as ecological areas such as marsh, wetlands, and/or swamp areas, deltas, beaches, shores, barrier islands, fluvial environments, shore communities and low-lying cities.

Further, shorelines are being stripped and/or eroded away by increasingly powerful storm surges, leading to impacts on the quality of life and economic activity of shore communities dependent on their beach economy. Vulnerable communities experience greater frequency of flood disasters and sea water penetration due to shore and dune loss.

Increased storm surge flooding has resulted in greater infrastructure damage and loss of life.

Further, valuable wetland habitats are being degraded by edge-erosion of cord grasses, marsh grasses and other plant species, leading to habitat loss and economic loss due to collapse of fisheries both commercial and recreational.

Typically, rigid structures are used to guard against and/or reduce the amount of scouring, but these rigid structures have many drawbacks, including their overall ineffectiveness, tendency to have unintended consequences of promoting or redirecting scouring elsewhere, disruption of ecosystems including the blocking of species movement, and their weight makes transport and installation/removal difficult. These traditional "hard" beach erosion controls, such as jetties, groins, seawalls, breakwaters etc. are ineffective and have fallen out of favor.

Sand replacement, referred to by the industry as "beach nourishment", is a current response to beach sand loss, but this strategy has many negative drawbacks including that nourishment is (a) expensive, (b) causes beach closings as beaches are unavailable to be used by the public during re-sanding and with it economic loss; (c) appropriate quality replacement sand is getting harder and harder to source; (d) replacement sand particles are of different size, shape, composition, or color from existing naturally accrued sand, leading to negative ecological consequences; (e) added sand is less stable than naturally accrued sand so it erodes at accelerated rates, resulting in continuous need to re-sand; and (f) beach nourishment off-shore sand dredging destroys sea creatures at the dredging sites, and destroys shore creatures where and when the sands is deployed. This negatively and drastically alters beach ecology, reefs, and off-shore habitat, and commercial and recreational fishing.

What is desired is a device that overcomes these drawbacks and is easier to transport, install, reposition and/or remove with minimal tools and costs. Embodiments of the present disclosure provide devices and methods that address the above needs.

Further, what is desired is protection from storm surge penetration into low-lying cities, communities and vulnerable areas, which needs to be suppressed to limit damages to infrastructure and prevent loss of life. The devices of the present disclosure can be utilized to absorb and disrupt wave energy, acting as a limiting force on the penetrating waves. The devices of the present disclosure can be installed in multiple ways, including torque driving into sediments layers, bolting into hard substrates, screwing into plates, welding, insertion into sleeves, attached to temporary structures etc. to create a flexible limiting barrier to storm surge and wave penetration.

Further, what is desired are devices and methods to mitigate edge-erosion of wetlands and shorelines.

Further, what is desired are devices and methods to protect vulnerable seedling plantings during thin-layer placement planting projects. Devices and methods of this disclosure can include various streamers and/or predator decoys to discourage grazing of new seedling plantings.

Further what is desired are devices and methods to protect sediment that has been added to shorelines, during beach nourishment, until it can substantially stabilize through compaction by natural processes.

Further, what is desired are devices and methods to accumulate and hold sediment, and to release the sediment by a positional change at a higher, or pre-determined water flow rate to increase and/or influence sediment loads at sediment diversion projects.

Further what are desired are devices and methods to accumulate and hold sediment, in a determined area, and to release the sediment by a positional change at a higher, or pre-faster water flow rate to allow sediments to be swept pass an area meant to be remain clear of sediments, such as a harbor, dock or shipping lanes.

Further what is desired are methods and devices to prevent sediment scour and/or accumulate sediments on seabed, river, lake or ocean floor.

Further, what is desired are devices and methods that can influence hydraulic directional flow, such as by instigating unequal water flow pressure. Devices and methods can cause unequal water flow pressure, thereby causing current to flow to areas of lesser pressure or resistance, producing mixing of water columns.

Further what is desired are devices and methods to trap, hold and accumulate wind-blown sand or sediment to promote creation of dunes, or mounds, where desired. These methods and devices can be of varying heights, and can form substantially rounded mound-like structures of varying shapes and sizes, and be deployed alone or in arrays to produce desired lengths and/or contours and formations.

Further what is desired are devices and methods to protect unstable sand, newly applied or otherwise, from wind erosion.

Further what are desired are devices that can accumulate wind-blown sand to form dunes. Once sediments have been accumulated, these devices can be repositioned and/or adjusted upwards or sideways by un-torquing, which in turn, allows new sediments to additionally be accrued, leading to nuanced control of height and shape of dunes.

Further what is desired are devices and methods to trap, hold and accumulate water-borne sediment flowing into basins for the purposes of wetland, splay marsh or land creation.

Further what is desired are devices that can be deployed in small or large numbers, as an absorptive breakwater field, to act in a similar manner as an "artificial wetland" to reduce storm surge by hydrodynamic energy absorption.

Further what is desired is an easily deployable and re-deployable device that creates niches, cubbies or pockets, that can function as artificial reef-like habitat providing nursery habitat, predator refuge, etc for nektonic and stationary species.

Further what is desired is a device that can reduce turbidity in large bodies of water by capturing sediment run-off from creeks, streams and rivers flowing into these larger bodies of water. Increased turbidity due to increased water-borne sediments entering the ocean, seas, sounds etc. has negative effects on flora and fauna.

Further what is desired are devices that are relatively easily installed and removed, which could function as an attractive medium and habitat for wild oyster pediveliger larvae to attach to. These devices could be driven into estuarine and marine sediments in waters where wild oyster free-swimming larvae are located and relatively plentiful. Once oyster larvae attach to this oyster larvae accumulation/ habitat device, the device can remain in place until the oyster spat is well established on the protrusions, and then the entire device be removed and relocated to another place where it can be re-driven into the environment. This second location can be in an area where oyster presence and/or oyster reefs are desired for commercial oyster production, water filtering, cleaning, turbidity reduction, remediation of pollution, creation of an oyster-based ecosystem, seeding of new wild oyster populations when the collected oysters spawn, and/or wave and surge mitigation purposes.

Further, what is desired are devices that contain cubbies, niches and/or pockets, that can be relatively easily and securely attached to a loose-sediment-morphology cliff face to hold naturally accrued sediment or be manually filled with a sediment and/or plant growing medium. The structure of the device can provide structural stabilization to allow vegetative growth on this sediment medium, which in turn flora would send root systems into the existing cliff face, acting to lock and/or bind the existing sediment matrix in a way to mitigate and/or prevent erosion, landslip and/or landslides. After vegetation stabilizes, the devices could be removed and reused to secure another area. Or these devices can be fabricated from bioplastics, biodegradable plastics, mycelium plastics, or any other degradable material allowing the frame structure to decompose while the coil can be reused at new locations. Multiple devices could be driven into the cliff escarpment, forming a lattice of cubbies. The completed installation would be slurry hydroseeded. Sprouted flora would send root systems into the loose sediment, binding the matrix.

Further what is desired are relatively light-weight and portable breakwater devices that can be relatively easily installed, removed and/or relocated. Traditional breakwaters are immobile rock, stones, concrete or similar heavy material designed to withstand the force of waves, while influencing the wave trajectory. The disclosed devices can be substantially hollow and can be composed of any suitable material that contains holes and so the internal cavity can at least partially fill with water. The device can include at least one vertical tunnel-hole which allows at least one corkscrew device to pass through the device. A flange on the top of the coil can be larger than the tunnel-hole diameter, thus maintaining the configuration of the corkscrew device and the breakwater device. A torqueable head can be attached to the flange allowing the coil to be torqued and driven into the bed of the body of water for installation, so that the breakwater device can remain substantially fixed over time.

Further what is desired is a device with one or more horizontal shafts, which can move vertically on another shaft, so that the one or more horizontal shafts can remain on a surface of the water the device is installed in as the water height changes. These one or more horizontal shafts can reduce wave energy and/or current energy of the water the device is installed in.

Further what are desired are replacement protrusions, that are removable from a shaft, and can be replaced with other replacement protrusions when a first replacement protrusion, or an originally installed protrusion is worn down, and/or breaks, and/or is not functioning as desired due to interaction with the environment.

These replacement protrusions can be formed of any suitable material, such as a woven material that is substantially flexible.

Further what is desired are floating platforms containing and/or coated with a biota attractant material such as a calcium comprising material, a carbonate comprising material or a calcium carbonate comprising material. These floating platforms can be anchored to the bed of a body of water, and if two or more floating platforms are included, they can be connected to each other. The floating platforms can be buoyant so that they are floating within the water column, affecting wave energy as it passes through the water column. These floating reefs can provide platforms for shellfish such as mussels and oysters, which in turn would provide sustenance farming, or food for fish and other species, re-establishing natural species balance.

Further what is desired is a device that includes a current generation mechanism, such as triboelectrical devices (TENGS) which can generate electric power through kinetic energy influence from the wind and/or water moving a portion of the device.

Further what is desired are devices to attach to bridge foundations, fluvial or marine structural footings, turbine and drilling platforms, etc. to mitigate hydrodynamic scouring. These devices would absorb hydrodynamic energy by flexing, producing friction, creating chaotic water currents, and disruption of water flow.

Further what are desired are devices that can be deployed by a ship or barge to prevent hydrodynamic scouring that leads to unearthing of pipelines & cables beneath the seabed. Absorbent protrusions act to accumulate sediments and mitigate erosion. Deployed by ship or barge, these devices, with pointed bottoms and stabilizing flanges, sink to the seafloor and passively embeds to mitigate scour unearthing and protect against rupturing of these conduits.

SUMMARY OF THE DISCLOSURE

The present disclosure is directed to a device comprising a corkscrew; a substantially flexible, or non-flexible, shaft operably attached to the corkscrew at a first end of the shaft; and one or more flexible, or non-flexible, protrusions extending from the shaft between the first end of the shaft and a second end of the shaft.

The methods and devices disclosed herein can be implemented and be operational for many different uses and outcomes. In this section a discussion of some of the possible impacts are discussed.

Modification and control of hydrodynamic water flow:

Devices of the disclosure can produce hydraulic modulation.

1. Devices of the disclosure can be installed into or onto sand, mud, soil, riverbed, riverbank, beach, shoreline, sea floor, or other ground substrates.
   i. Devices of the disclosure can be driven into substrates by applying torque (such as to a top bolt cap), which transmits torque through the shaft of the device to a coil with a pointed bottom tip. The twisting of the device causes the coil to enter the substrate in a corkscrew manner, which can secure the device.

ii. Devices of the disclosure can also be installed to substrates by various types of mechanical attachment to pilings, columns, bases, footings, foundations, rock formations, breakwaters, concrete embankments, or other types of structural supports, themselves secured to the intended substrate by other typical means.

iii. Devices of the disclosure can be attached to a weighted base, deployed at the water's surface, and sunk to the river or lake bed, ocean bed or sea floor, and held in place by the weighted base and stabilizing flange 1. In some embodiments flexible dynamic members are attached to a weighted and pointed base. These can be deployed onto a desired area by dropping off of a ship or barge into the water.

2. The weighted pointed assembly would sink to the water bed or ocean floor, anchor itself and function accordingly.

3. The pointed shape allows penetration into the sediment, while the flange acts to stabilize the assembly.

4. Once deployed these devices would function to prevent scour of anchored structural supports including drilling platforms, and wind turbine towers. Also to prevent unearthing of buried infrastructure, pipe or cables, by both accumulating and by mitigating sediment from being eroded away.

2. Devices of the disclosure function to influence and modulate water flow and can cause head-loss, energy-absorption, disruption, deflection, deceleration, impediment, blocking, wave reduction, turbulence, chaotic current dynamics, current modulation and/or friction loss.

3. Devices of the disclosure can be deployed in substantial enough numbers to create arrays or groupings in which the effect of an individual device is amplified, multiplied and/or synergistically increased by the entire group.

4. Devices of this disclosure can function in a manner of an artificial wetland, absorbing wave and storm surge energy.

Modification and control of water waves, storm surge, tidal forces and currents:

1. Slowing or disruptions of sediment-carrying currents leads to sediment dropping out of suspension. Sediment dropping out of water-suspension results in depositional building and accumulation of sediment layers.

i. Devices of the disclosure can accumulate sediments to increase elevations of marsh or shore habitat.

ii. Devices of the disclosure can accumulate sediments to capture sand at beach shorelines.

iii. Devices of the disclosure can accumulate sediment and prevent scour unearthing of underwater buried pipeline and cables and/or undermining of underwater structural supports.

iv. Devices of the disclosure can accumulate, hold and subsequently release sediment for sediment diversion projects.

v. Devices of the disclosure can directionally modulate water current flow.

2. Decreasing of wave energy leads to decreased beach and sediment scour.

Modification and control of fluvial processes:

1. Devices of the disclosure can function to accumulate, trap, capture, and/or secure sediment deposition during a slow fluvial (low water level) water flow rate.

i. Devices of the disclosure can be passively oriented in an upright vertical position during slow and low water flow rates. During this upright positional phase, perforated baffles trap, accumulate and hold sediment.

1. Vertical position promotes sedimentation, and traps and holds sediment.

2. Devices of the disclosure can function to release secured sediment at a fast fluvial (high water level) flow rate, by passively tipping to a horizontal position, due to increased water pressure on the baffles. Release point can be regulated by modifying barrel/antennae spring buckling threshold.

i. Devices of the disclosure can tilt during high and fast fluvial flow.

ii. Increased water flow causes lateral pressure on the baffles, buckling the spring and causing the tilting of the device. This produces a change of orientation from vertical to horizontal.

iii. Devices of the disclosure no longer accumulates or holds sediment while oriented in a horizontal position. Accumulated sediment is now free to be swept away by the high and fast fluvial flow.

1. Horizontal position occurs when river water level is high and subsequent current flow is fast.

2. Horizontal position releases stored sediment into the fast current

3. Devices of the disclosure can function to control fluvial processes to allow engineering control of sediment deposition and movement. This control is advantageous for sediment diversion projects.

i. Devices of the disclosure can collect and store sediment when low/slow-river flow disqualifies the opening of diversion floodgates, and releases sediment when high/fast-river flow results specifies an opening of floodgates to allow sediments to be swept inside.

ii. This results in an increased net-gain of sediment load available to flow into floodgates and reach intended flood basins with land-building sediment.

4. Devices of the disclosure can be deployed to capture and hold fluvial sediments upstream from an area desired to be free from sediment deposition, while river flow is low/slow. Devices would tip to horizontal position and release captured sediment when river flow is high/fast/strong enough to sweep sediment past area desired to be free from depositional sediment buildup.

i. This function could be utilized to help keep downstream shipping channels free from sediment accumulation and decrease the need for dredging.

5. Devices of the disclosure can function to promote mixing of fluvial water columns and/or influence water currents by redirection of existing water flow whether upward, downward or side-to-side.

i. Device produces variations in pressure to influence the direction of water flow.

ii. Device can direct water flow upward or downward to control the mixing of water columns and allow influence regarding water column turbidity, salinity, biota, oxygen level, pathogen-viability, contamination, concentration of total and dissolved solids, water flow speed, etc.

1. Ability to control mixing of fluvial water columns allow nuanced engineering control of restoration, remediation and/or sediment diversion projects iii. Device function that affects upward or downward current flow can promote sediment deposition or promote sediment evacuation.

1. Device can strongly direct fluvial current flow downward to cause sediment evacuation and removal by river currents.

2. Device can strongly direct evacuated fluvial sediment flow upward to cause sediment removal transport by river currents.

3. Device can direct fluvial flow downward to influence deposition in a prescribed area.

Prevention of sediment scour and/or accumulate sediments on water bed or floor:

1. Devices of the disclosure can have fins that have a horizontal, or partial horizontal plane to the current flow. The horizontal plane acts to create a wobble effect as minute fluctuations in the currents cause the fin to rise and fall rapidly. Points of resonance can be created which would further increase the movement of these fins. The vertical movement of the fins further absorb energy and create eddies in the current stream, disrupting the steady flow. This disruption decreases structural scour capabilities.

Influence of hydraulic directional flow by instigating unequal water flow pressure:

1. Devices of the disclosure can have finds with unequal dimensional width. The fins are arranged to create a gradient from small to large, or large to small.

2. Causing unequal water flow pressure causes current to flow to area of lesser pressure or resistance, producing mixing of water columns 3. Mixing of water columns 4. Fins can be designed to form one or several levels of cones.

5. Water flow across the diagonal plane of a cone causes directional alteration.

The disclosure can also be directed to a method of installing a device comprising the steps of: contacting an upper surface of a substrate with a first end of the device, wherein the device comprises: a corkscrew; a substantially flexible shaft operably attached to the corkscrew at a first end of the shaft; and one or more protrusions extending from the shaft between the first end of the shaft and a second end of the shaft; and applying a torque to the corkscrew.

BRIEF DESCRIPTION OF THE DRAWINGS

The present disclosure will be better understood by reference to the following drawings, which are provided as illustrative of certain embodiments of the subject application, and not meant to limit the scope of the present disclosure.

DETAILED DESCRIPTION OF THE DISCLOSURE

Figure 1:
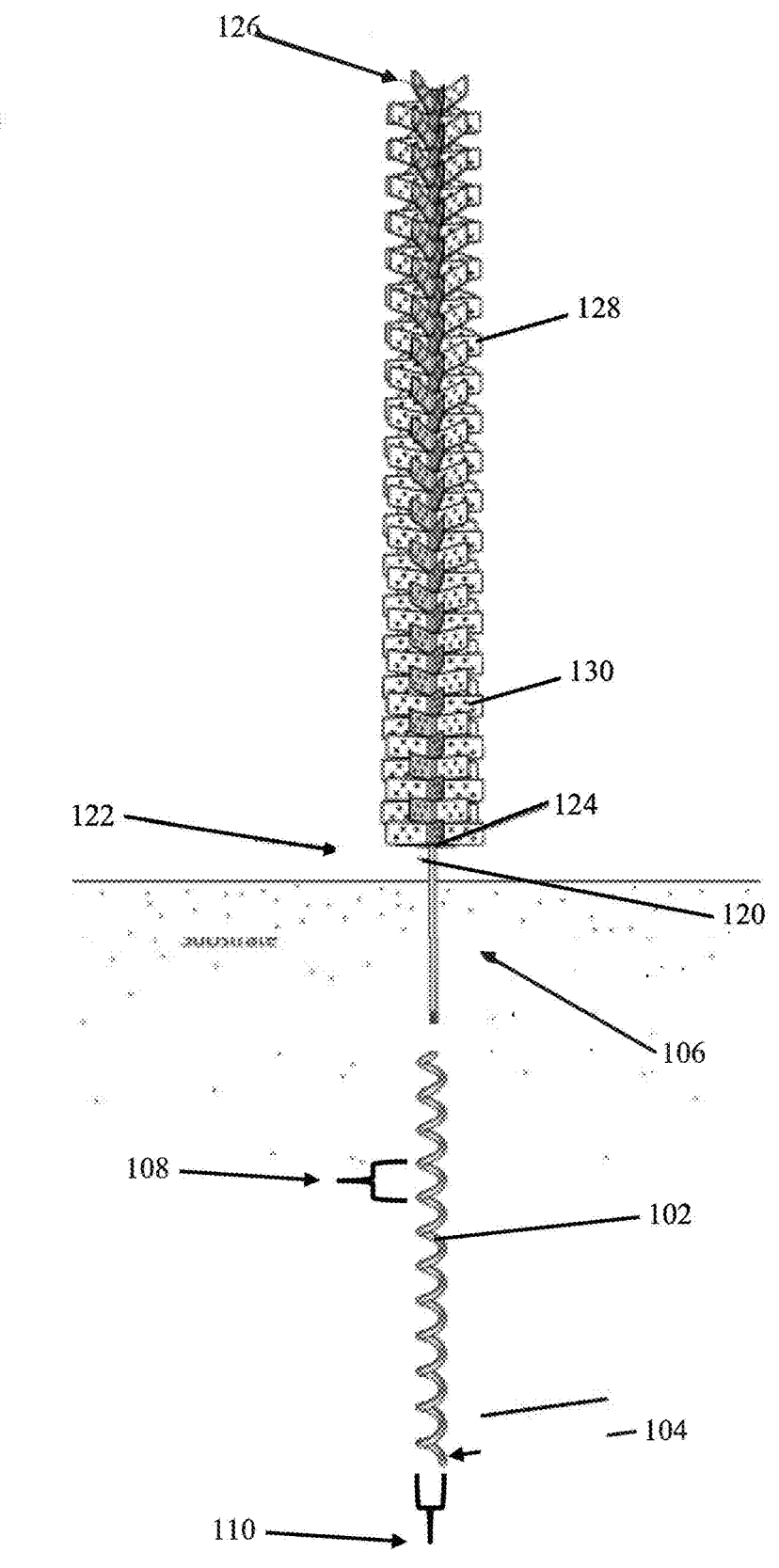
FIG. 1 is a plan view of one embodiment of the device of the present disclosure.

In the discussion and claims herein, the term "about" indicates that the value listed may be somewhat altered, as long as the alteration does not result in nonconformance of the process or device. For example, for some elements the term "about" can refer to a variation of +0.1%, for other elements, the term "about" can refer to a variation of +1% or +10%, or any point therein.

As used herein, the term "substantially", or "substantial", is a broad term and is used in its ordinary sense, including, without limitation, being largely but not necessarily wholly that which is specified, which is equally applicable when used in a negative connotation to refer to the complete or near complete lack of an action, characteristic, property, state, structure, item, or result. For example, a surface that is "substantially" flat would mean either completely flat, or so nearly flat that the effect would be the same as if it were completely flat.

As used herein terms such as "a", "an" and "the" are not intended to refer to only a singular entity but include the general class of which a specific example may be used for illustration.

As used herein, terms defined in the singular are intended to include those terms defined in the plural and vice versa.

References in the specification to "one embodiment", "certain embodiments", some embodiments" or "an embodiment", indicate that the embodiment(s) described may include a particular feature or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, is present on a second element, wherein intervening elements interface between the first element and the second element. The term "direct contact" or "attached to" means that a first element and a second element are connected without any intermediary element at the interface of the two elements.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The present disclosure is directed to a device 100 as seen in FIG. 1. The device 100 includes a corkscrew 102 that can be any suitable length, such as from 1 inch to about 50 feet. Although the corkscrew 102 is shown as being helically wound in a clockwise direction in the embodiment of FIG. 1, in other embodiments the corkscrew 102 can be helically wound in counter-clockwise direction.

A first end of the corkscrew 104 can be substantially blunt or substantially pointed, and is configured to contact a substrate, and upon receipt of a rotational force, as described below, penetrate into an upper surface of the substrate. Upon penetrating the substrate, as continued rotational force is applied through the first end of the corkscrew 104, the device 100 is drawn further into the substrate until at least a portion of the corkscrew 102 is within the substrate.

An optional stop can also be included at any portion of the corkscrew 102 to stop or reduce rotational progress of the corkscrew 102 and/or to provide stability to the device 100.

As used herein the term "substrate" can be any man-made and/or naturally occurring substance, such as but not limited to sand, gravel, dirt, mud, clay, and combinations thereof, that is at least somewhat capable of being shifted to allow for the corkscrew 2 to penetrate the substrate a suitable distance.

The upper surface of the substrate can be under water, with the water being salt and/or fresh water. In other embodiments the upper surface of the substrate can be partially underwater, and/or partially out of the water depending on tides, etc. In other embodiments the upper surface, or the entirety of the substrate can be above water.

The cross sectional size of the corkscrew 102 can be any suitable size, such as about ¹⁄₁₆" to about 30" across. Further, the cross-sectional shape of the corkscrew 102 can be any suitable shape, such as a circle, triangle, rectangle, square, ellipse, pentagon, star, cross six or more sided polygon, or an erratic shape.

The corkscrew 102 can be formed of any suitable material, such as plastic, glass, ceramic, metal(s), carbon-based materials, elastomer, rubber, and combinations thereof, and can be rigid, substantially rigid, flexible, or substantially flexible. Further, varying portions of the corkscrew 102 can be formed of different materials and/or can have different flexibilities as compared to other portions of the corkscrew 102.

As used herein the term "rigid", or any derivative thereof, is a broad term used in its ordinary sense and refers to the flexural rigidity of a material that generally avoids substantial deformation and/or maintains very close to its original form after pressure has been applied to it.

As used herein the term "flexible", or any derivative thereof, is a broad term and can refer to a material that is substantially deformable and able to be bent, unbent, expanded, contracted, folded, unfolded, or otherwise substantially deformed or caused to change shape upon application of a force. The material can be of any suitable flexibility, such as having a flexibility factor of about 0.1 GPa—about 10,000 GPa, about 0.1 GPa—about 1,000 GPa, about 0.1 GPa—about 100 GPa, about 1 GPa—about 50 GPa, about 10 GPa—about 25 GPa, etc. and substantially or wholly return to its original shape after force ceases.

The corkscrew 102 can be of any suitable diameter, such as having an outer diameter 110 of between about ½" to about 60". Also, the corkscrew 102 can have any suitable pitch 108 between adjacent axially aligned portions of the corkscrew 102, such as a pitch of between ½" to about 60".

A second end 106 of the corkscrew 102 is operably attached to a shaft 120 at a first end of the shaft 122. In some embodiments the corkscrew 102 and the shaft 120 are formed of a single piece of material. In other embodiments the corkscrew 102 and the shaft 120 are joined together/operably attached in any suitable way, such as through mechanical coupling (e.g. welding, a coupling, a bracket, bolting, connection through a separate elastic element, etc.) and/or an adhesive. Further, the corkscrew 102 and the shaft 120 can be operably attached to each other at any portion between the end of the helical twist of the corkscrew 102. The corkscrew 102 can be configured to allow for a central plug of sediment to remain intact within the structure of the corkscrew 102 itself, with that plug of sediment having connection(s) to the surrounding sediment field.

Optionally, a substantially planar disc 124 of any suitable shape and size can surround or partially surround the shaft 104 near the first end of the shaft 120.

Also optionally, a disc or other protrusion(s) of a bar-like shape can extend from near the vicinity of the first end of the shaft 120, which can act as a stop and can provide a stabilizing force to the device 100. This optional disc or other protrusion(s) can also limit side-to-side movement being transmitted down to the coil.

Optionally, a pilot hole can be made first by an auger post digger, which would start initial staging of the device 100 to start at below ground surface, allowing deeper penetration of the corkscrew 102. The pilot hole can also act as a stabilizing cradle to hold the device 100 as it is torqued.

The cross-sectional size of the shaft 120 can be any suitable size, such as about 1/16" to about 10" across. Further, the cross-sectional shape of the shaft 120 can be any suitable shape, such as a circle, triangle, rectangle, square, ellipse, pentagon, star, cross six or more sided polygon, or an erratic shape.

The shaft 104 can be formed of any suitable material, such as plastic, glass, ceramic, metal(s), carbon-based materials, elastomer, rubber, rope, cable, thread, wire, string, chain, twisted twine, twisted mason line, synthetic fibers, fishing line, sisal, coconut fiber and combinations thereof, and can be rigid, substantially rigid, flexible, or substantially flexible.

Further, varying portions of the shaft 104 can be formed of different materials and/or can have different flexibilities as compared to other portions of the shaft 104. Specifically, the shaft 104 can be flexible or substantially flexible along one or more portions of its length between the first end of the shaft 122 and a second end of the shaft 126. Also, the shaft 104 can be flexible or substantially flexible along its entire length between the first end of the shaft 122 and the second end of the shaft 126.

Further, the flexibility of the shaft 104 can absorb forces from waves and/or flowing water, and/or wind, which, in some embodiments, act to reduce forces against the substrate the device 100 is placed in and may reduce a scour affect. Further, the device 100 can reduce the overall power and travel distance of waves and storm surge. Further, in some embodiments, the flexibility of the shaft 104 can, by slowing water flow, cause sediment to drop out of the water and/or wind suspension, thereby limiting the travel distance and inland penetration of waves and/or other moving water.

As can be seen in FIG. 1, one or more protrusions 128 extend from the shaft 126 between the first end of the shaft 122 and the second end of the shaft 126. In this embodiment a plurality of protrusions 128 are shown, but in other embodiments, one protrusion, two, or more can be included, such as any number of protrusions from between one to about 10,000 or more protrusions. The one or more protrusions 128 can act to increase turbulence, such as by head loss, friction loss, and/or chaotic current flow, etc., in water around the device 100, which may impede flow of water past and/or through the device 100 and/or absorb forces from waves and/or flowing water, and/or wind, which, in some embodiments, act to reduce forces against the substrate the device 100 is placed in. The one or more protrusions 128 can also act to slow the flow of water past and/or through the device 100 such that the then slower water may be more prone to cause any suitable sediment and/or sand particle to drop out of suspension. In this embodiment the one or more protrusions 128 begin a distance away from the corkscrew 102 on the shaft 120, however, in other embodiments, the lowest of the one or more protrusions 128 can be in contact with or near the corkscrew 102, so that little or no shaft 120 is visible between the lowest of the one or more protrusions 128 and the corkscrew 102.

In some embodiments each of the one or more protrusions 128 can be operably attached to the shaft 126 in any suitable way, such as through a fixed, mechanical coupling (e.g. welding, a coupling, a bracket, bolting, a snug fit, a loose connection, connection through a separate elastic element, etc.), and/or a loose fitting/ability to freely rotate in one or both directions, and/or an adhesive.

In other embodiments the one or more protrusions 128 can be configured as curved so that forces act differently on different portions of the one or more protrusions 128. Additionally, the one or more protrusions 128 can be configured so that they only produce torque in one of a clockwise direction and a counter-clockwise direction about the shaft 120, and can be prevented from rotating in the other direction from which they are configured to rotate. If the one or more protrusions 128 are configured to only rotate in a direction that is opposite the helical configuration of the corkscrew 102 (such that the one or more protrusions 128 are prevented from rotating in the same direction as the helical configuration of the corkscrew 102) the one or more protrusions 128 can act as a helical driving force to the corkscrew 102 upon receiving a force that is substantially perpendicular to a surface of the one or more protrusions 128, such as a force from a wave or a current of water, or the like.

The one or more protrusions 128 can be any suitable size and shape and can be spaced any suitable length apart between the first end of the shaft 122 and the second end of the shaft 126. Additionally, the one or more protrusions can be spaced at any suitable location about the circumference of the shaft 122.

In some embodiments, one or more of the one or more protrusions 128 can be curved in one or more directions and/or planes in a configuration to absorb more force on one side of each of the one or more protrusions 128 due to an energy transfer produced from both incoming and outgoing waves and/or water flow. This curvature can cause the production of rotational pressure on the shaft 120, and subsequently the corkscrew 102.

The one or more protrusions 128 can be formed of a unitary piece of material, or the one or more protrusions 128 can be formed of two or more pieces of material that are coupled together. The one or more protrusions 128 can be all be formed of the same material or different materials as compared to other protrusions 128. The one or more protrusions 128 can be formed of any suitable material, such as plastic, glass, ceramic, metal(s), carbon-based materials, elastomer, rubber, rope, cable, thread, wire, string, chain, twisted twine, twisted mason line, synthetic fibers, fishing line, sisal, coconut fiber and combinations thereof, and can be rigid, substantially rigid, flexible, or substantially flexible.

In one embodiment, the one or more protrusions 128 can be bristle-like and extend about ¼" to about 60" from the shaft 120. In yet other embodiments, the one or more protrusions 128 can be a mesh material or any other perforated material.

Figure 2:
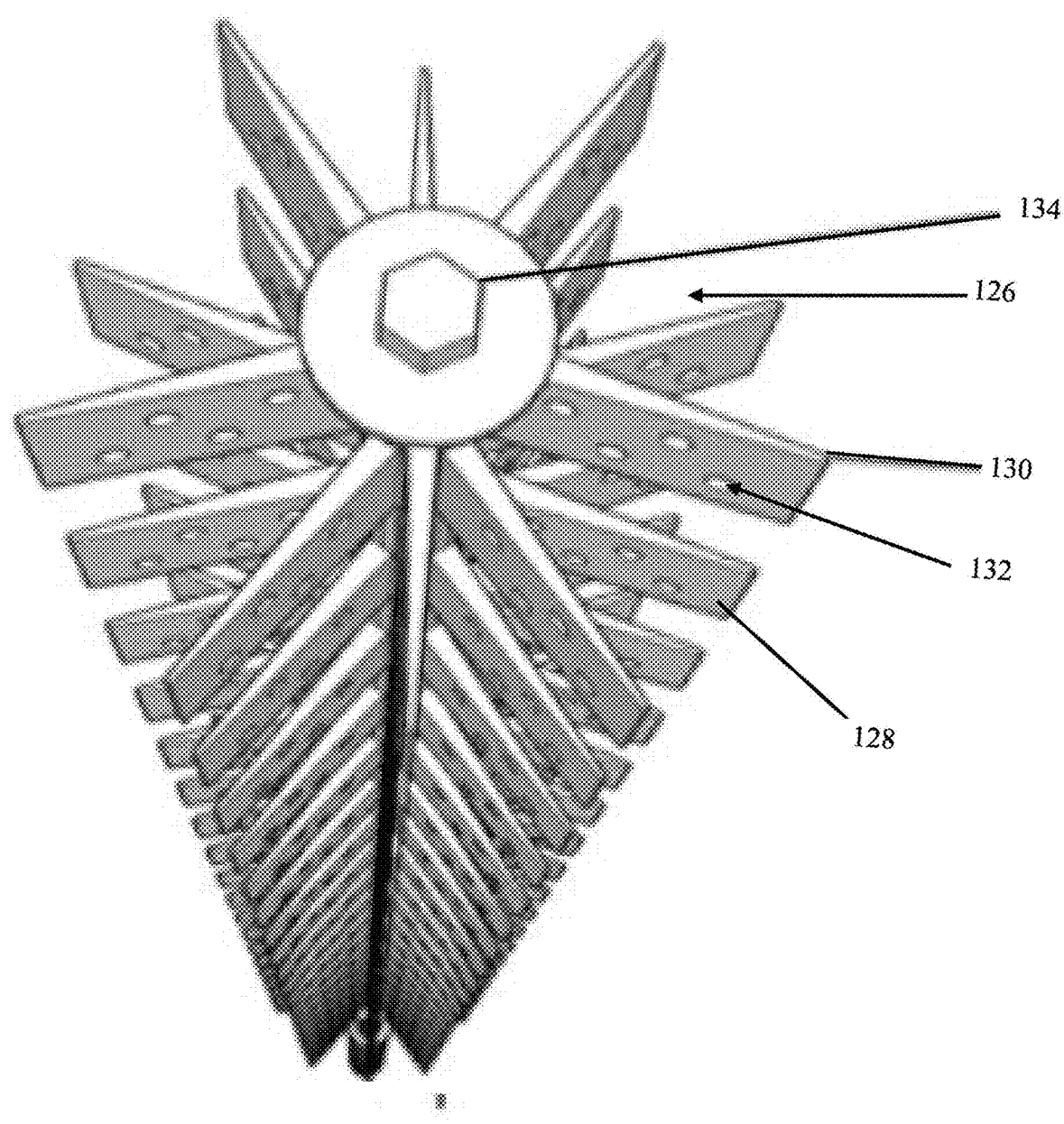
FIG. 2 is a perspective view of one embodiment of the device of the present disclosure.
Figure 3A:
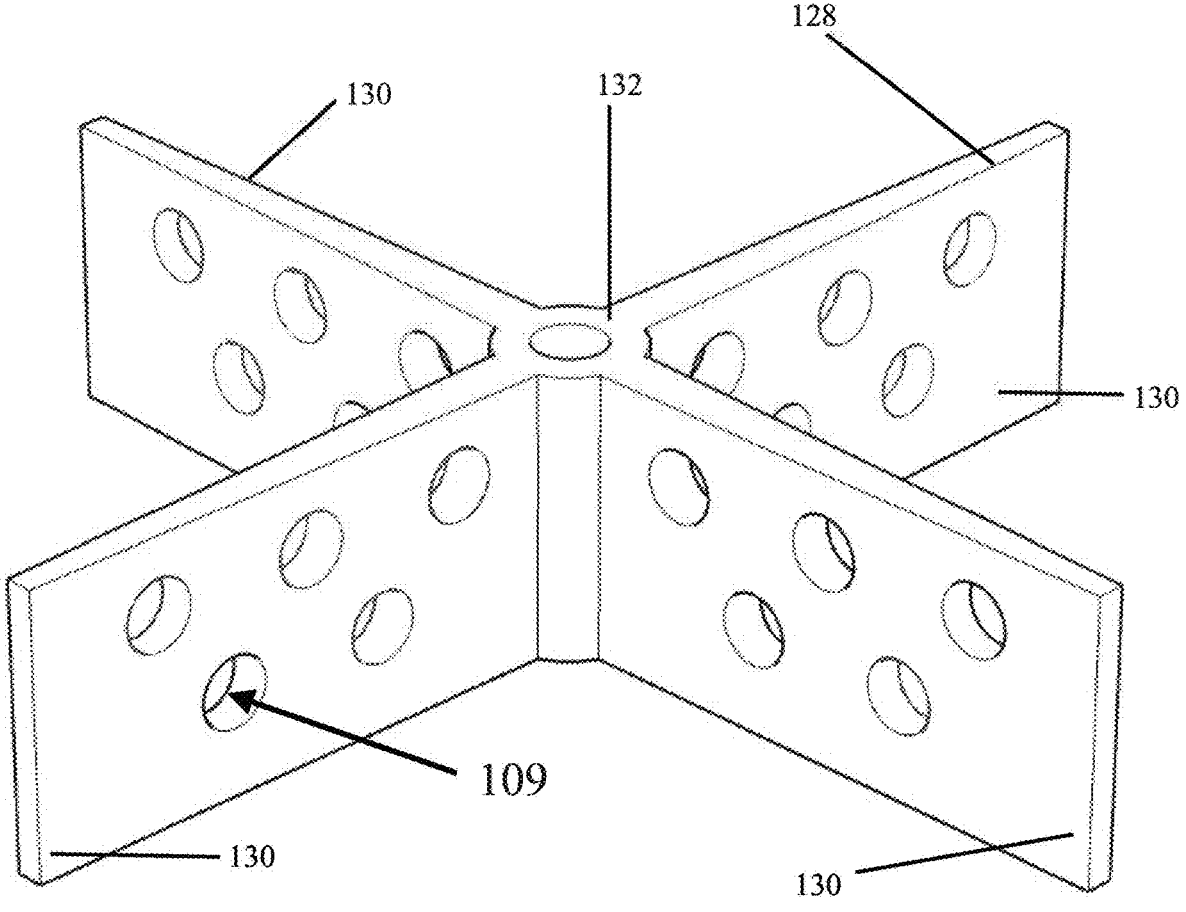
FIG. 3A is a view of an embodiment of a protrusion of the device of the present disclosure.

In other embodiments, such as the embodiment shown in FIGS. 1 and 2, the one or more protrusions 128 can include one or more plates 130 that extend from an inner, central support 132 (shown in FIG. 3A). In other embodiments, the one or more protrusions 128 can include one, two, four or more plates up to about 100 plates. The one or more plates 130 (including the central support 132) can be formed of a unitary piece of material or the one or more plates 130 and the central support 132 can be formed of two or more pieces of material that are operably connected.

A more detailed view of the one or more protrusions 128 can be seen in FIG. 2. The one or more protrusions 128 can have any suitable height between the first end of the shaft 122 and the second end of the shaft 126, such as about ¼" to about 12", and extend about ¼" to about 60" from the shaft 120. Some or all of the one or more protrusions 128 can include a domed portion near its center, where the shaft 122 passes through the one or more protrusions 128, to cause the one or more protrusions 128 to be spaced apart a distance away from each other.

Optionally, the plate 130 can have one or more through holes 109 that pass through the plate 130 in the depth direction. All plates 130 of the device 100 can include through holes 109, some plates 130 of the device 100 can include through holes 109, or no plates 130 of the device 100 can include through holes. The through holes can be any suitable number, such as one to 100, and can be any suitable size, such as about ¹⁄₁₆" to about 10". Additionally, the through holes 109 can be located in any suitable location and pattern within each plate 130.

On the second end of the shaft 126 an optional torquing mechanism 134 can be included. The torquing mechanism 134 can be any structure that is configured to transmit torque to the shaft 120, such as a bolt head (as shown in FIG. 2), a handle, etc. This torquing mechanism 134 can be operably attached to the second end of the shaft 126 in any suitable way and can prevent the one or more protrusions 128 from dislodging from the shaft 120. The torquing mechanism 134 can also transmit a torque to the corkscrew 102 to install or remove the corkscrew 102 from the substrate.

A more detailed view of the one or more protrusions 128 can be seen in FIG. 3A. FIG. 3A is a view of one of the one or more protrusions 128 alone, without other elements. As can be seen in this embodiments, four plates 130 are included and are joined about the central support 132. The central support 132 is dimensioned to extend around the periphery of the shaft 120.

Figure 3B:
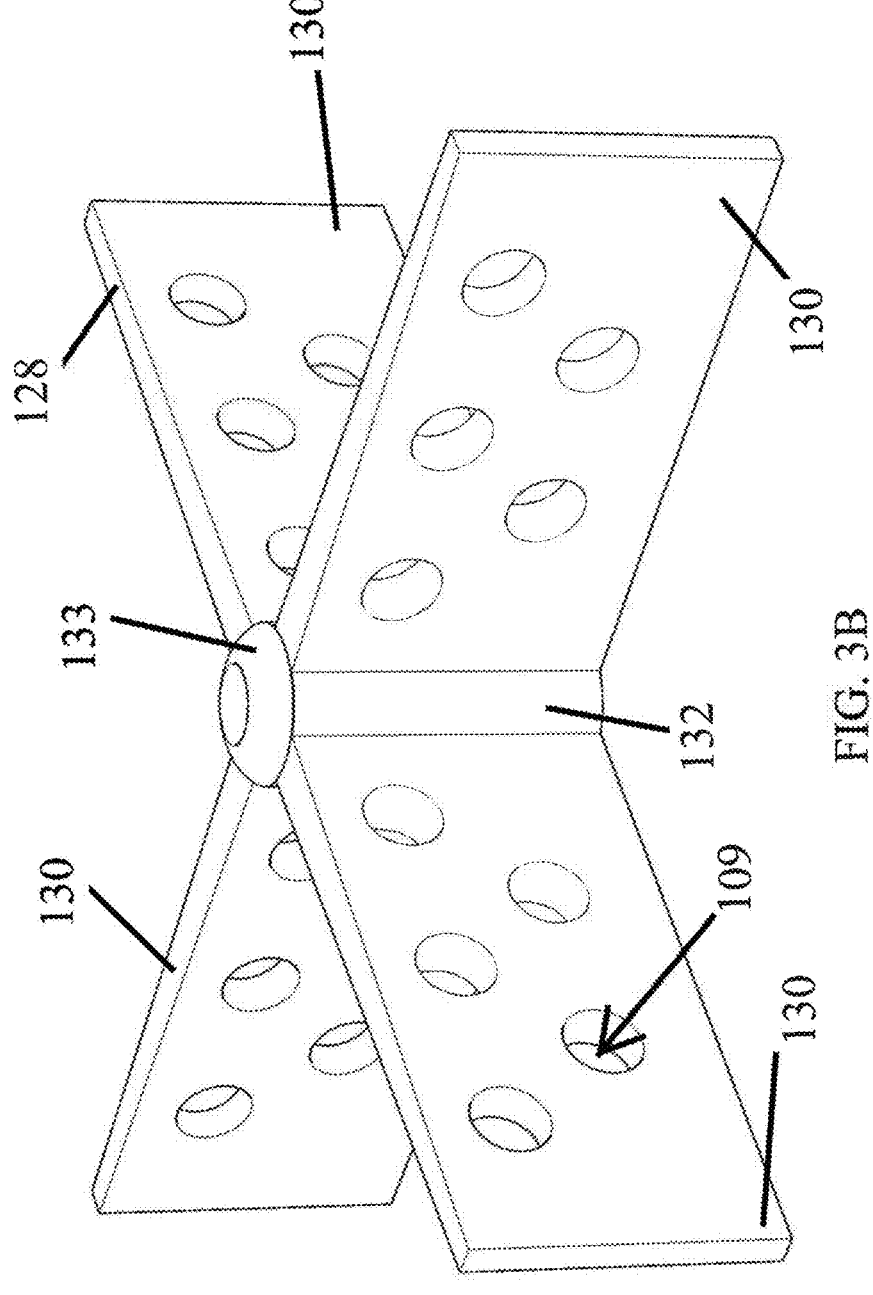
FIG. 3B is a view of an embodiment of a protrusion of the device of the present disclosure.
Figure 4:
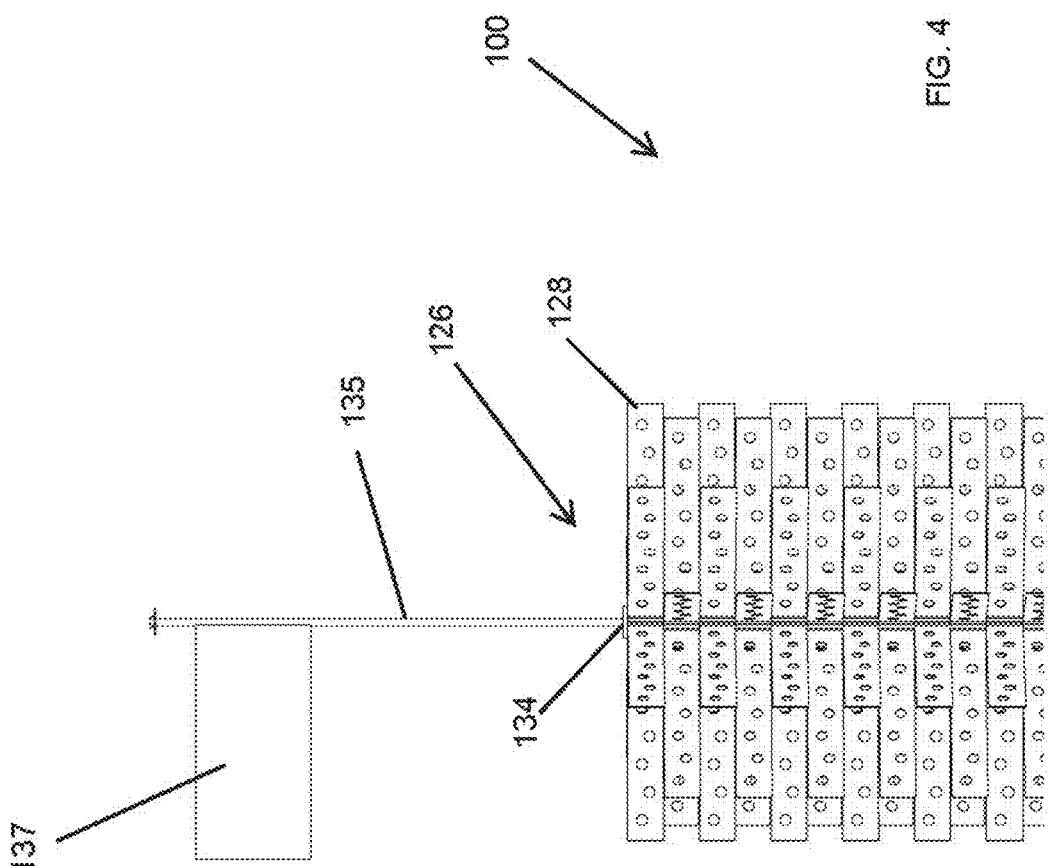
FIG. 4 is a front view of an embodiment of the disclosure.

Another embodiment of the one or more protrusions 128 is shown in FIG. 3B. This embodiment of the one or more protrusions 128 includes a dome 133, which can create a separation space between adjacent protrusions 128 when they are arranged on the shaft 120. This dome 133 can be any suitable height, such that any suitable distance between adjacent protrusions 128 can be substantially maintained and this dome 133 can be formed of an additive material (operably connected to the central support 132 in any suitable way), or dome 133 can be formed as a singular piece of material with a surface of the central support 132.

Embodiments of the device 100 can optionally include an extension shaft 135 operably attached to the second end of the shaft 106. This extension shaft 135 can include a flag 137, or any other suitable marking element that may make device 100 easier to see. Another embodiment of a device, device 200 is shown in FIG. 5.

Figure 5:
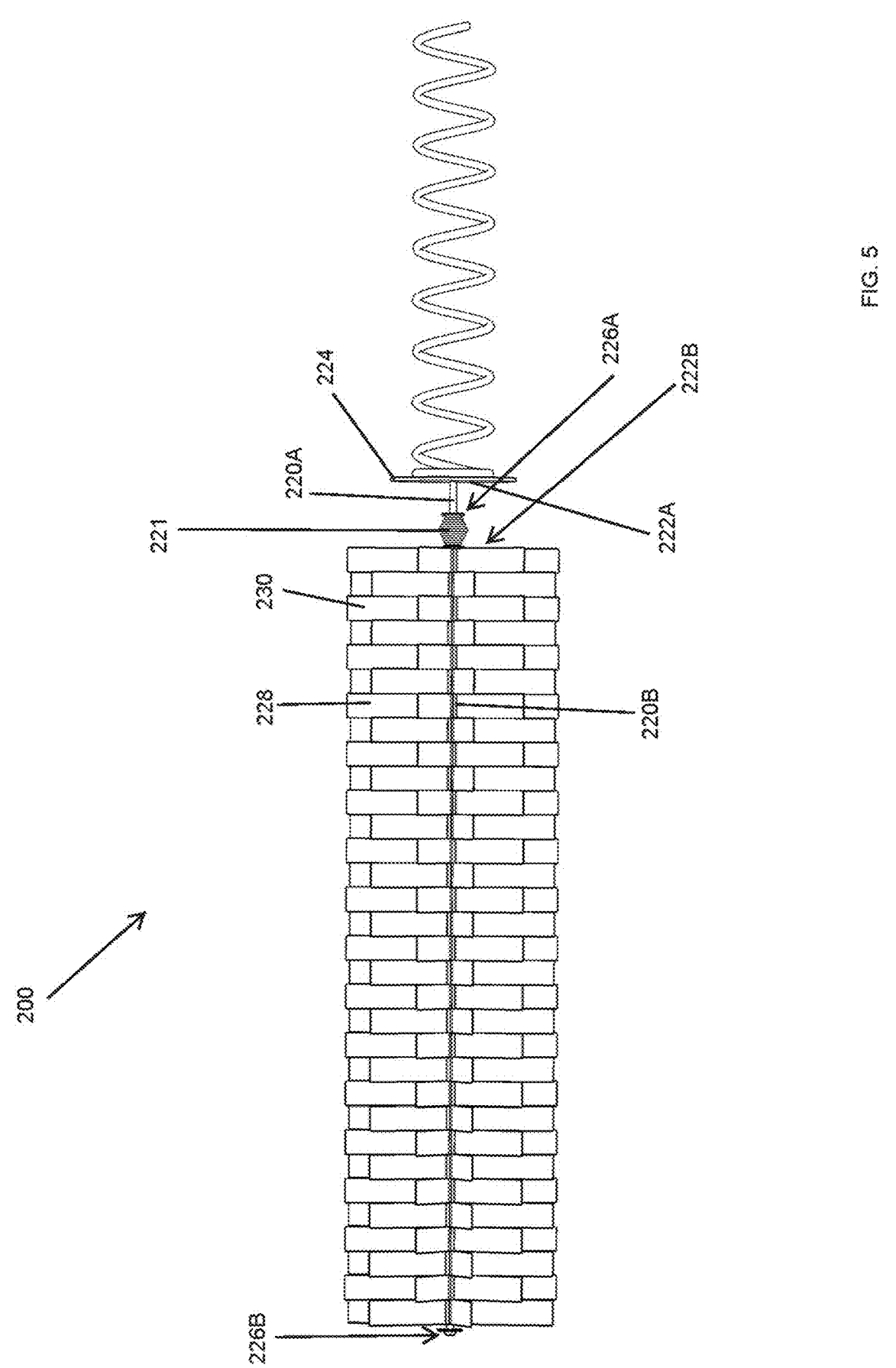
FIG. 5 is a front view of an embodiment of the disclosure.

Elements shown in FIG. 5 are comparable to those of FIG. 1, with the first digit in this embodiment being 2 rather than 1 in the device 100 embodiment. For example, the corkscrew 102 of the device 100 is comparable, in formation and composition, to the corkscrew 202 of the device 200 embodiment. Thus, all reference numbers with the last two numbers being the same between device 200 and the device 100 are comparable, or the same, in formation and composition.

In device 200 a protrusions 228, including one or more plates 230 (in this embodiment without through holes) extend along a length of an upper shaft 220B. The upper shaft 220 includes a first end 226B, with a first end 226B of the upper shaft 220B being operably connected to a barrel spring 221, with the barrel spring 221 connected to a second end 226A of a lower shaft 220A. A first end 222A of the lower shaft 220A can be operably connected to a substantially planar disc 224 or directly to a portion of the corkscrew 202. This barrel spring 221 can be any suitable size, have any suitable spring constant be formed of any suitable material such as plastic, glass, ceramic, metal(s), carbon-based materials, elastomer, rubber, and combinations thereof.

As used herein, the term "barrel spring" can refer to any elastic element of any material and/or to any device having a spring constant or other elastic properties, of any material, including but not limited to a torsion springs, extension springs, compression springs and barrel springs. The term "barrel spring" can also refer to a substantially cylindrical arrangement of wound coils, with the substantially cylindrical arrangement having one substantially the same diameter, or two or more diameters of coil along the length of the substantially cylindrical element. The "barrel spring" can be non-telescoping or can be telescoping, which allows for smaller coils to squeeze down or up to be located within larger coils during compression/expansion.

The barrel spring 221 can alternatively be further vertically, such that one or more plates 230 are on the lower shaft 220A and one or more plates 230 are on the upper shaft 220B.

The barrel spring 221 provides more flexibility to the device 200, beyond the flexibility of the upper shaft 220A and/or the lower shaft 220A.

Figure 6:
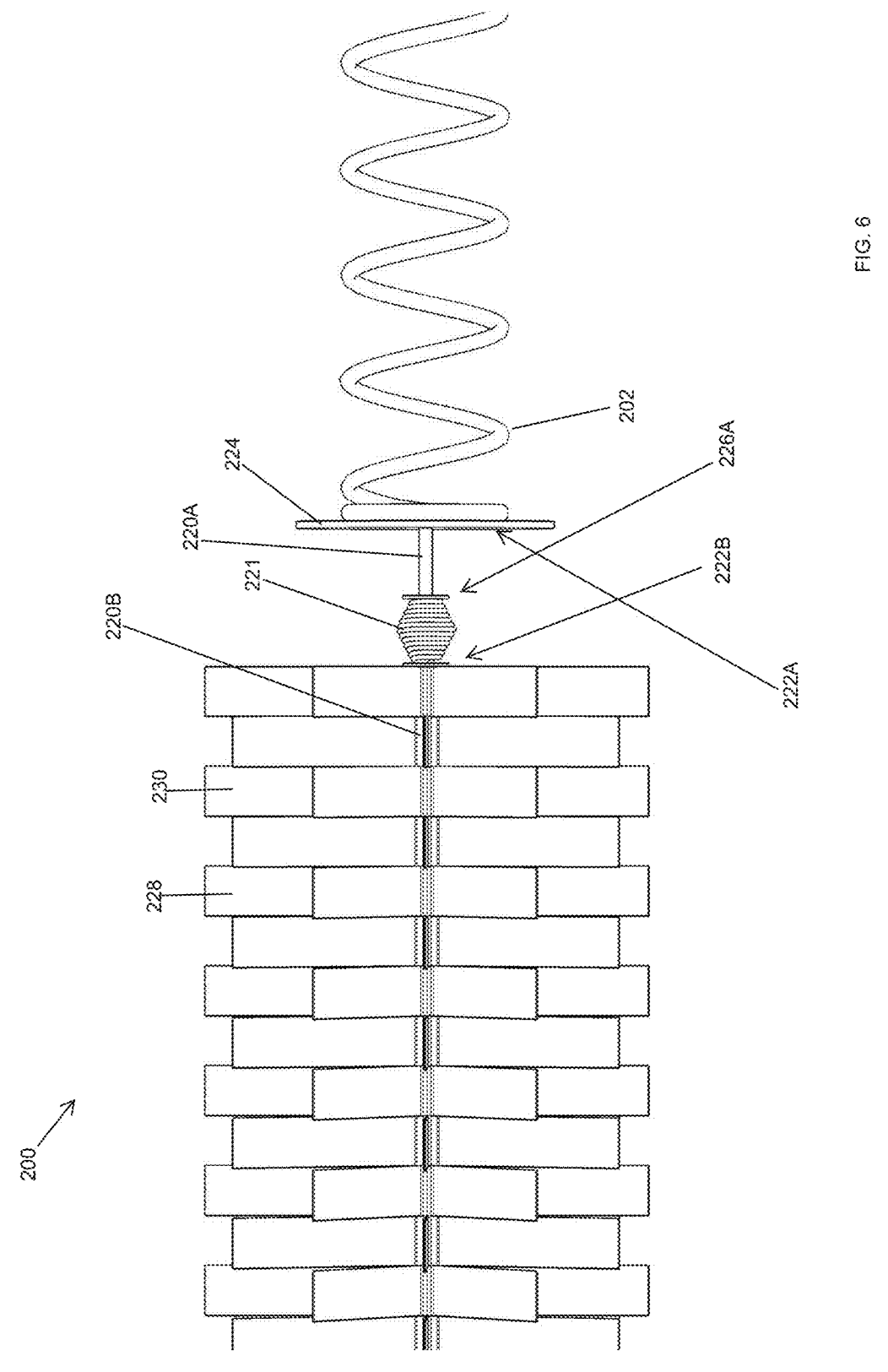
FIG. 6 is a front view of an embodiment of the disclosure.

A more detailed view of the device 200, including the barrel spring 221 can be seen in FIG. 6. As can be seen the barrel spring 221 is operably attached at its upper end to the first end 222B of the upper shaft 220B, and at its lower end to the second end 226A of a lower shaft 220A. In addition to being included in device 200, the barrel spring 221 can be included in any embodiment of this disclosure, in any suitable location.

Figure 7:
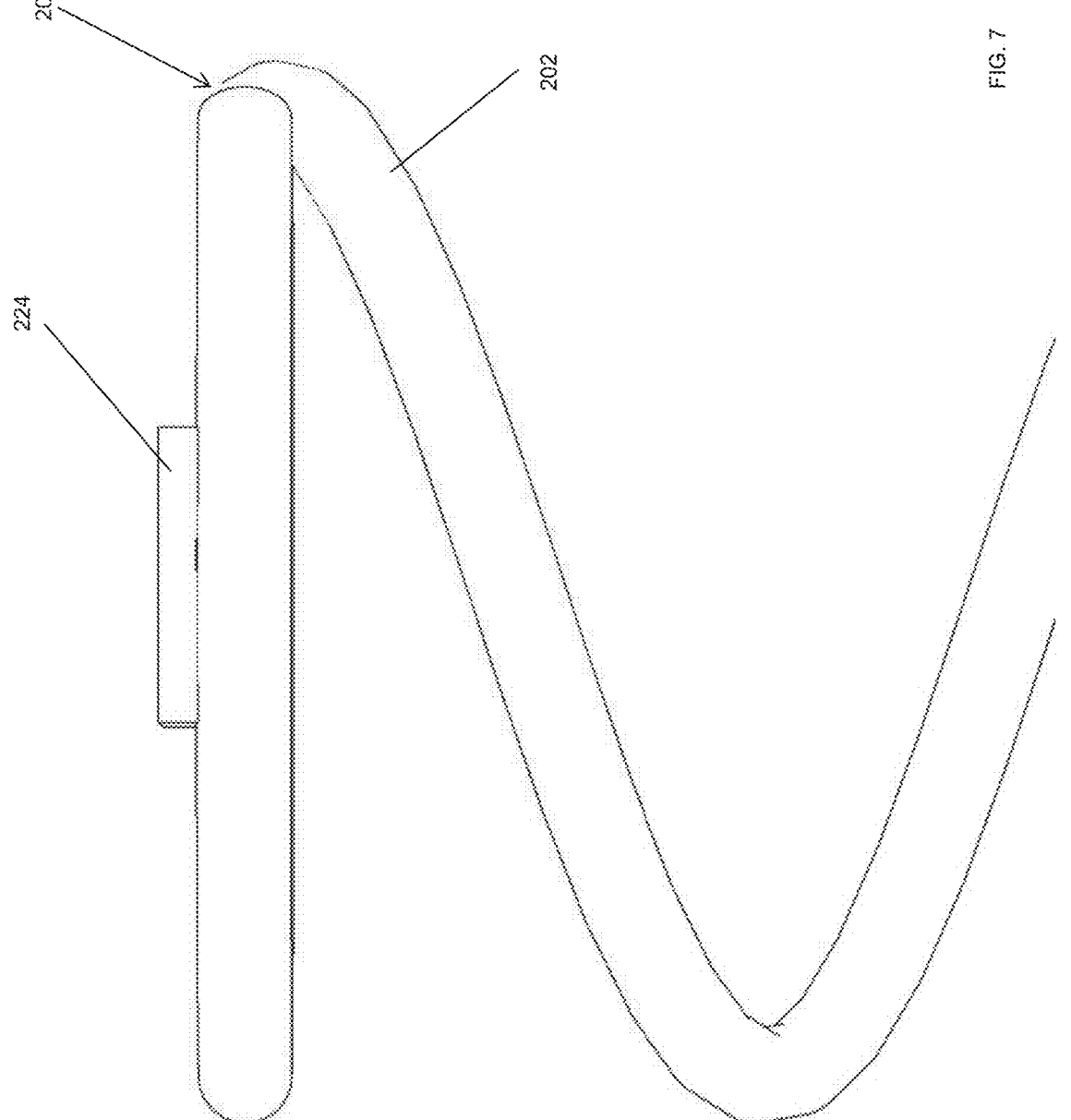
FIG. 7 is a view of a portion of an embodiment of the disclosure.
Figure 8:
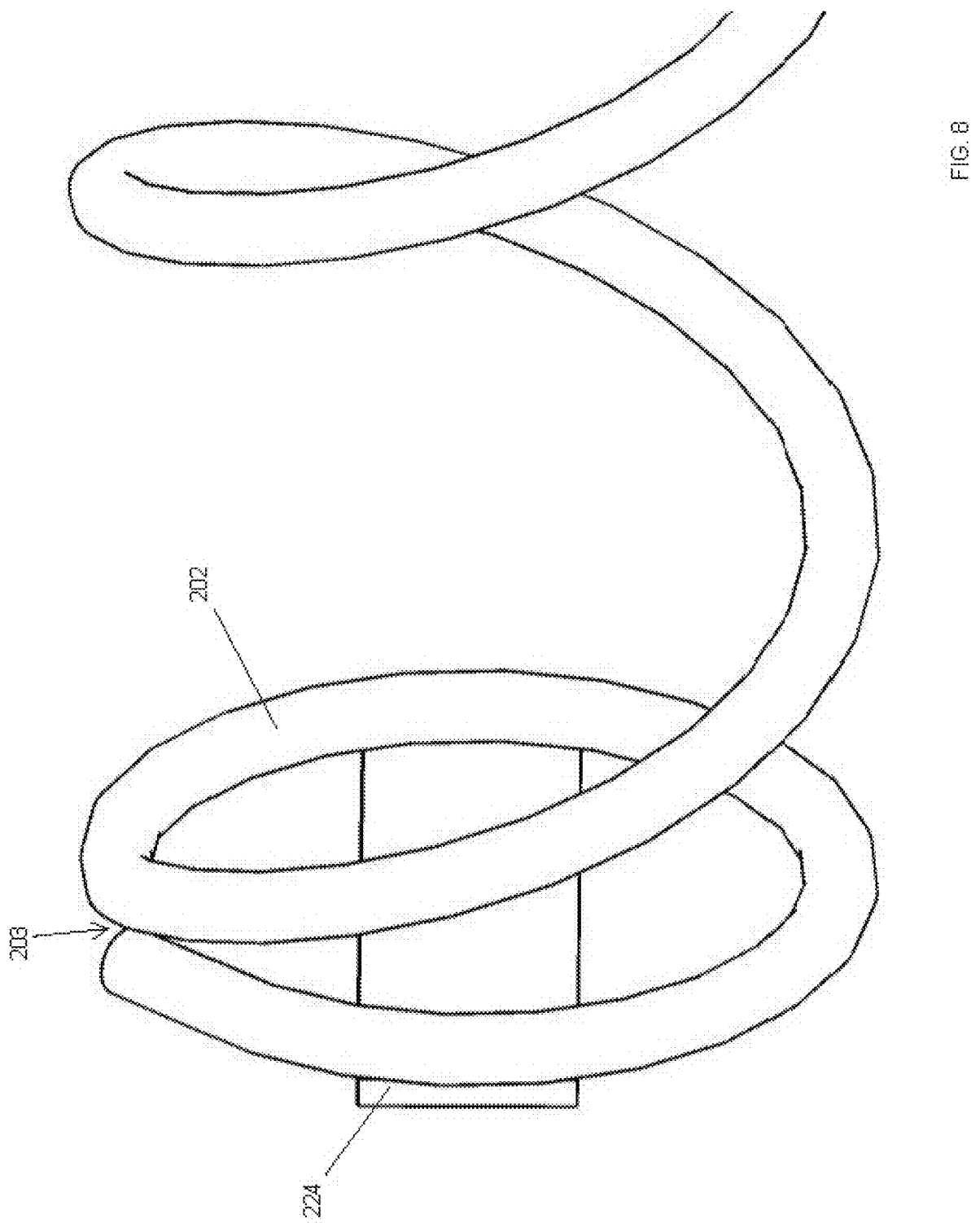
FIG. 8 is a view of a portion of an embodiment of the disclosure.

Another magnified view of the device 200 is shown in FIG. 7, which illustrates the corkscrew 202 and the substantially planar disc 224, which is operably attached to the corkscrew 202 at one or more points. The corkscrew 202 can optionally be operably attached to itself at connection point 203, alternatively, the portions of the corkscrew 202 are just in contact at connection point 203. FIG. 8 provides another magnified view of the device 200, with the substantially planar disc 224 being seen. In this embodiment, as well as in any other embodiment of the application, the substantially planar disc 224 can be any suitable shape, such a rectangular shape as seen in FIG. 8. In this embodiment, the substantially planar disc 224 can be operably attached to the corkscrew at each opposing end of the substantially planar disc 224.

Another embodiment of a device, device 300 is shown in FIGS. 9A-9D.

Elements shown in FIGS. 9A-9D are comparable to those of FIGS. 1 and 5, with the first digit in this embodiment being 3 rather than 1 in the device 100 embodiment or 2 in the device 200 embodiment. For example, the corkscrew 102 of the device 100 is comparable, in formation and composition, to the corkscrew 302 of the device 300 embodiment. Thus, all reference numbers with the last two numbers being the same between device 300, device 200 and the device 100 are comparable, or the same, in formation and composition.

Figure 9A:
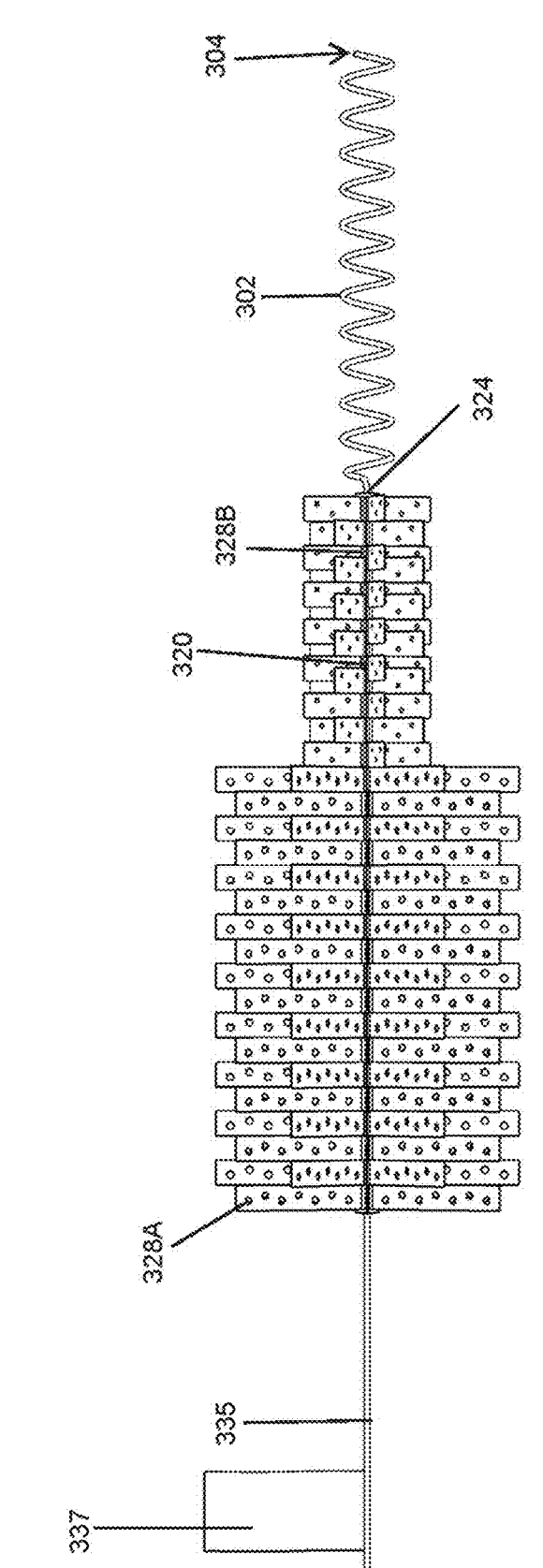
FIG. 9A is a front view of an embodiment of the disclosure.

In device 300 of FIG. 9A, a plurality of protrusions are included, with protrusions 328A of a first, larger diameter, provided above protrusions 328B of a second, smaller diameter. In this embodiment the protrusions 328A are further from the corkscrew 302 as compared to the protrusions 328B, however, in other embodiments, protrusions with a larger diameter can be nearer the corkscrew 302 than protrusions of a smaller diameter.

In other embodiments, protrusions of three or more differing diameters can be included along the length of the shaft 320, in any suitable pattern.

Figure 9B:
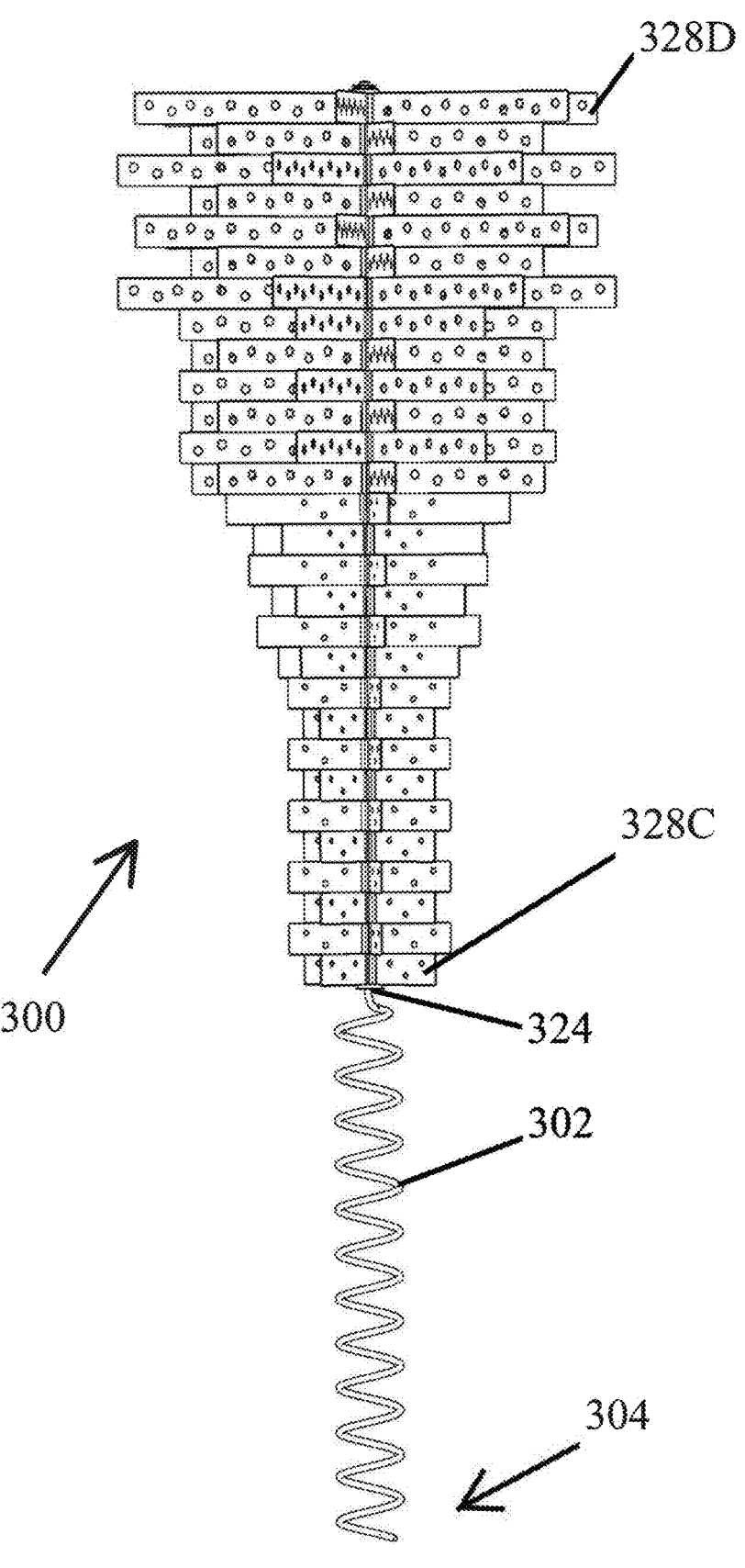
FIG. 9B is a front view of an embodiment of the disclosure.

In the device 300 of FIG. 9B, a plurality of protrusions are included, with a protrusion 328C being the smallest diameter, and as the protrusions are further away from the substantially planar disc 324, their diameter increases to the larges diameter protrusion, protrusion 328D. This increase in diameter can be a constant, step-wise increase for each additional protrusion, and/or can be a variable increase for each additional protrusion.

Figure 9C:
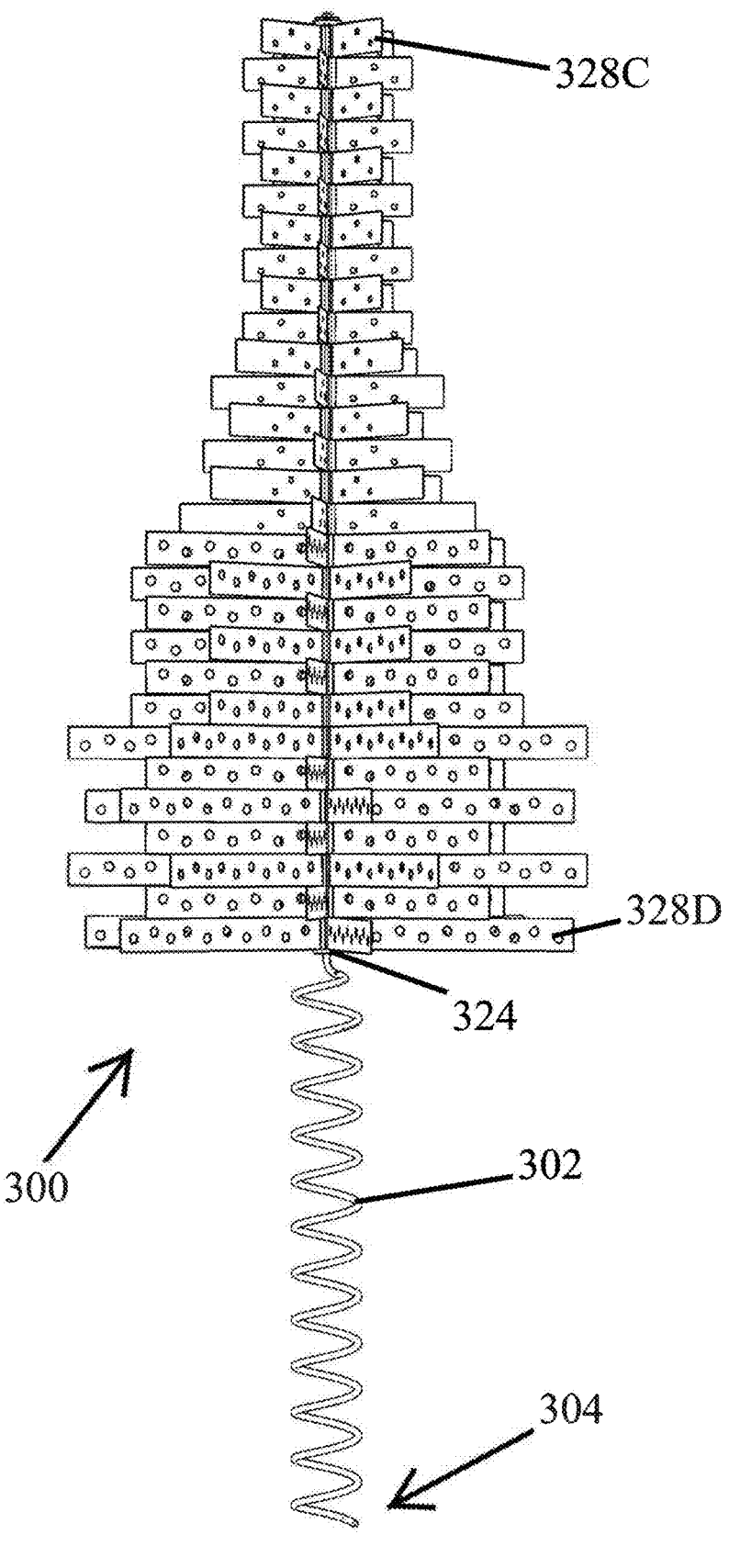
FIG. 9C is a front view of an embodiment of the disclosure.

In the device 300 of FIG. 9C, a plurality of protrusions are included, with a protrusion 328C being the smallest diameter, and as the protrusions are closer to the substantially planar disc 324, their diameter increases to the larges diameter protrusion, protrusion 328D. This increase in diameter can be a constant, step-wise increase for each additional protrusion, and/or can be a variable increase for each additional protrusion.

Figure 9D:
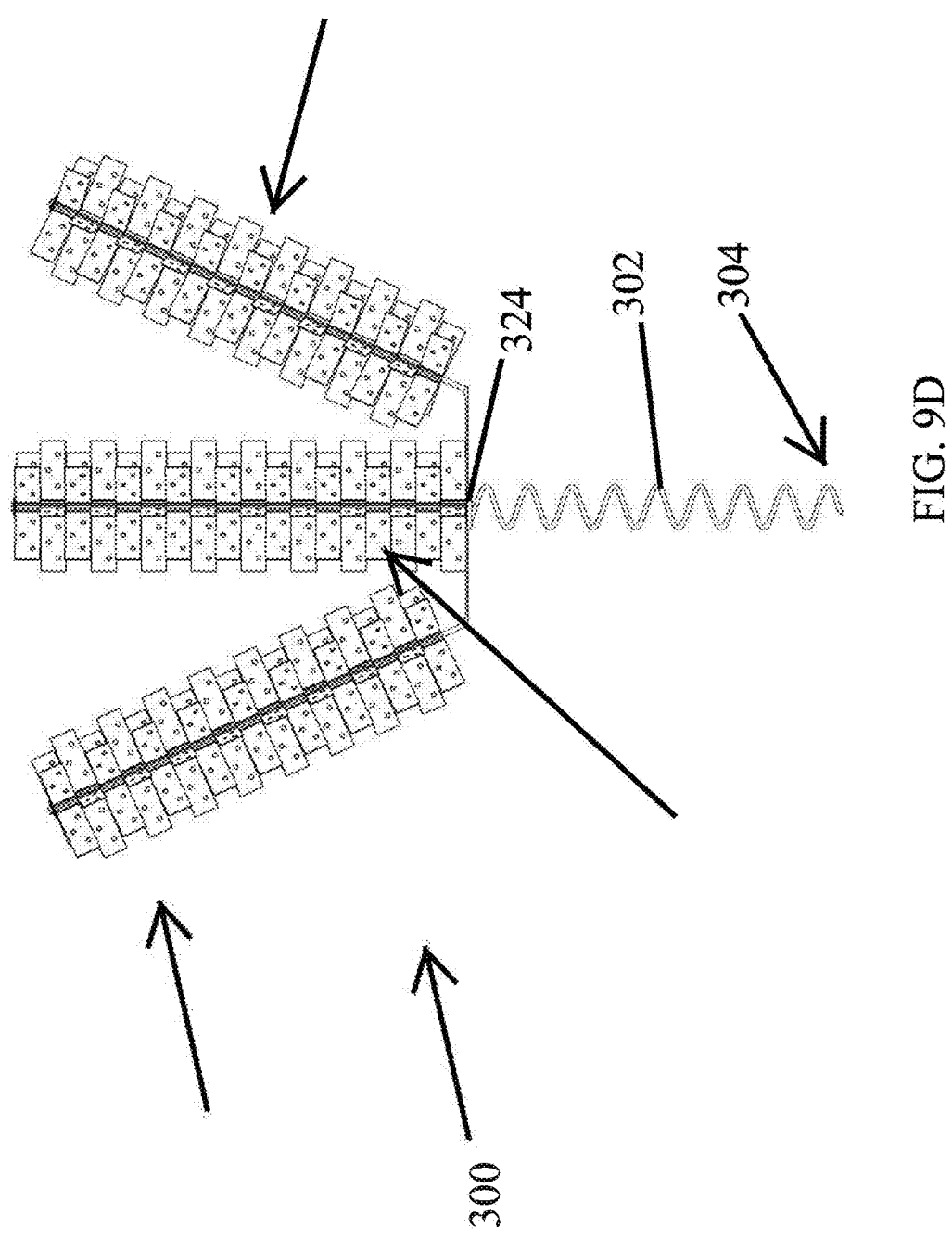
FIG. 9D is a front view of an embodiment of the disclosure.

In the device 300 of FIG. 9D, there are three sets of shafts and protrusions 325. Each set of shaft and protrusion 325 can be the same or similar to any other device of the present disclosure. In FIG. 9D three sets of shafts and protrusions 325 are shown, however, in other embodiments, one, two, four or more shafts and protrusions 325 can be operably attached to the substantially planar disc. Also, each of the sets of shafts and protrusions 325 are shown as having the same dimensions in FIG. 9D, however, in other embodiments, each set of shaft and protrusion 325 can have the same dimensions as all other sets of shafts and protrusions 325, or each set of shaft and protrusion 325 can have different dimensions as compared to all other sets of shafts and protrusions 325.

Figure 10:
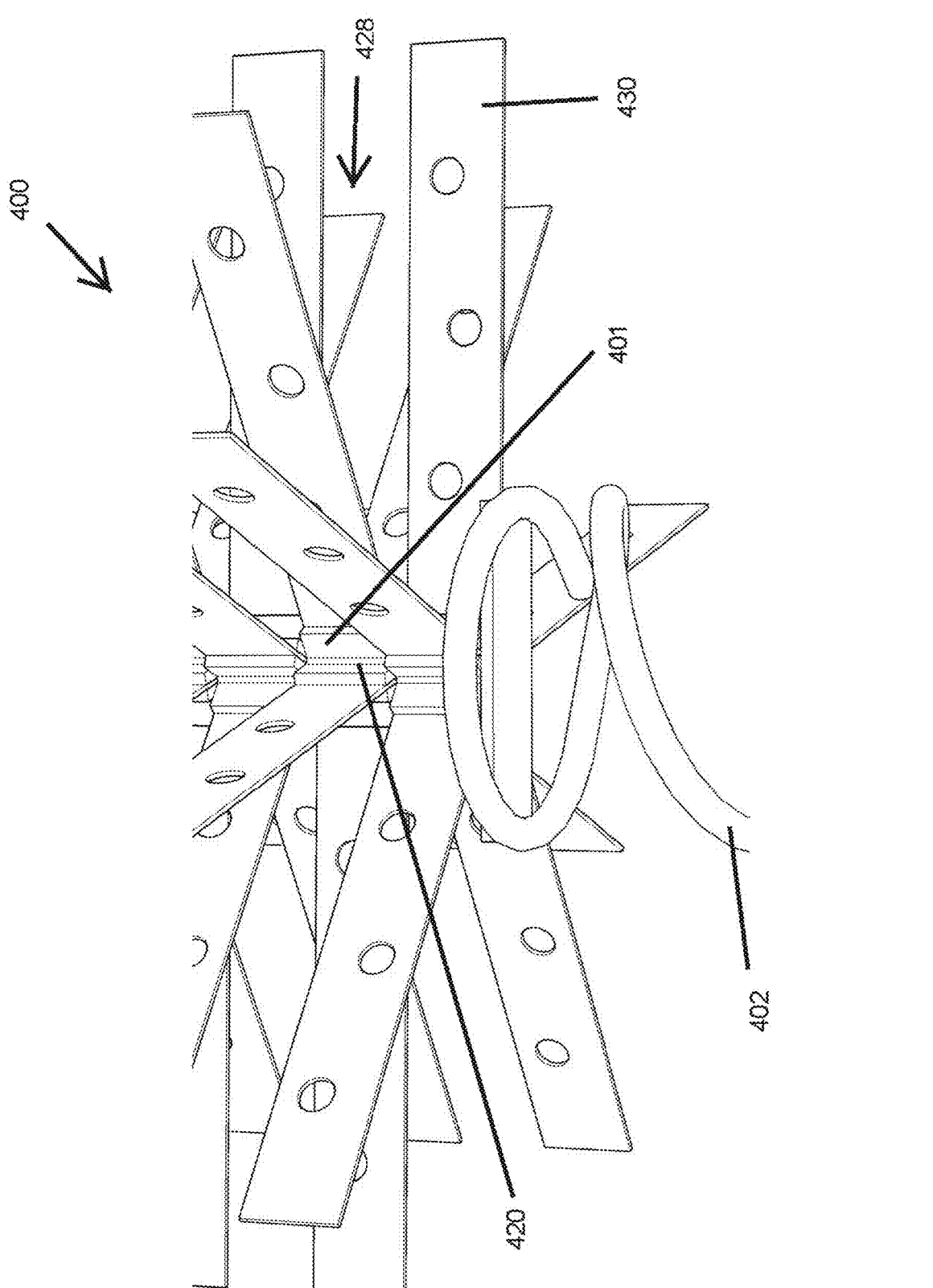
FIG. 10 is a view of a portion of an embodiment of the disclosure.

Another embodiment of a device, device 400 is shown in FIG. 10. Elements shown in FIG. 10 are comparable to those of FIGS. 1, 5, and 9, with the first digit in this embodiment being 4 rather than 1 in the device 100 embodiment, 2 in the device 200 embodiment, or 3 in the device 300 embodiment. For example, the corkscrew 102 of the device 100 is comparable, in formation and composition, to the corkscrew 402 of the device 400 embodiment. Thus, all reference numbers with the last two numbers being the same between device 400, device 300, device 200 and the device 100 are comparable, or the same, in formation and composition.

FIG. 10 is a magnified view of device 400. In this embodiment, a protrusion 428 is composed of a plate holder 401 and one or more plates 430. The plate holder 401, shown in more detail below, is configured to extend around a portion, majority, or whole of a shaft 420. The plate holder 401 can be rotatable in both directions about shaft 420, rotatable around only one direction (clockwise or counterclockwise), or the plate holder 401 can be fixed to the shaft 420. The shaft 420 can be operably attached to the substantially planar disc 424. Additionally, in this embodiment, each plate holder 401 can be oriented to be offset from the plate holder above 401, such that the one or more plates 430 from each layer of plate holder 401 are not aligned.

Figure 11:
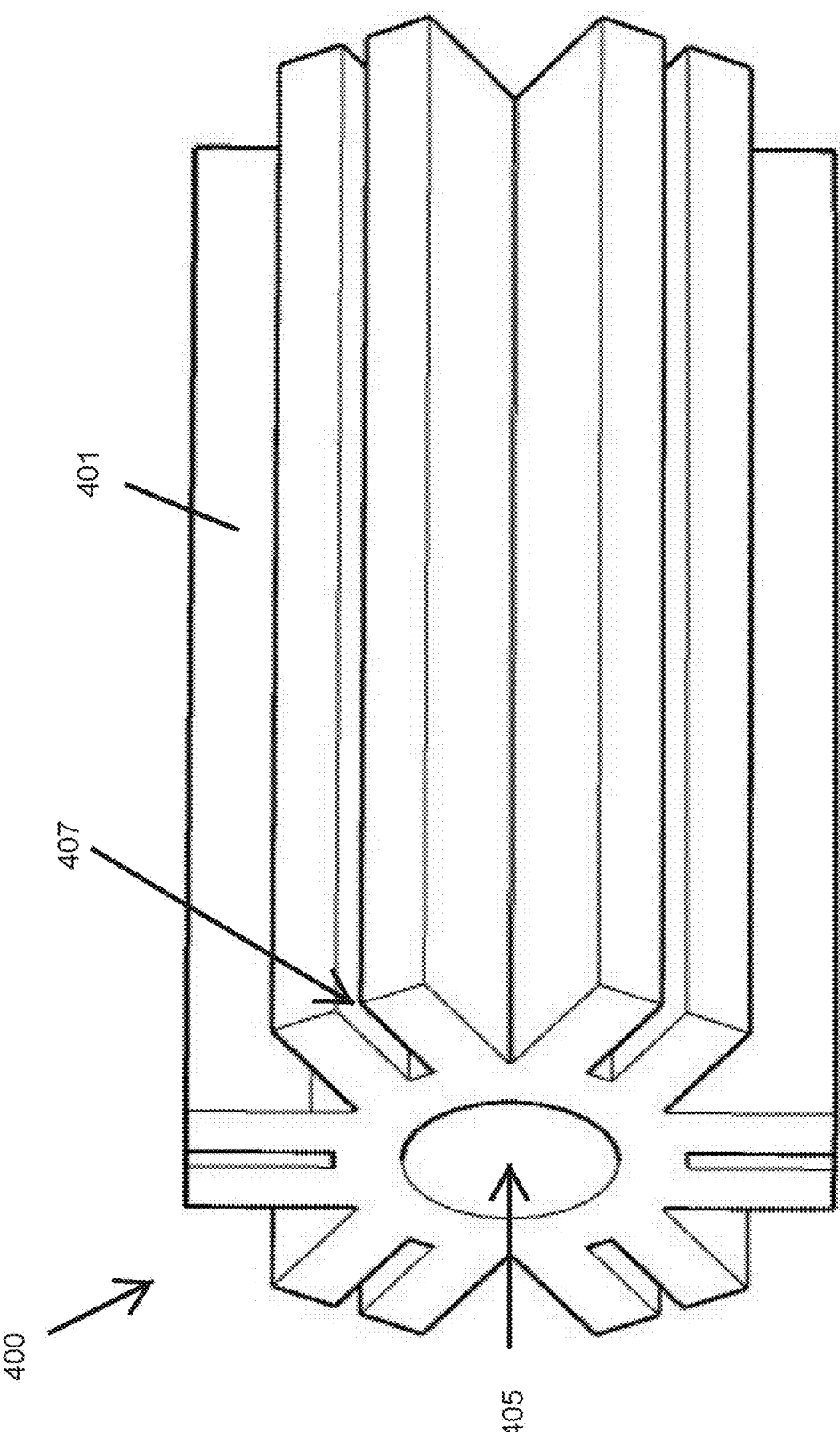
FIG. 11 is a view of a plate holder of an embodiment of the disclosure.

The plate holder 401 maintains each of the one or more plates 430 in a fixed position as compared to the plate holder 401 itself. In this embodiment, the plate holder 401 is shown as maintaining six plates 430 at substantially even intervals around the circumference of the plate holder 401. However, in other embodiments each of the one or more plates can be at any interval around the circumference of the plate holder 401. Also, in other embodiments, the plate holder 401 can maintain one plate, two plates, three plates, four plates, five plates, seven plates, or more. The plate holder 401 is shown in more detail in FIG. 11. The plate holder 401 includes a shaft cavity 405, which allows the plate holder 401 to have the shaft 420 pass through the shaft cavity 405 and maintain the position of the plate holder 401. The plate holder 401 also has at least one plate channel 407, such as, in this embodiment, six individual plate channels 407. Each of the at least one plate channels 407, as well as the plate holder 401 itself, is dimensioned so as to accommodate a portion of a plate 430 within the plate channel 407. The portion of the plate 430 can be operably attached to the plate channel 407 so that the plate 430 is maintained during operation of the device 400.

Figure 12:
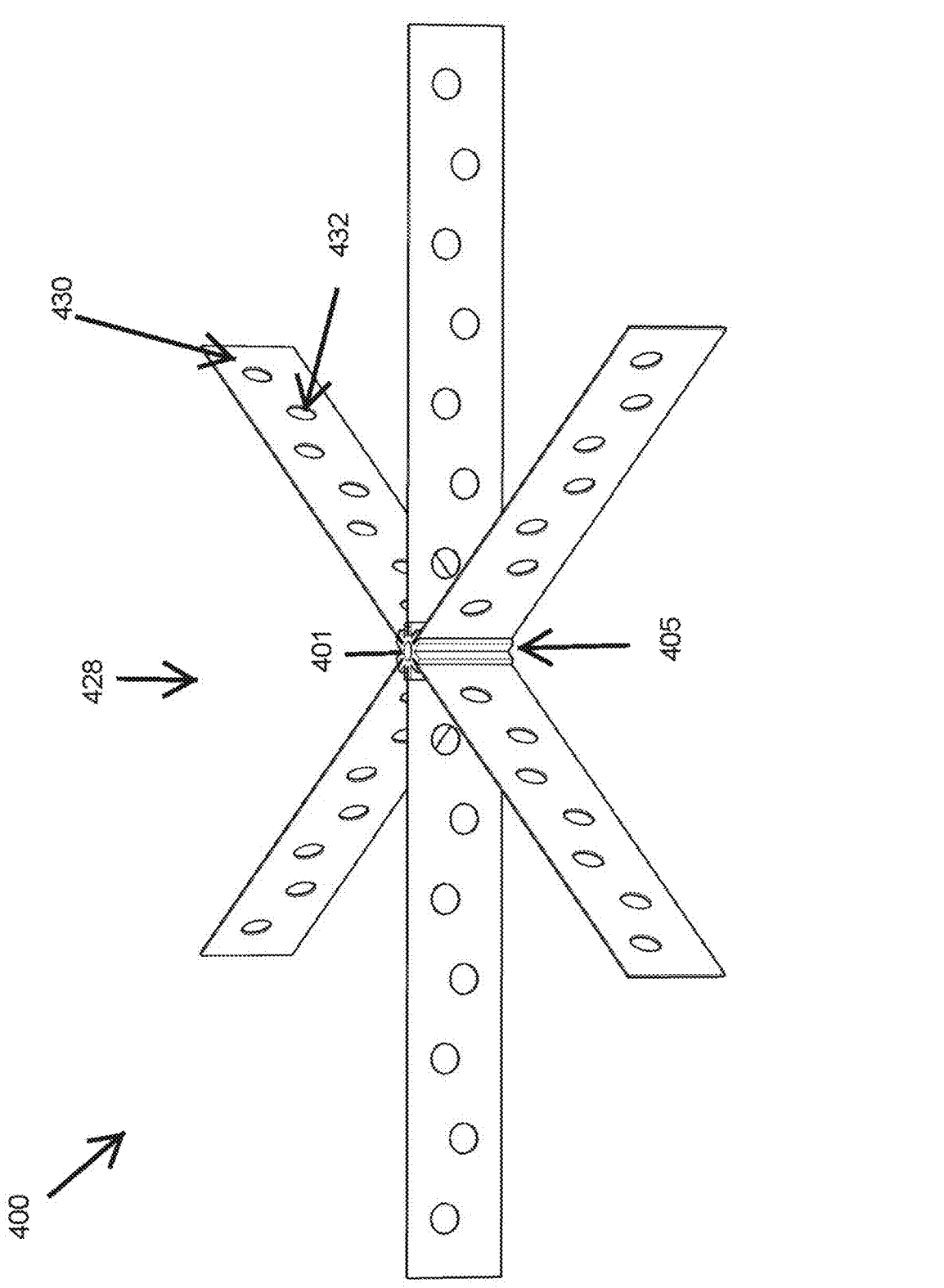
FIG. 12 is a view of a protrusion of an embodiment of the disclosure.
Figure 13A:
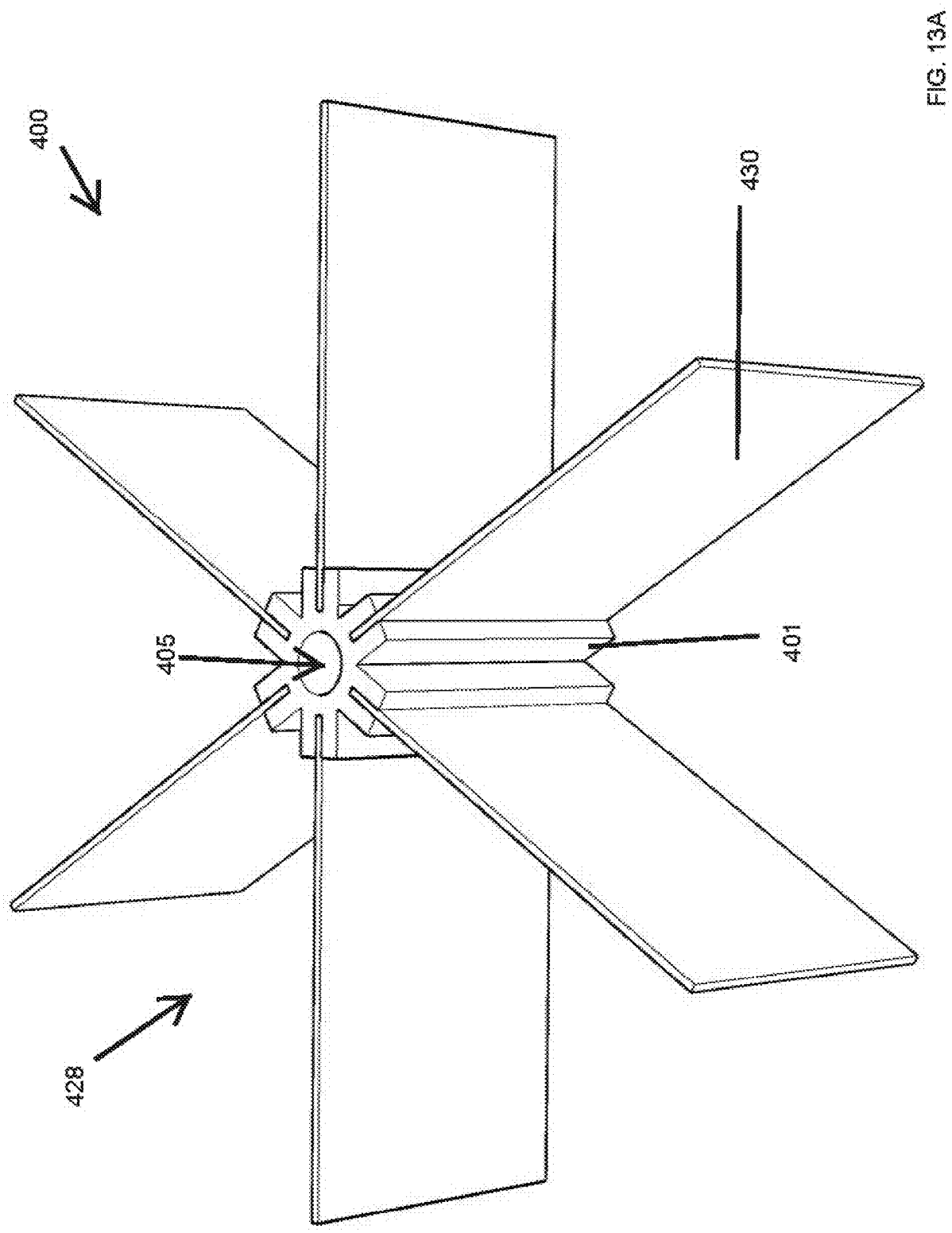
FIGS. 13A-13E are views of protrusions of embodiments of the disclosure.

Two more views of the protrusion 428 are shown in FIGS. 12 and 13A-13D. FIG. 12 is a view of the protrusion 428 with the plate holder 401 including six plates 430, one plate in each plate channel 407. In the embodiment of FIG. 12, each of the plates 430 includes a plurality of through holes 432. In the embodiment of FIG. 13A, another view of the protrusion 428 with the plate holder 401 including six plates 430, one plate in each plate channel 407, is shown. In the embodiment of FIG. 13A, each of the plates 430 does not include any through holes.

Figure 13B:
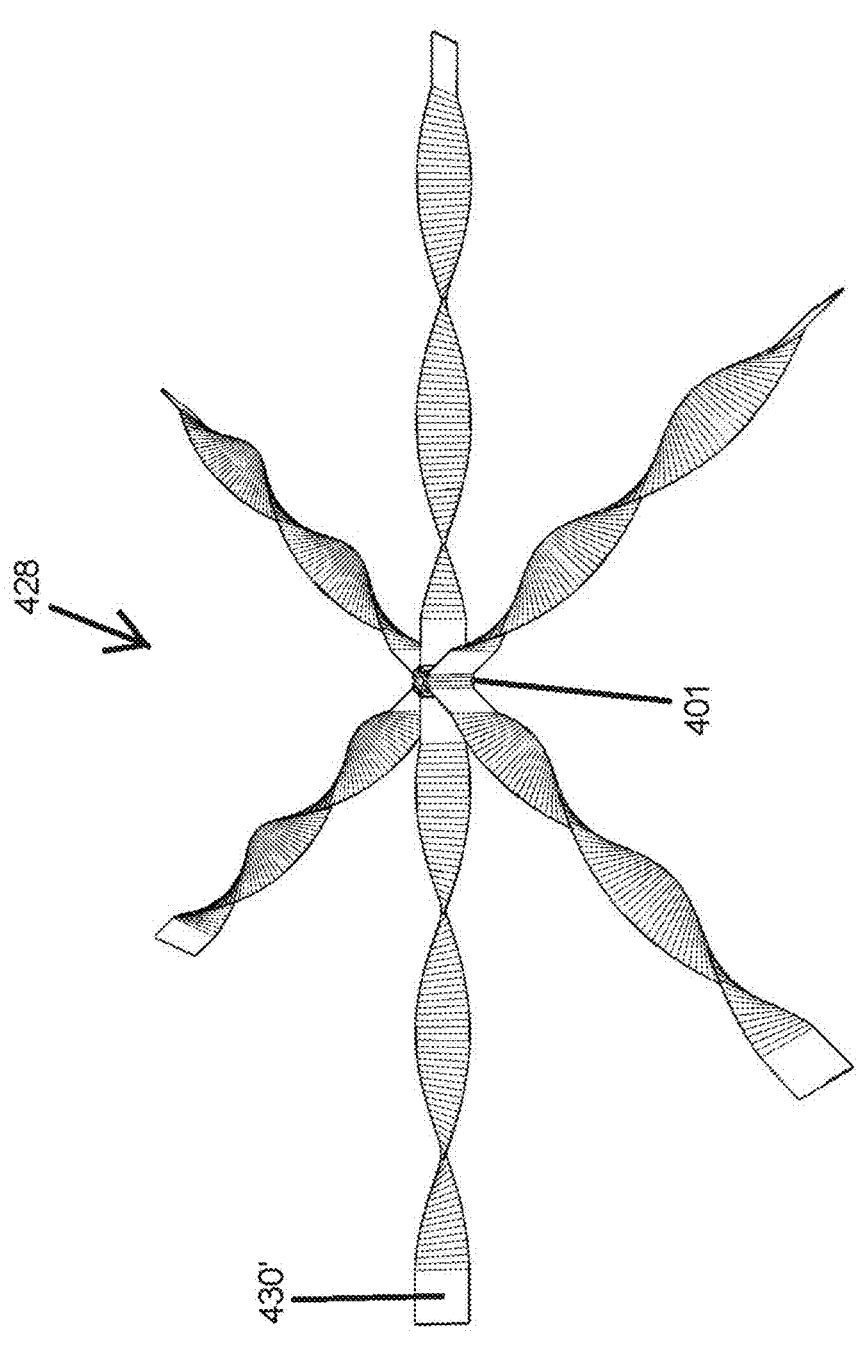

In the embodiment of FIG. 13B, each of the plates 430' is contorted into a spiraled, or twisted configuration. In the embodiment of FIG. 13B each of the plates 430' are contorted along an axis that is substantially parallel to the shaft cavity 405 of the plate holder 401. In the embodiment of FIG. 13B, each of the plates 430' does not include any through holes, however, in other embodiments, one or more of the plates 430' could include through hole(s).

Figure 13C:
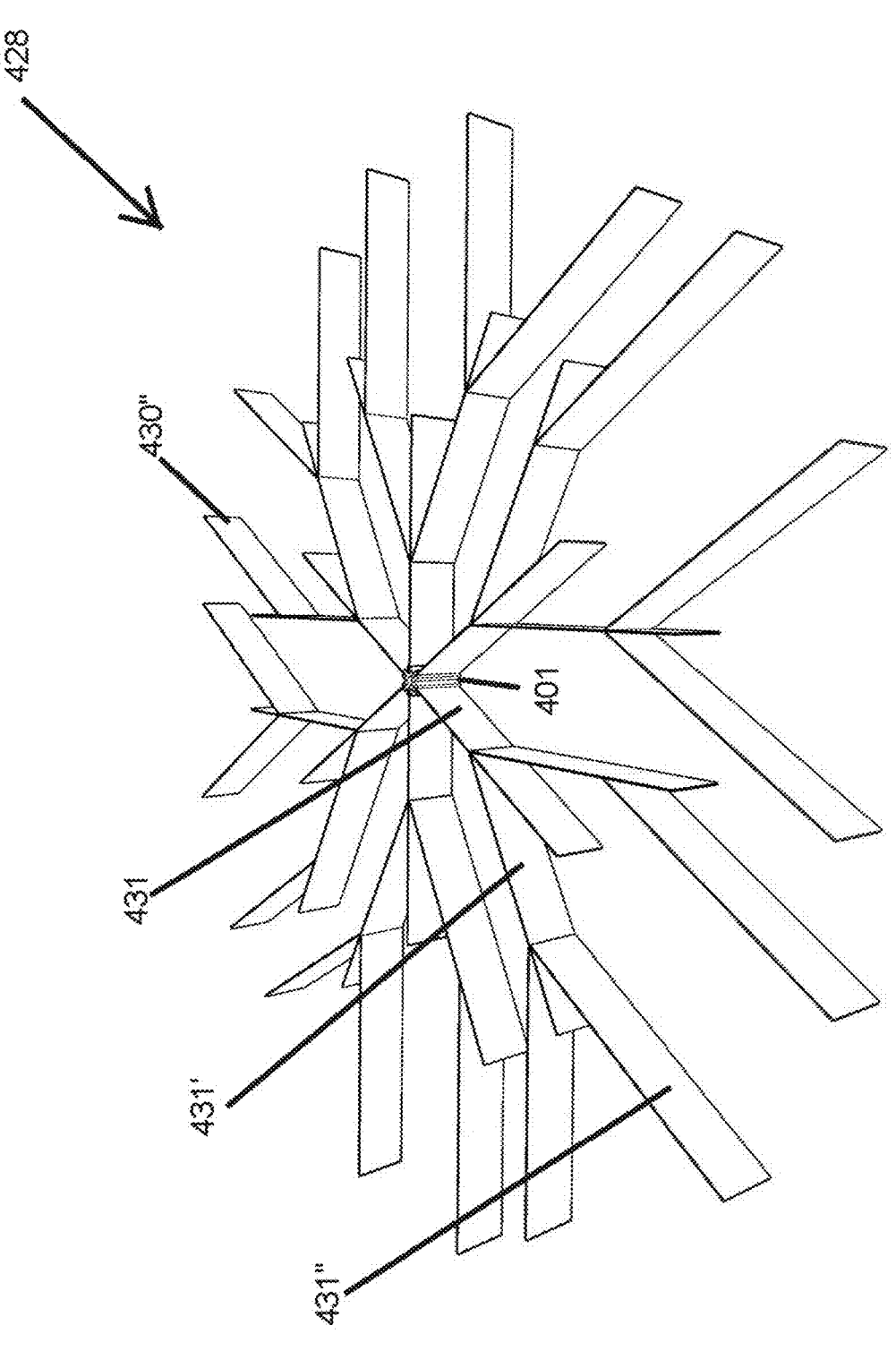

In the embodiment of FIG. 13C, each of the plates 430" is a fractal structure with a main branch 431 attached to the plate holder 401, with each main branch 431 having one or more sub branches 431', with those sub branches 431' having one or more sub, sub branches 431". Those of skill in the art understand that further branches can be possible for each of plates 430". In the embodiment of FIG. 13C, each of the plates 430" does not include any through holes, however, in other embodiments, one or more of the plates 430" could include through hole(s).

Figure 13D:
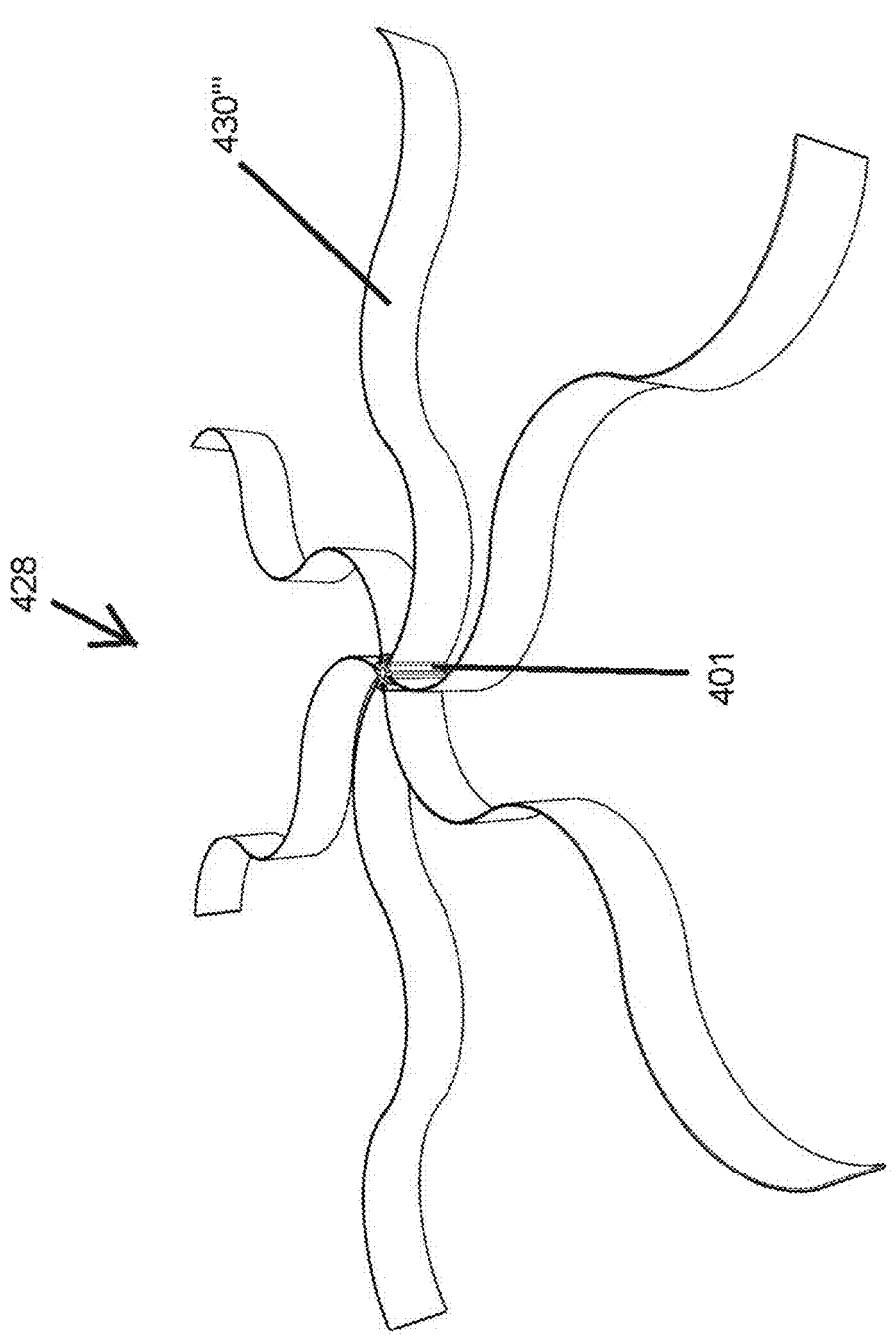

In the embodiment of FIG. 13D, each of the plates 430''' is in a curvilinear configuration, with any suitable radius of curvature being possible for any portion of each of the plates 430'''. In the embodiment of FIG. 13D each of the plates 430''' curves to each side of an axis that is substantially parallel to the shaft cavity 405 of the plate holder 401. In the embodiment of FIG. 13D, each of the plates 430''' does not include any through holes, however, in other embodiments, one or more of the plates 430''' could include through hole(s).

Each plate holder 401 can be any suitable dimension, thus, the shaft cavity 405 can be any suitable size and shape to accommodate any suitably sized and shaped shaft 420. Additionally, each plate holder 401 can be any suitable dimension, thus, a height of the plate holder 401, and dimensions of the plate channel 407, can be modified to accommodate any plate 430 of any suitable thickness and width.

Figure 13E:
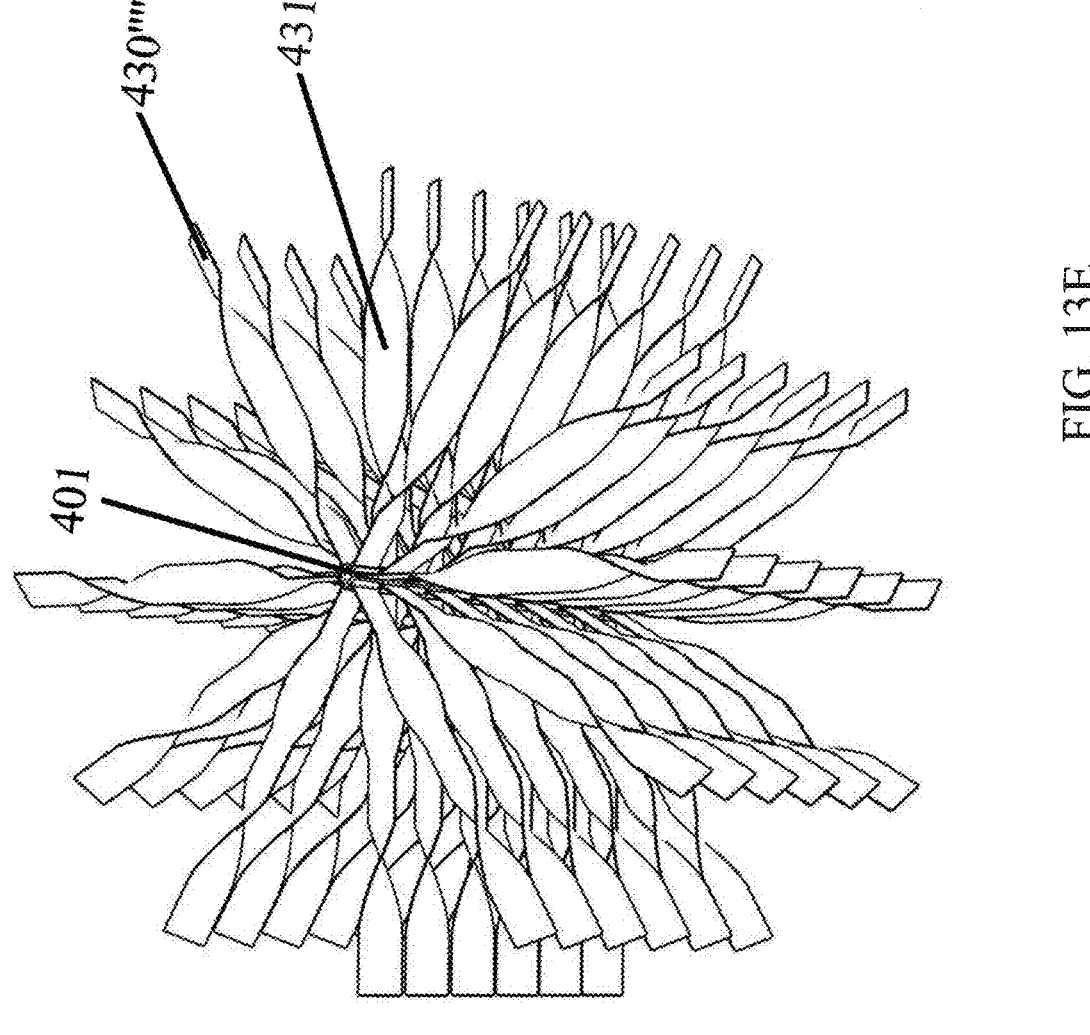

In the embodiment of FIG. 13E, each of the plates 430"" each of the plates 430' is contorted into a spiraled, or twisted configuration. In the embodiment of FIG. 13E each of the plates 430"" are contorted along an axis that is substantially parallel to the shaft cavity 405 of the plate holder 401. In the embodiment of FIG. 13E, each of the plates 430"" does not include any through holes, however, in other embodiments, one or more of the plates 430"" could include through hole(s).

Each of the plates 430"" includes a substantially flat portion 431, which is substantially perpendicular to the axis of the shaft. The substantially flat portion 431 can modulate water energy as water passes around the substantially flat portion 431. Alternatively, or in addition to the modulation of water energy, as water passes the substantially flat portion 431, the plate 430"" may flex and or vibrate up and/or down due to contact from the water.

Figure 14:
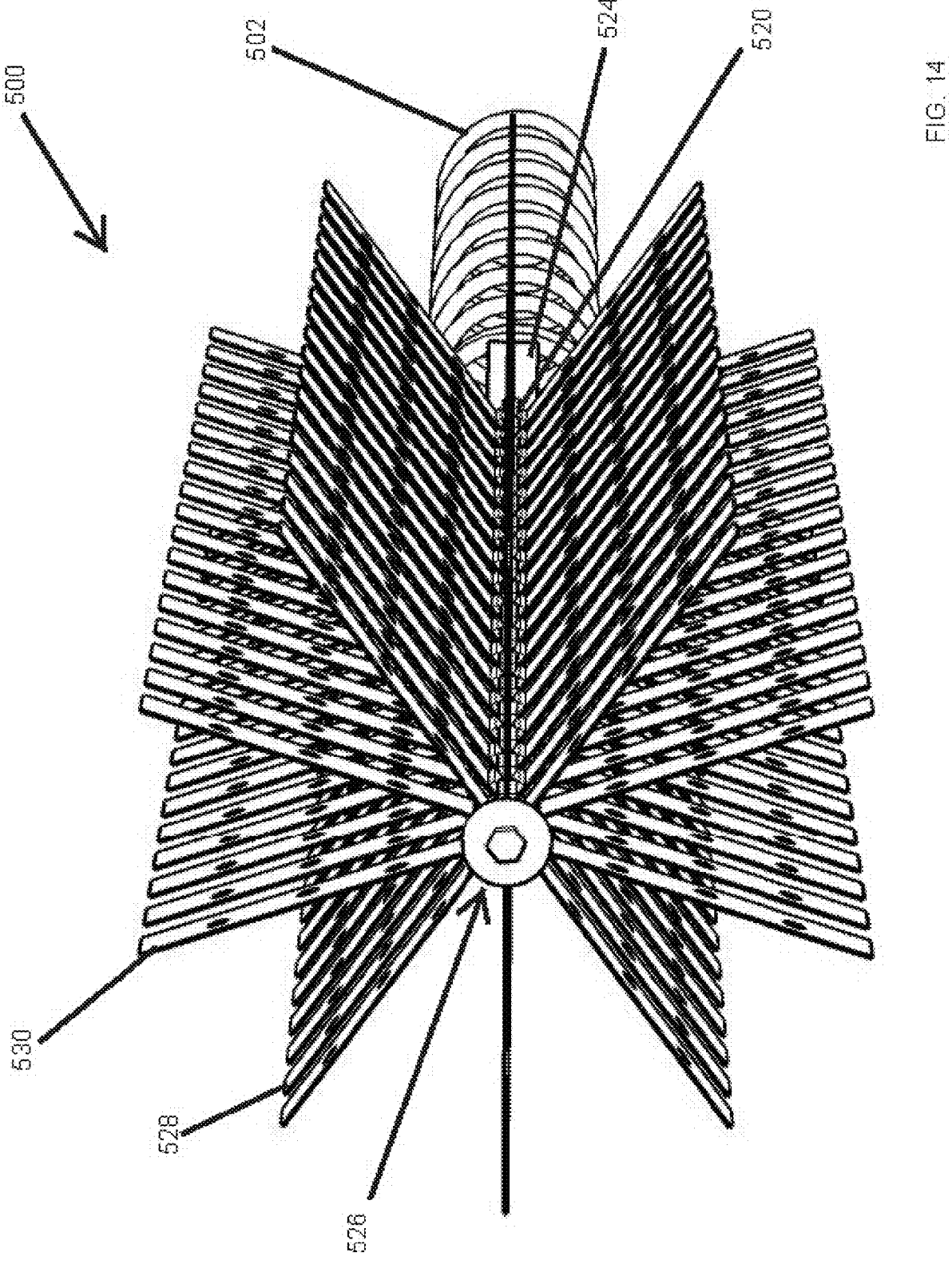
FIG. 14 is a perspective view of an embodiment of the disclosure.

Another embodiment of a device, device 500 is shown in FIG. 14.

Elements shown in FIG. 14 are comparable to those of FIGS. 1, 5, 9, and 10, with the first digit in this embodiment being 5 rather than 1 in the device 100 embodiment, 2 in the device 200 embodiment, 3 in the device 300 embodiment, or 4 in the device 400 embodiment. For example, the corkscrew 102 of the device 100 is comparable, in formation and composition, to the corkscrew 502 of the device 500 embodiment. Thus, all reference numbers with the last two numbers being the same between device 500, device 400, device 300, device 200 and the device 100 are comparable, or the same, in formation and composition.

In FIG. 14, the device 500 is shown, from a perspective of a second end 526 of a shaft 520. In this embodiment the shaft 520 extends from the second end 526, and is operably attached to the substantially planar disc 524.

In this embodiment, a plurality of protrusions 528 are shown, with each plate 530 extending from a plate holder 501.

Figure 15:
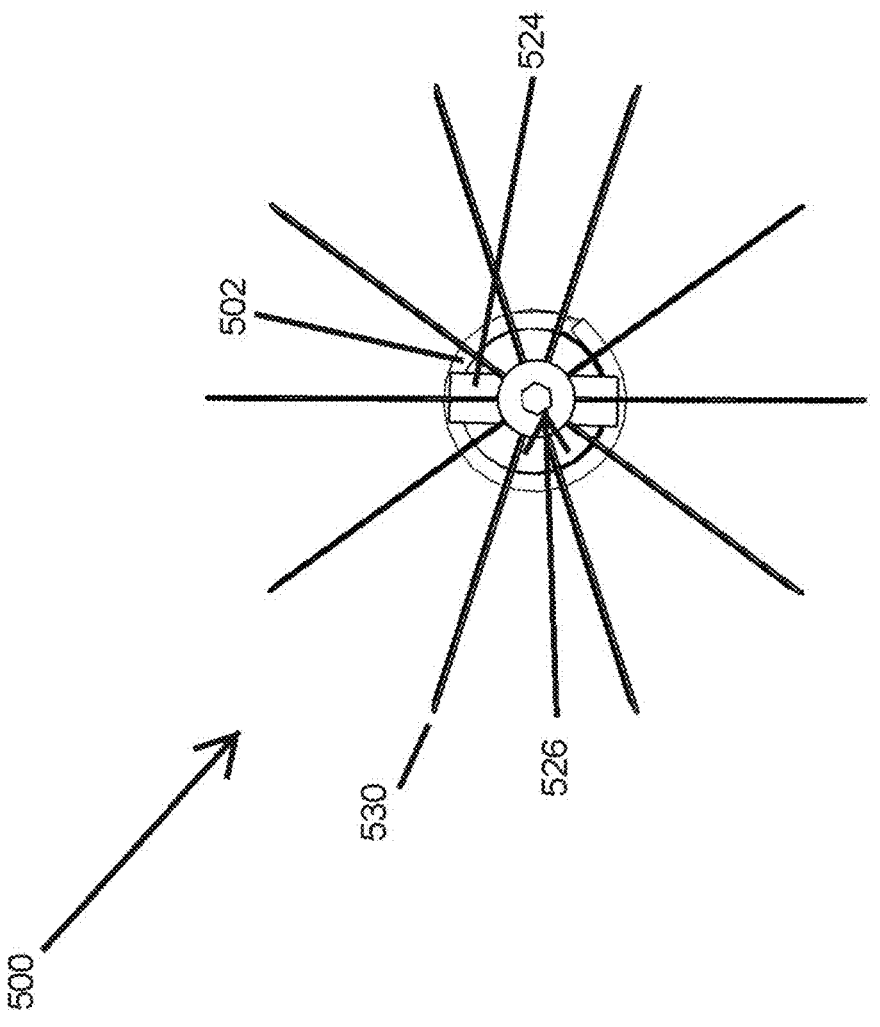
FIG. 15 is a top view of an embodiment of the disclosure.
Figure 16:
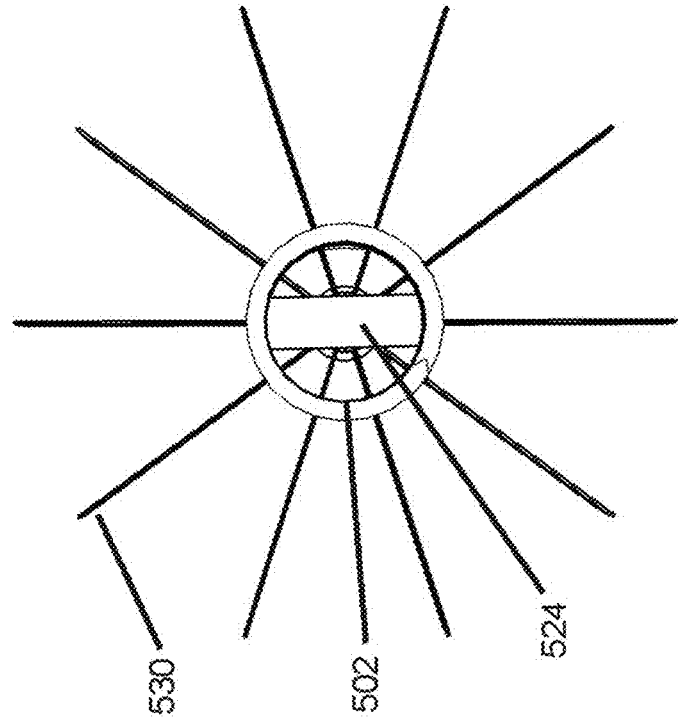
FIG. 16 is a bottom view of an embodiment of the disclosure.

FIG. 15 is a top view of device 500, from the perspective of being vertically above the second end 526 of the corkscrew 502. FIG. 16 is an under view of device 500, from the perspective from being vertically below the bottom of the corkscrew 502.

Figure 17:
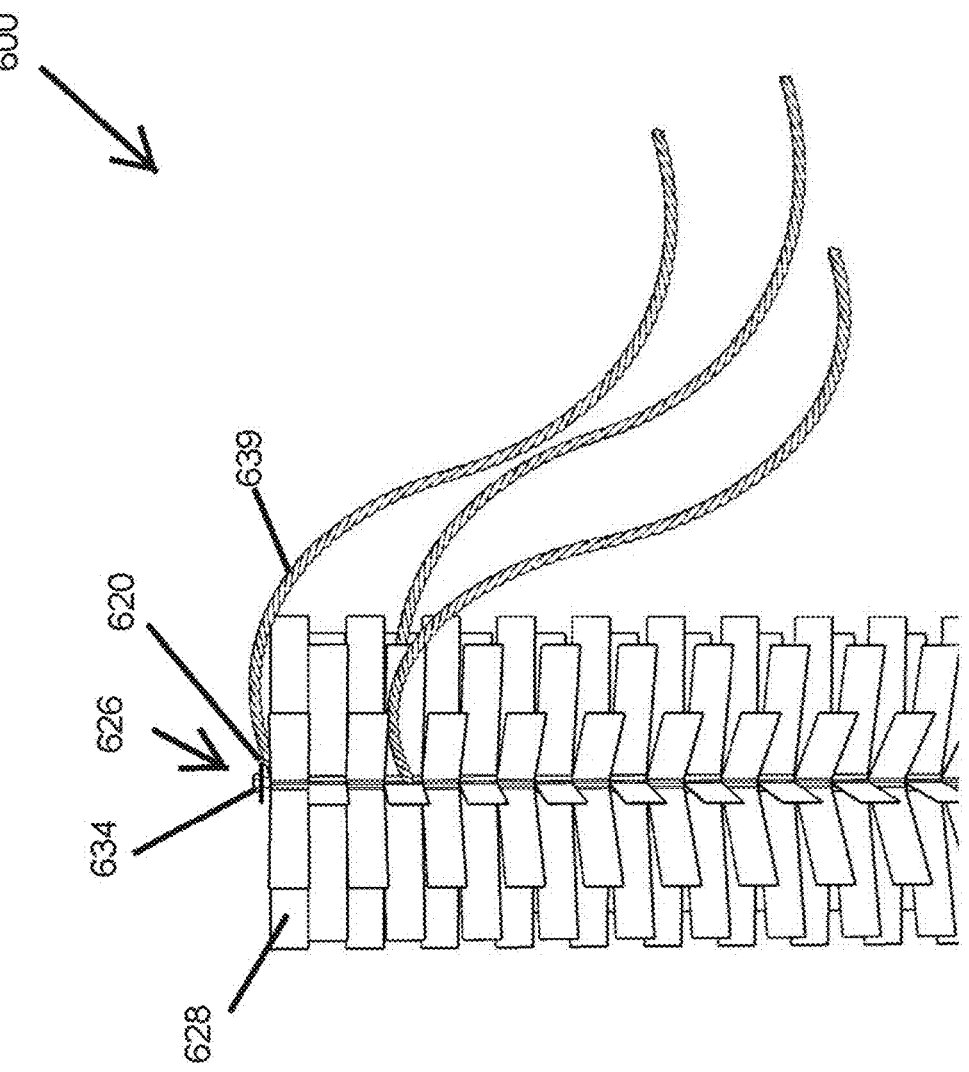
FIG. 17 is a view of a portion of an embodiment of the disclosure.

Elements shown in FIG. 17 are comparable to those of FIGS. 1, 5, 9, 10, and 14, with the first digit in this embodiment being 6 rather than 1 in the device 100 embodiment, 2 in the device 200 embodiment, 3 in the device 300 embodiment, 4 in the device 400 embodiment, or 5 in the device 500 embodiment. For example, the protrusion 128 of the device 100 is comparable, in formation and composition, to the protrusion 628 of the device 600 embodiment. Thus, all reference numbers with the last two numbers being the same between device 600, device 500, device 400, device 300, device 200 and the device 100 are comparable, or the same, in formation and composition.

In this embodiment a cord 639 is operably attached to a shaft 620 of the device 600. The cord 639 can be operably attached so as to rotate clockwise around the shaft 620, rotate counter-clockwise around the shaft 620, rotate both clockwise and counter-clockwise around the shaft 620, or be fixed to the shaft 620 without rotation. In this embodiment two cords 639 are shown, but in other embodiments, one cord, three cords or more can be interspersed at any suitable location along the shaft 620.

Each cord 639 can be formed of any synthetic and/or natural material, and can be a single length of material or several lengths of material braided and/or joined together. For example, each cord 639 can be formed of one or more lengths of flexible or substantially inflexible material such as man-made and/or natural material, such as but not limited to, rope, cable, thread, wire, string, chain, twisted twine, twisted mason line, synthetic fibers, fishing line, sisal, coconut fiber, and combinations thereof.

Each cord 639 can extend a predetermined distance from the shaft 620 with each cord 639 being substantially the same length as other cords, and/or each cord being a different length from other cords.

Figure 18:
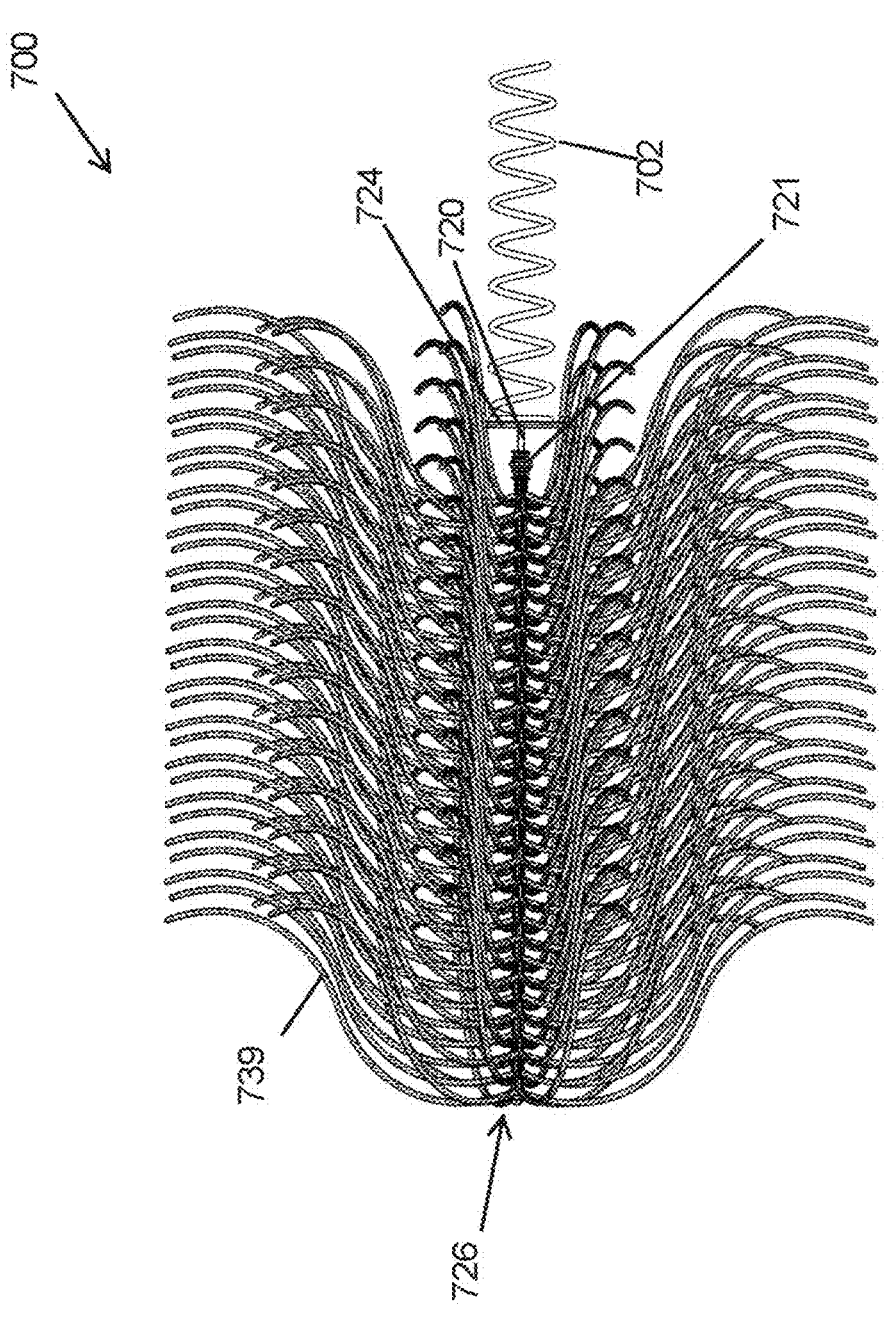
FIG. 18 is a front view of an embodiment of the disclosure.

Elements shown in FIG. 18 are comparable to those of FIGS. 1, 5, 9, 10, 14, and 17 with the first digit in this embodiment being 7 rather than 1 in the device 100 embodiment, 2 in the device 200 embodiment, 3 in the device 300 embodiment, 4 in the device 400 embodiment, 5 in the device 500 embodiment or 6 in the device 600 embodiment. For example, the corkscrew 102 of the device 100 is comparable, in formation and composition, to the corkscrew 702 of the device 700 embodiment. Thus, all reference numbers with the last two numbers being the same between device 700, device 600, device 500, device 400, device 300, device 200 and the device 100 are comparable, or the same, in formation and composition.

In the embodiment of FIG. 18, a plurality of cords 739 act as protrusions that extend from the shaft 720. In this embodiment there are several vertical layers that extend along substantially the entire length of the shaft 720, but in other embodiments, the plurality of cords 739 can extend along a portion of the shaft 720, with other portions of the shaft 720 having no protrusions, or protrusions similar to those of FIGS. 1-17.

Additionally, each cord 739 can extend a predetermined distance from the shaft 720 with each cord 739 being substantially the same length as other cords, and/or each cord being a different length from other cords.

Figure 19:
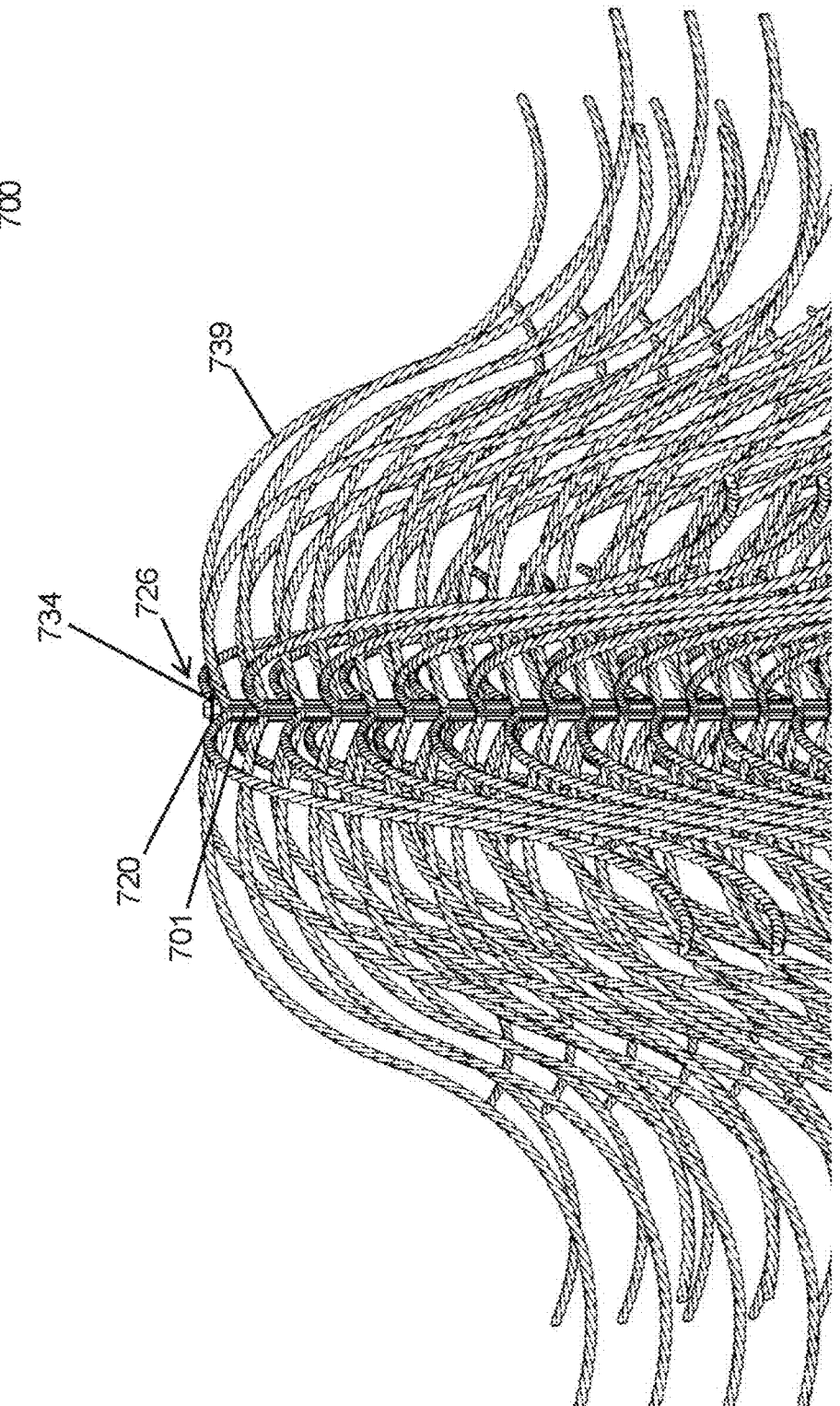
FIG. 19 is a view of a portion of an embodiment of the disclosure.

In this embodiment each of the plurality of cords 739 are operably attached to a shaft 720 of the device 700 (shown in more detail in FIG. 19). Each of the plurality of cords 739 can be operably attached so as to rotate clockwise around the shaft 720, rotate counter-clockwise around the shaft 720, rotate both clockwise and counter-clockwise around the shaft 720, or be fixed to the shaft 720 without rotation.

A magnified view of device 700 is shown in FIG. 19. In FIG. 19 it can be seen that each of the plurality of cords is attached to a cord holder 701. The cord holder 701 in this embodiment has six cords 739 operably attached to it, but, in other embodiments, each cord holder 701 can have one cord, two cords, three cords, four cords, five cords, seven cords or more. Additionally, each layer of the plurality of cords 739 is created by those cords attached to the cord holder 701, with about seventeen "layers" of cord holder 701 viewable in FIG. 19.

Figure 20:
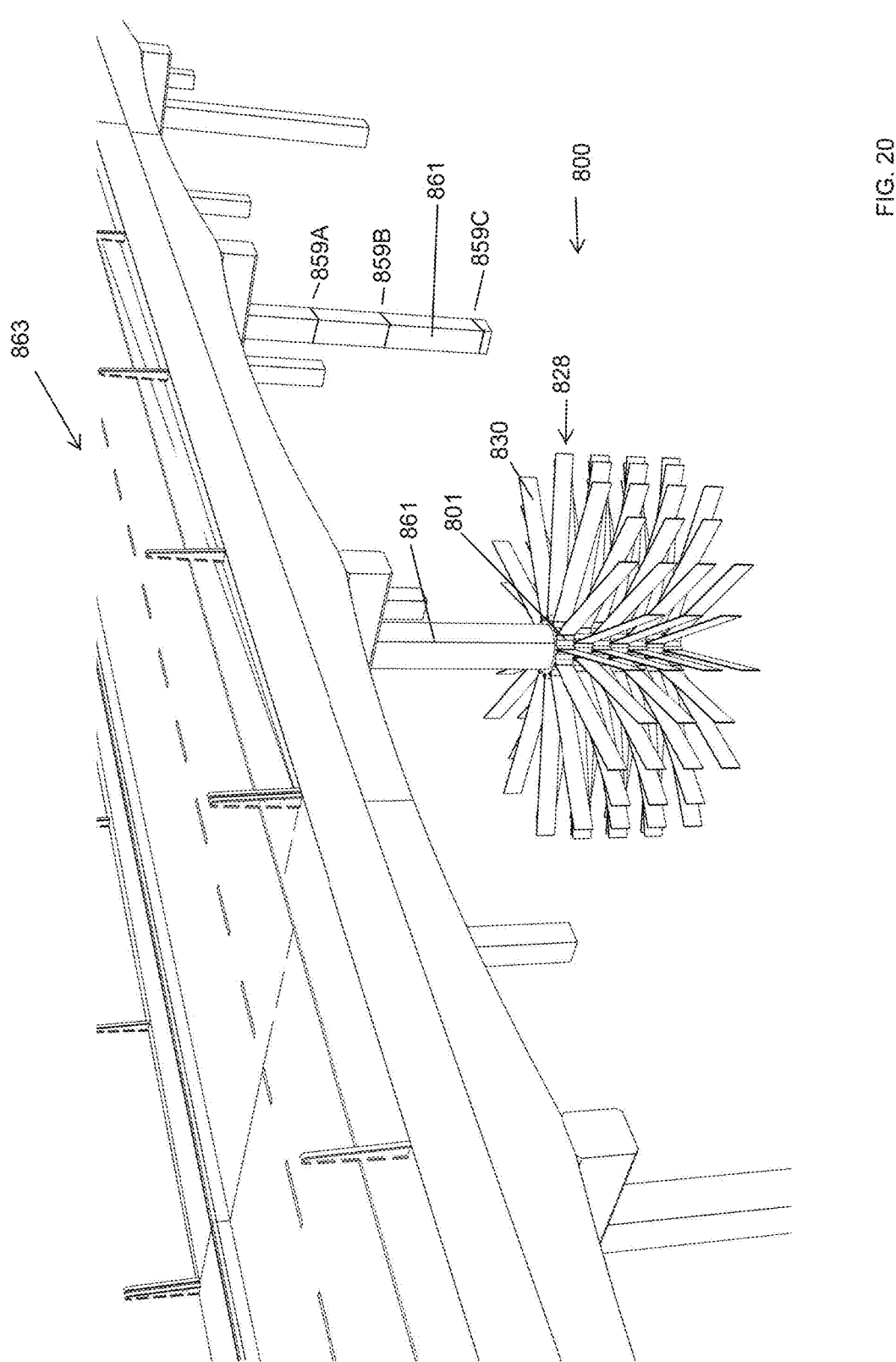
FIG. 20 is a perspective view of an embodiment of the disclosure.

Elements shown in FIG. 20 are comparable to those of FIGS. 1, 5, 9, 10, 14, 17, and 18 with the first digit in this embodiment being 8 rather than 1 in the device 100 embodiment, 2 in the device 200 embodiment, 3 in the device 300 embodiment, 4 in the device 400 embodiment, 5 in the device 500 embodiment, 6 in the device 600 embodiment or 7 in the device 700 embodiment. For example, the plate 130 of the device 100 is comparable, in formation and composition, to the plate 830 of the device 800 embodiment. Thus, all reference numbers with the last two numbers being the same between device 800, device 700, device 600, device 500, device 400, device 300, device 200 and the device 100 are comparable, or the same, in formation and composition.

In the embodiment of FIG. 20, rather than a plurality of protrusions 828 being secured to a shaft with a corkscrew, or other anchoring mechanism, the plurality of protrusions of device 800 are operably attached to a structural shaft 861. This structural shaft 861 can be any device that supports a structure over a body of water. In this embodiment, as one example, a roadway bridge 863 is supported by the structural shaft 861. Although not shown, the structural shaft 861 is configured to be totally submerged or partially submerged within a water body, such as a stream, river, creek, channel, lake, or any portion of any ocean, pond, lake, etc. As an example, the water level of that water body could be at any level represented by dashed lines 859A, 859B, 859C, or any other portion of the adjacent structural shaft 861.

The structural shaft 861 can be any suitable cross sectional shape such as a circle, triangle, rectangle, square, ellipse, pentagon, star, cross six or more sided polygon, or an erratic shape. The plate holder 801 can be a corresponding shape, with each plate holder 801 able to be secured to a plate holder 801 vertically above and/or below it. Additionally, each plate holder 801 can rotate clockwise around the shaft structural shaft 861, rotate counter-clockwise around the structural shaft 861, rotate both clockwise and counter-clockwise around the structural shaft 861, or be fixed to the structural shaft 861 without rotation. In the embodiment of FIG. 20 seven plate holders 801 can be seen, but in other embodiments, one, two, three, four, five, six, eight or more plate holders 801 can be placed on various portions of the structural shaft 861.

Figure 21:
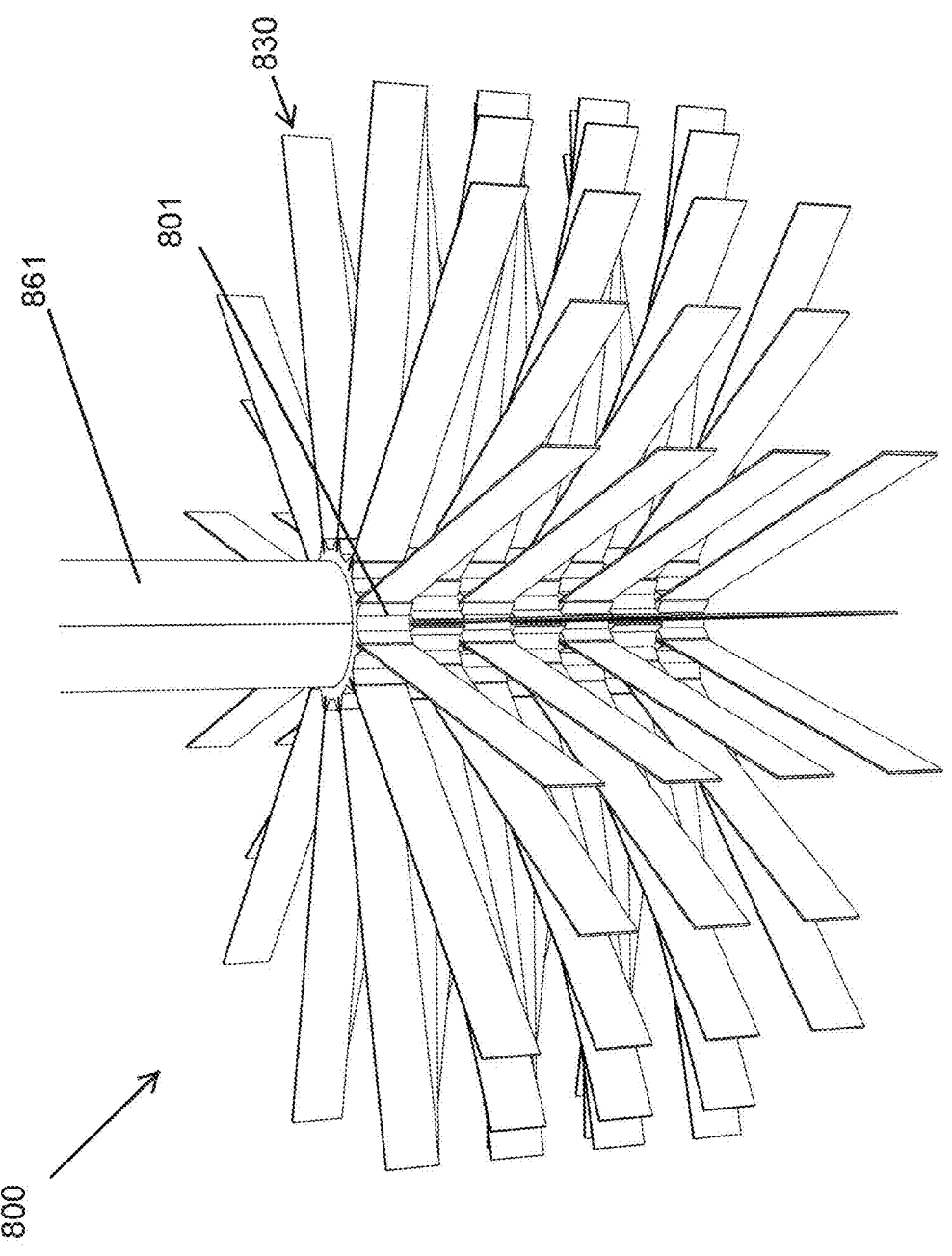
FIG. 21 is a perspective view of an embodiment of the disclosure.

A magnified view of FIG. 20 is shown in FIG. 21. In FIG. 21 each of the plate holders 801 is configured to hold twenty four plates 830. However, in other embodiments, each plate holder 801 can be configured to hold between one and twenty three plates, or twenty five plates or more.

Figure 22:
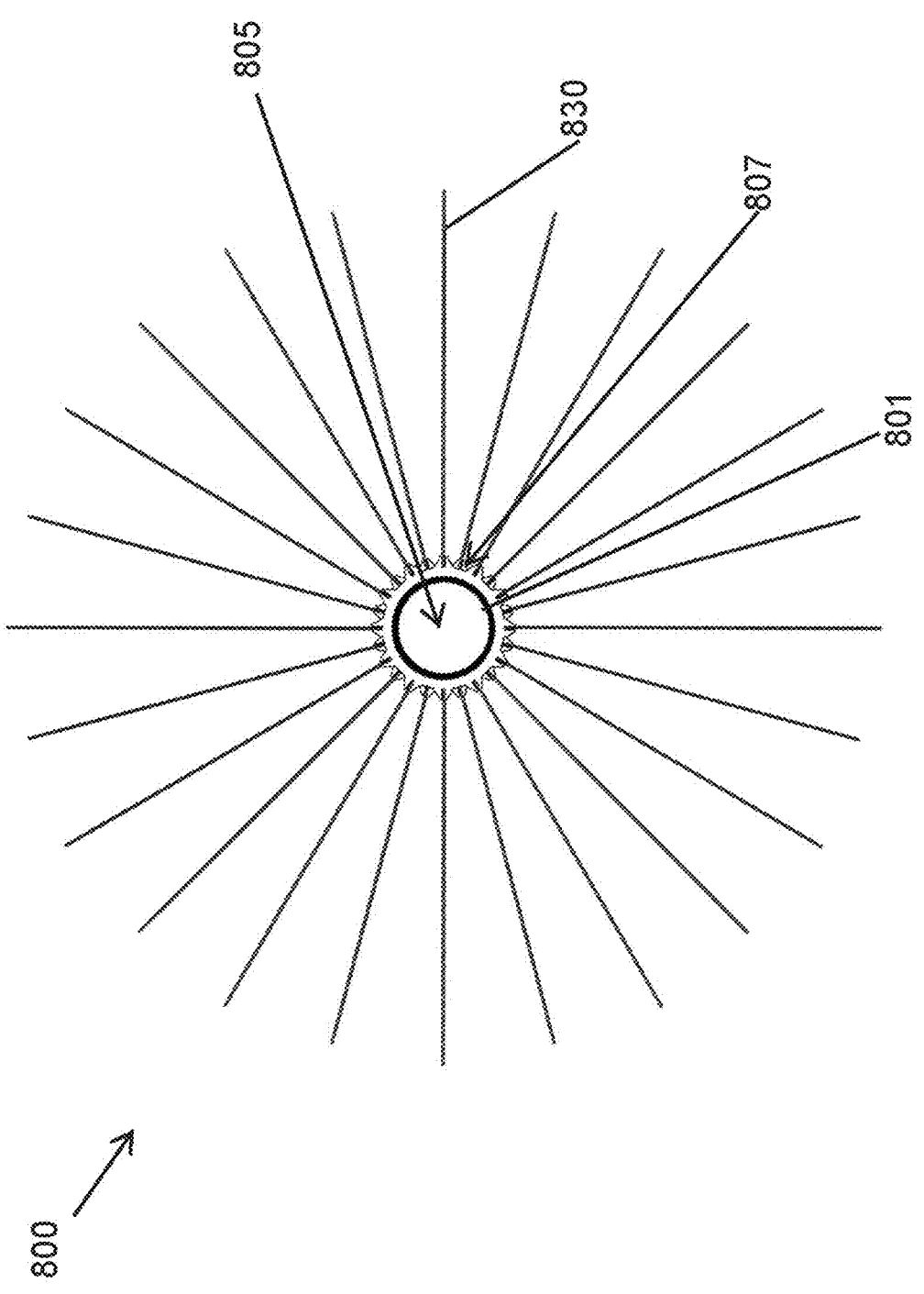
FIG. 22 is a top view of an embodiment of the disclosure.

A top view of FIG. 21 is shown in FIG. 22, with the structural shaft 861 removed for explanation purposes. As can be seen in FIG. 22, each of the plates 830 is operably attached to the plate holder 801 at a plate channel 807, with, in this embodiment, a shaft cavity 405 being shown in a substantially circular cross section.

Figure 23:
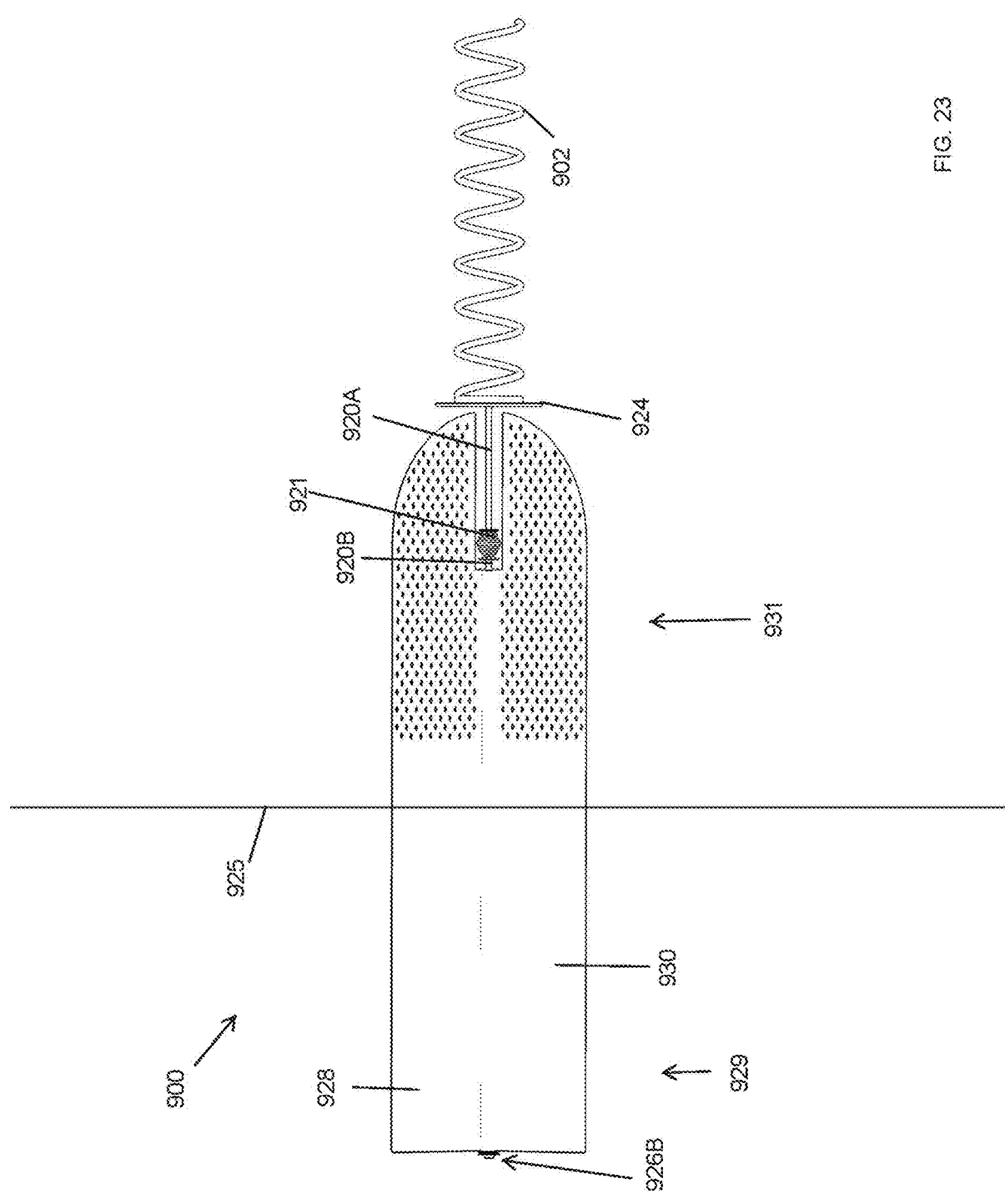
FIG. 23 is a front view of an embodiment of the disclosure.

Elements shown in FIG. 23 are comparable to those of FIGS. 1, 5, 9, 10, 14, 17, 18 and 20 with the first digit in this embodiment being 9 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment or 8 in the device 800 embodiment. For example, the corkscrew 102 of the device 100 is comparable, in formation and composition, to the corkscrew 902 of the device 900 embodiment. Thus, all reference numbers with the last two numbers being the same between device 900, device 800, device 700, device 600, device 500, device 400, device 300, device 200 and the device 100 are comparable, or the same, in formation and composition.

Figure 25:
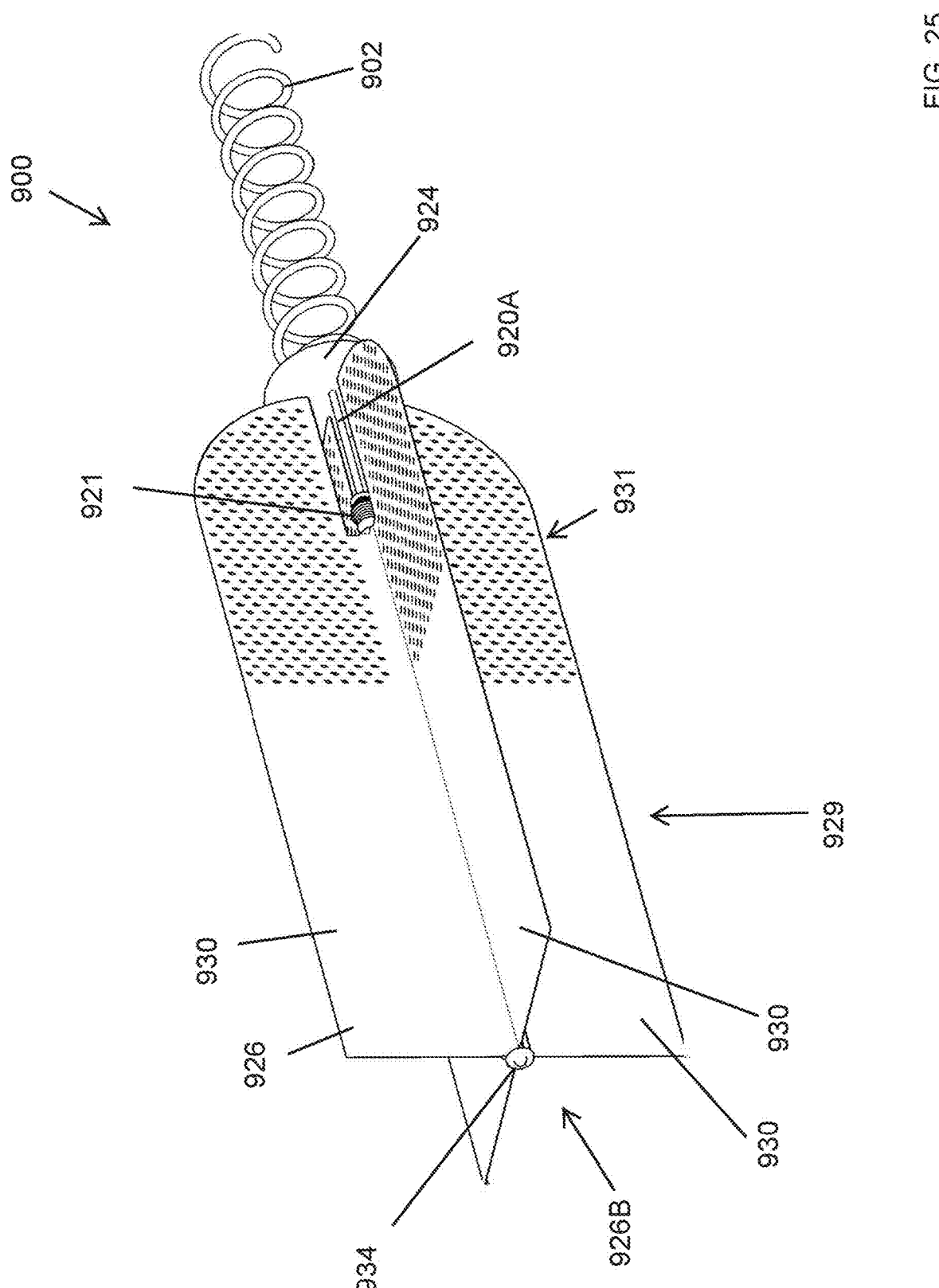
FIG. 25 is a perspective view of an embodiment of the disclosure.

In the embodiment of FIG. 23, a protrusion 928 is shown, with the protrusion 928 including four plates 930. A perspective view is shown in FIG. 25 for a further view of the plates 930. In this embodiment protrusion 928 includes four plates 930, but in other embodiments, protrusion 928 can include one plate, two plates, three plates, five plates, or more.

In the configuration of the device 900 shown in FIG. 23, the protrusion 928 is in a floating configuration due to (i) a water level 925 being sufficiently high on the surface of the protrusion 928 (away from the substantially planar disc 924) to cause the protrusion 928 to be sufficiently buoyant, (ii) water at the water level 925 moving at or below a speed threshold, and/or (iii) the force of the barrel spring 921 being sufficient to maintain the protrusion 928 in the configuration shown in FIG. 23. In this embodiment the protrusion 928 can be operably attached/connected along at least a majority of a length of an upper shaft 920B, with the upper shaft 920B operably attached to a barrel spring 921. The barrel spring 921 is also operably attached to the lower shaft 220A, which is operably attached to the substantially planar disc 924. The substantially planar disc 924 is in turn operably attached to corkscrew 902.

In this embodiment, each of the plates 930 are attached to each other to form the protrusion 928, with space between the four plates to contain the upper shaft 920B, which extends from the barrel spring 921 towards a first end 926B. However, in other embodiments, a plate holder can include a shaft cavity and plate channels to operably attach each of the plates to the plate holder.

In this embodiment, each of the plates 930 include a through hole area 931 and a solid area 929. The size of the through hole area 931, the size of the through holes themselves and pattern of the through holes themselves can be modified to suit any suitable outcome for a specific environmental condition or for a specific desired outcome of use of device 900.

In this embodiment the protrusion 928 is operably attached to the shaft 920B. The protrusion 930 can be operably attached so as to rotate clockwise around the shaft 920B, rotate counter-clockwise around the shaft 920B, rotate both clockwise and counter-clockwise around the shaft 920B, or be fixed to the shaft 920B without rotation.

In the floating configuration of FIG. 23, which typically occurs when water movement is below a speed threshold, device 900 contacts water and sediment within that water, and the device 900 acts to impede sediment in the water, causing an increase in sedimentation in the vicinity of the device 900.

Figure 24:
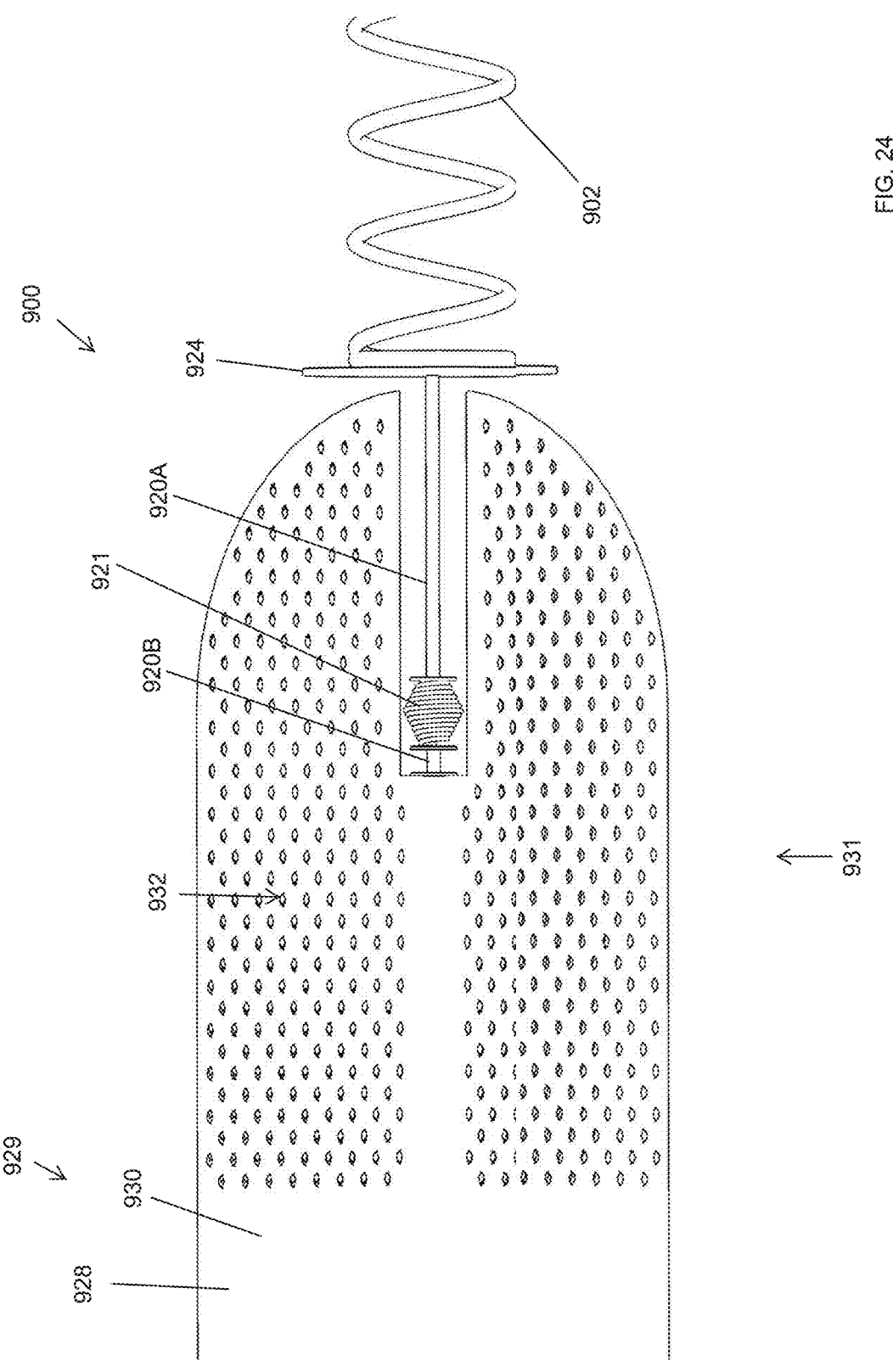
FIG. 24 is a view of a portion of an embodiment of the disclosure.

A magnified view of the device 900 of FIG. 23 is shown in FIG. 24. As seen in FIG. 24, through holes 932 are arranged in a pattern in the through hole area 931.

FIG. 25 provides a perspective view of device 900, in the floating configuration, without a water level being shown. As can be seen in FIG. 25, each of the four plates 928 is substantially perpendicular to a neighboring plate 928, but in other embodiments the angle between plates and the number of plates 928 can be increased or decreased.

Figure 26:
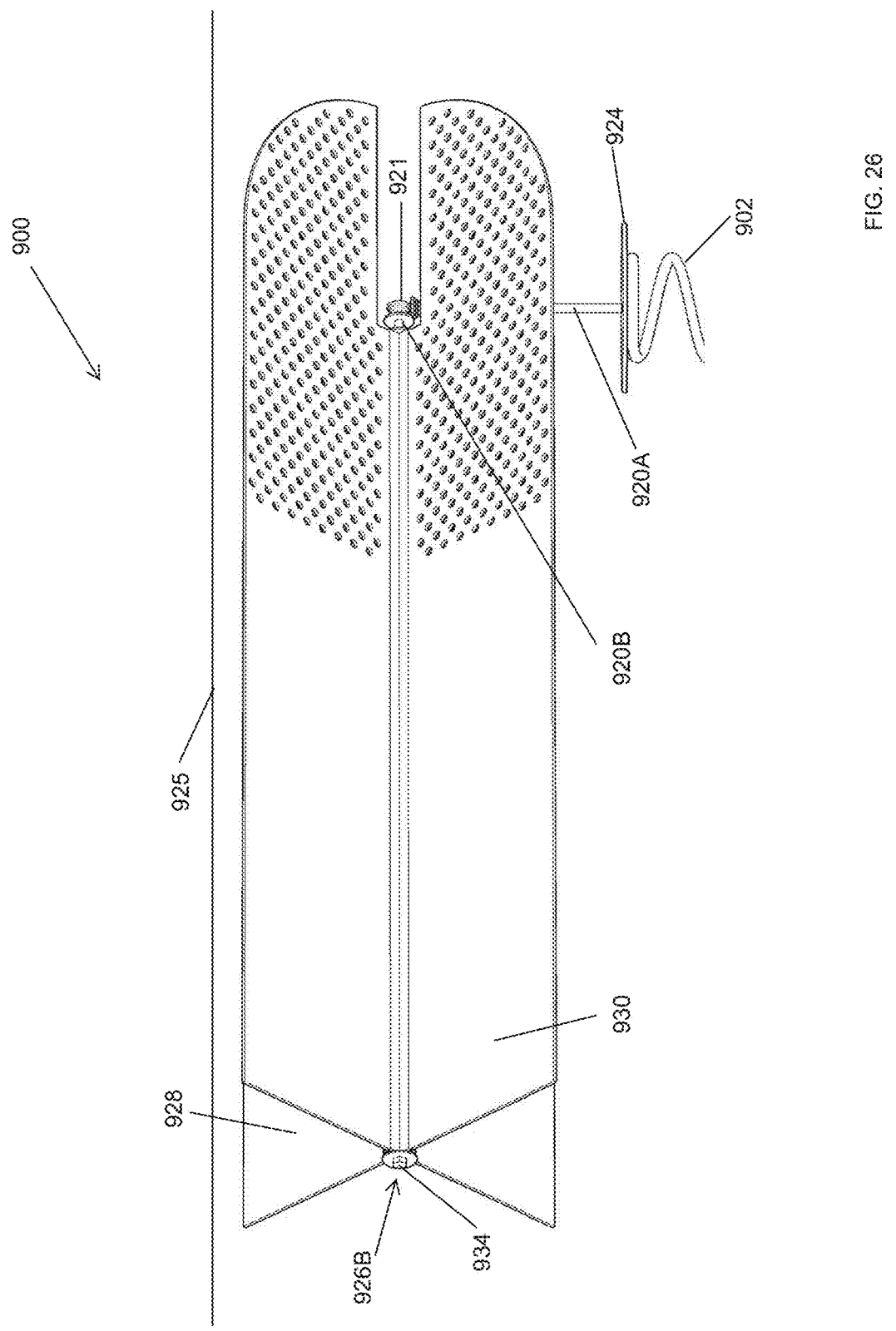
FIG. 26 is a perspective view of an embodiment of the disclosure.

FIG. 26 is a view of the device 900 in a non-floating configuration. In this view, the protrusion 928 is in a non-floating configuration due to (i) a water level 925 being sufficiently low (towards the substantially planar disc 924) on the surface of the protrusion 928 to cause the protrusion 928 to not be sufficiently buoyant, (ii) water around the device 900 moving above a speed threshold, and/or (iii) the force of the barrel spring 921 being insufficient to maintain the protrusion 928 in the configuration shown in FIG. 23.

As can be seen in FIG. 26, the barrel spring 921 has extended and the upper shaft 920B is substantially perpendicular to the lower shaft 920A. However, in other embodiments, any suitable angle can be formed between the upper shaft 920B and the lower shaft 920A. The angle between the upper shaft 920B and the lower shaft 920A during any water or flow situation can be customized by control of (i) the buoyancy of the protrusion 928, and/or (ii) the spring force of the barrel spring 921.

Figure 27:
FIG. 27 is a side view of an embodiment of the disclosure.

A side view of the protrusion 928 in the non-floating configuration is shown in FIG. 27.

Figure 28:
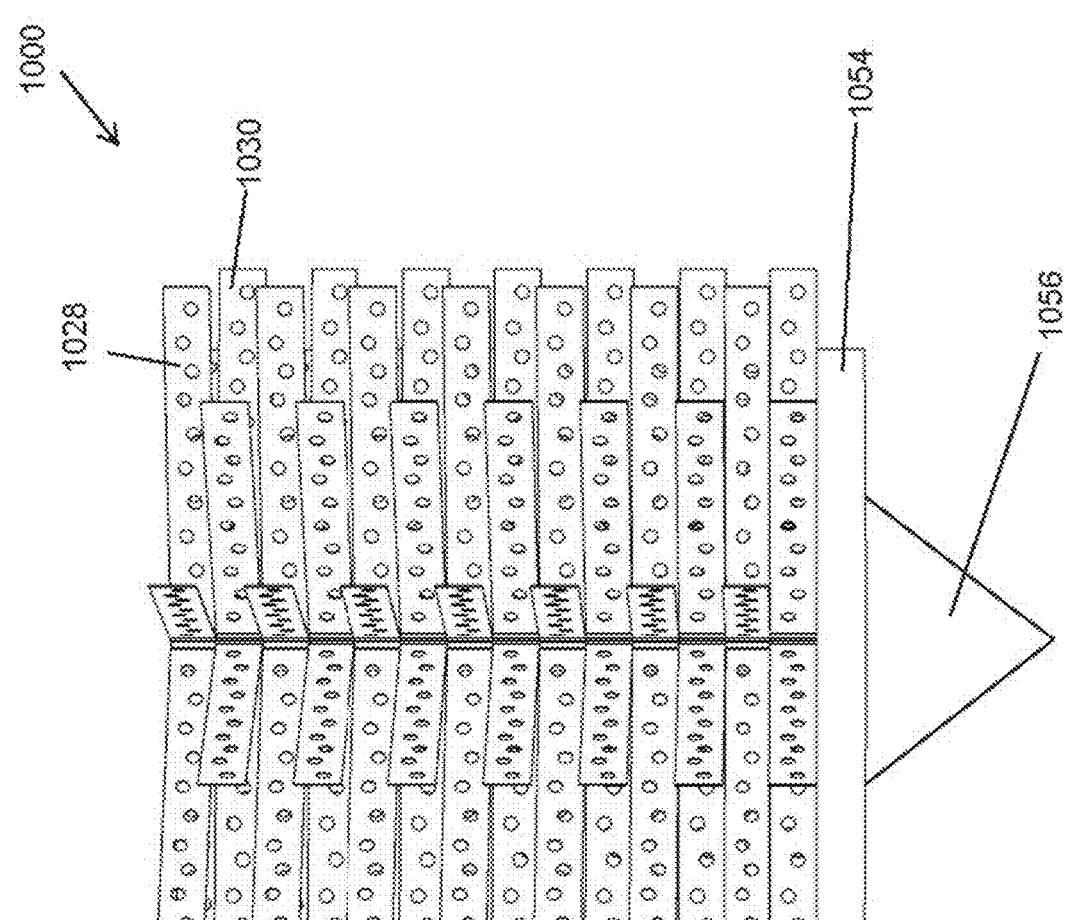
FIG. 28 is a front view of an embodiment of the disclosure.

Elements shown in FIG. 28 are comparable to those of FIGS. 1, 5, 9, 10, 14, 17, 18, 20 and 23 with the first digits in this embodiment being 10 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment or 9 in the 900 embodiment. For example, the protrusion 128 of the device 100 is comparable, in formation and composition, to the protrusion 1028 of the device 1000 embodiment. Thus, all reference numbers with the last two numbers being the same between device 1000, device 900, device 800, device 700, device 600, device 500, device 400, device 300, device 200 and the device 100 are comparable, or the same, in formation and composition.

The device 1000 is shown in FIG. 28. Although not seen, the protrusions 1028 are operably connected to a shaft, with that shaft being operably connected to a substantially planar base 1054. The substantially planar base 1054 is in turn operably attached to an anchor 1056. In some embodiments, substantially planar base 1054 and anchor 1056 are a single, unitary structure. In this embodiment anchor 1056 is shown as being substantially conical, but in other embodiments anchor 1056 can be any suitable shape.

The device 1000 is configured to be placed on a lower surface of a body of water, with the anchor 1056 being configured to penetrate a portion the lower surface and substantially maintain the location of the device on the lower surface. The substantially planar base 1054 is configured to substantially maintain the orientation of the device 1000 by contacting portions of the lower surface.

Figure 29:
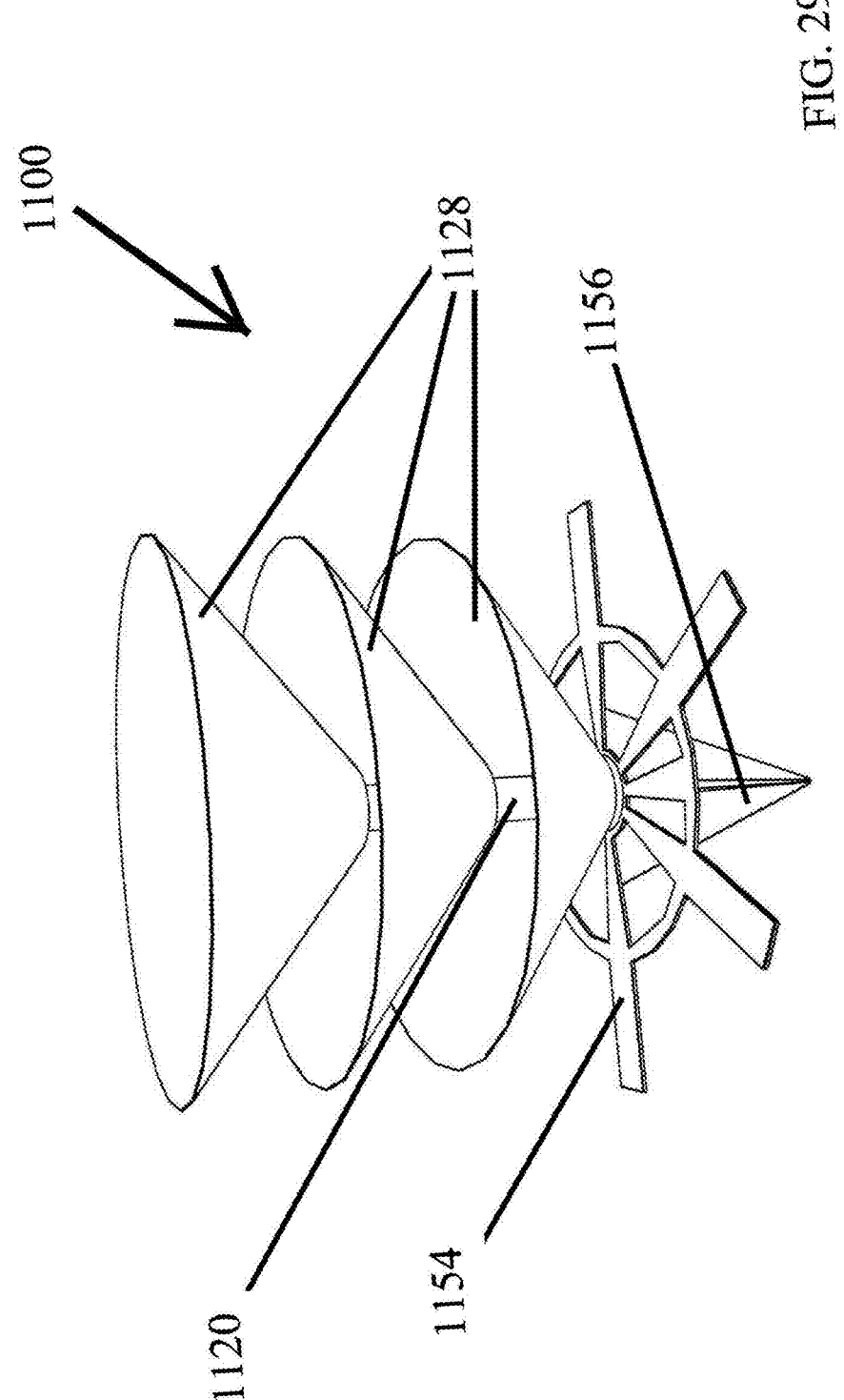
FIG. 29 is a front view of an embodiment of the disclosure.

Elements shown in FIG. 29 are comparable to those of FIGS. 1, 5, 9, 10, 14, 17, 18, 20, 23, and 28 with the first digits in this embodiment being 11 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment, 9 in the 900 embodiment or 10 in the 1000 embodiment. For example, the shaft 1120 of the device 1100 is comparable, in formation and composition, to the shaft 120 of the device 100 embodiment. Thus, all reference numbers with the last two numbers being the same between device 1000, device 900, device 800, device 700, device 600, device 500, device 400, device 300, device 200 and the device 100 are comparable, or the same, in formation and composition.

The device 1100 is shown in FIG. 29. The protrusions 1128 are operably connected to a shaft 1120, with that shaft being operably connected to a substantially planar base 1154. The substantially planar base 1154 is in turn operably attached to an anchor 1156. In some embodiments, substantially planar base 1154 and anchor 1156 are a single, unitary structure. In this embodiment anchor 1156 is shown as being substantially conical, but in other embodiments anchor 1156 can be any suitable shape.

In this embodiment of device 1100, three conical protrusions 1128 are operably attached to the shaft 1120. However, in other embodiments, one conical protrusion, two conical protrusions, four conical protrusions, or more can be included, and can be tapered vertically upward and/or vertically downward.

The device 1100 is configured to be placed on a lower surface of a body of water, with the anchor 1156 being configured to penetrate a portion the lower surface and substantially maintain the location of the device on the lower surface. The substantially planar base 1154 is configured to substantially maintain the orientation of the device 1100 by contacting portions of the lower surface.

The device 1100 is configured to be dropped from a vessel into relatively deeper water, where it will rest on the floor, held substantially in place by the anchor 1156. In this embodiment, the conical protrusions 1128 function to direct water currents downwards (and/or upwards), in order to impact scouring of sediment directly beneath, and in the vicinity of, the device 1100. In this embodiment the substantially planar base 1154 has several openings, which can be configured to redirect water flow to access the sediment directly below the device 1100.

Figure 30:
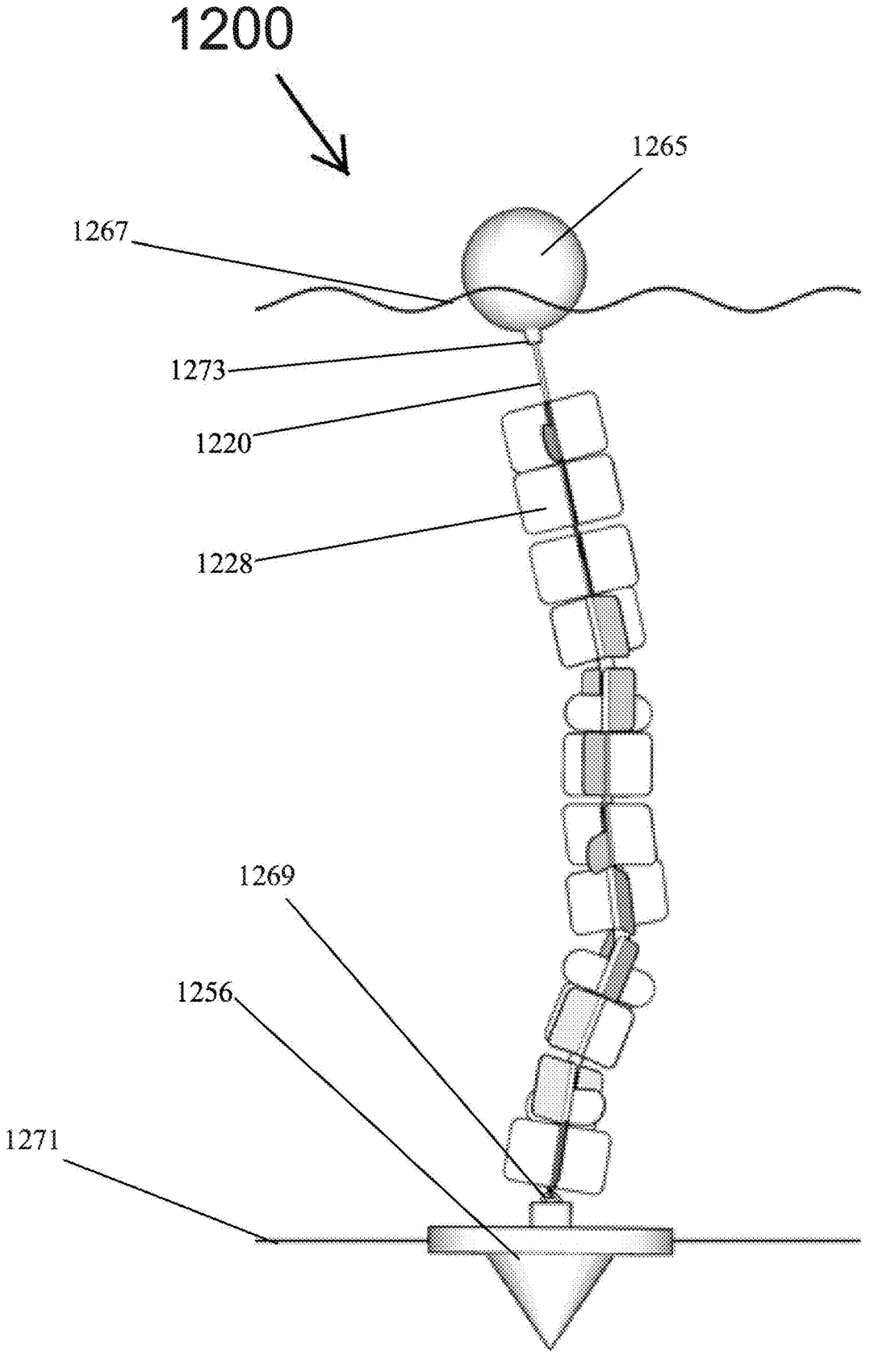
FIG. 30 is a side view of an embodiment of the disclosure.

Elements shown in FIG. 30 are comparable to those of FIGS. 1, 5, 9, 10, 14, 17, 18, 20, 23, 28, and 29 with the first digits in this embodiment being 12 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment, 9 in the 900 embodiment, 10 in the 1000 embodiment, or 11 in the 1100 embodiment. For example, the one or more protrusions 1228 of the device 1200 are comparable, in formation and composition, to the one or more protrusions 128 of the device 100 embodiment. Thus, all reference numbers with the last two numbers being the same between device 1100, device 1000, device 900, device 800, device 700, device 600, device 500, device 400, device 300, device 200 and the device 100 are comparable, or the same, in formation and composition.

The device 1200 is shown in FIG. 30. The protrusions 1228 are operably connected to a shaft 1220, with that shaft being operably connected to a substantially planar base/anchor 1256. In some embodiments, substantially planar base/anchor 1256 is a single, unitary structure. In this embodiment the substantially planar base/anchor 1256 is shown as having a substantially conical section that penetrates at least a portion of a substrate 1271, but in other embodiments substantially planar base/anchor 1256 can be any suitable shape. The substrate 1271 can be any seabed, riverbed, lake floor or ocean floor.

In this embodiment of device 1200, a plurality of protrusions 1228 are operably attached to the shaft 1220. In this embodiment, the shaft 1220 can be substantially flexible and can be formed of any suitable flexible material, such as rope, cable, thread, wire, string, chain, twisted twine, twisted mason line, synthetic fibers, fishing line.

The device 1200 is configured to be placed on a lower surface of a body of water, with the substantially planar base/anchor 1256 being configured to penetrate a portion the lower surface and substantially maintain the location of the device on the lower surface. One end of the shaft 1220 can be operably connected to the substantially planar base/anchor 1256 at a substantially planar base/anchor connection point 1269. Another end of the shaft 1220 can be connected to a float 1265 at a float connection point 1273.

The float 1265 is configured to maintain at least a portion of the shaft 1220 a distance away from the substrate 1271. In some embodiments the float 1265 can be in the water column, a distance away from the substrate 1271, but itself still be underwater. In other embodiments, such as shown in FIG. 30, the float can be wholly or partially above a water level 1267.

The float 1265 can be any suitable material (such as foam, plastic, wood, rubber, glass, metal, combinations thereof, etc.) and construction (such as solid, hollow, partially solid, partially hollow) so that the float 1265 is of sufficient buoyancy to maintain at least a portion of the shaft 1220 a distance away from the substrate 1271.

The device 1200 is configured to be dropped from a vessel, or placed by a person or robot, into relatively shallow water, where it will rest on the floor, held substantially in place by the substantially planar base/anchor 1256.

Figure 31:
FIG. 31 is a perspective view of a protrusion of an embodiment of the disclosure.
Figure 32:
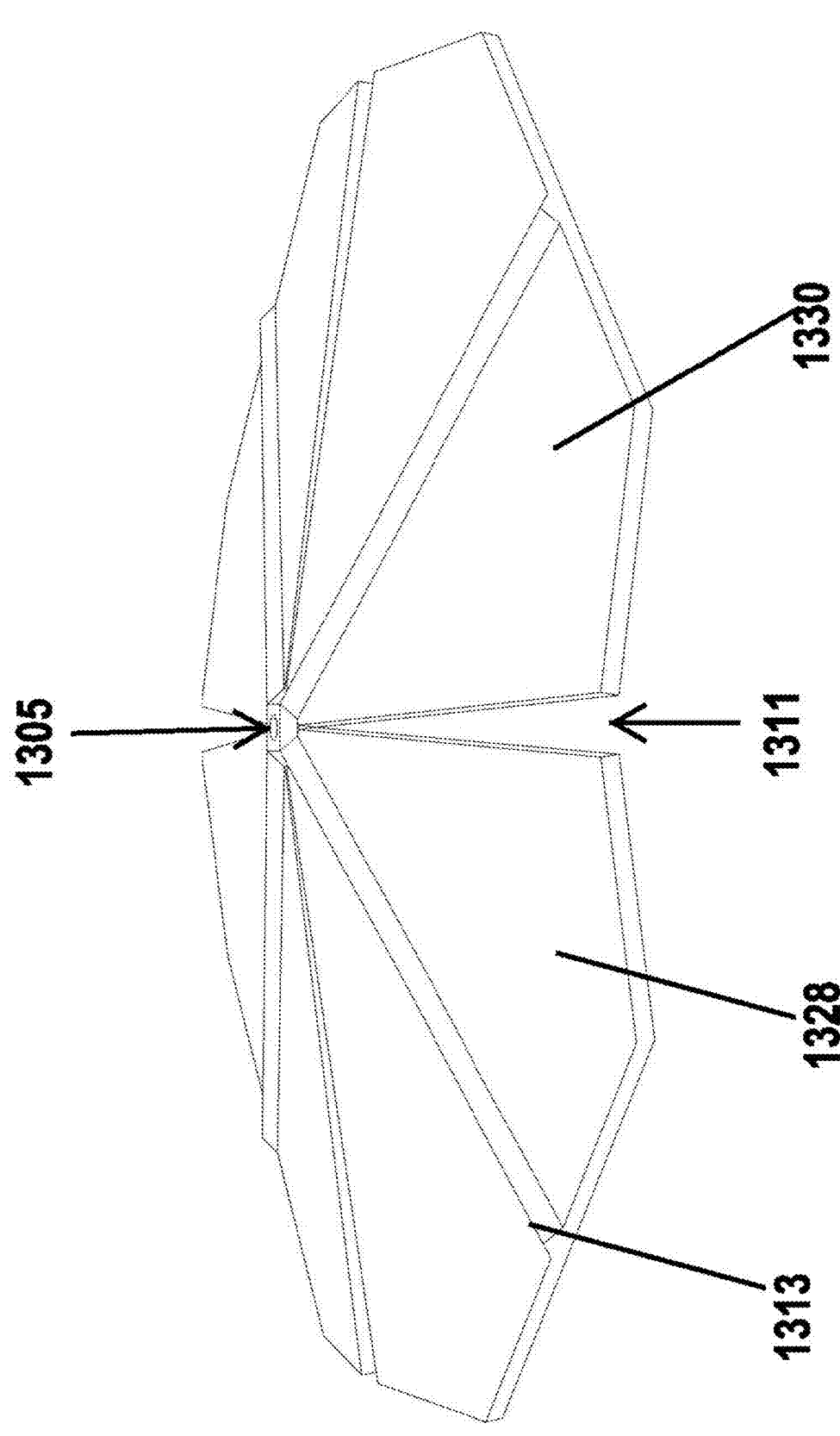
FIG. 32 is a top view of a protrusion of an embodiment of the disclosure.
Figure 33:
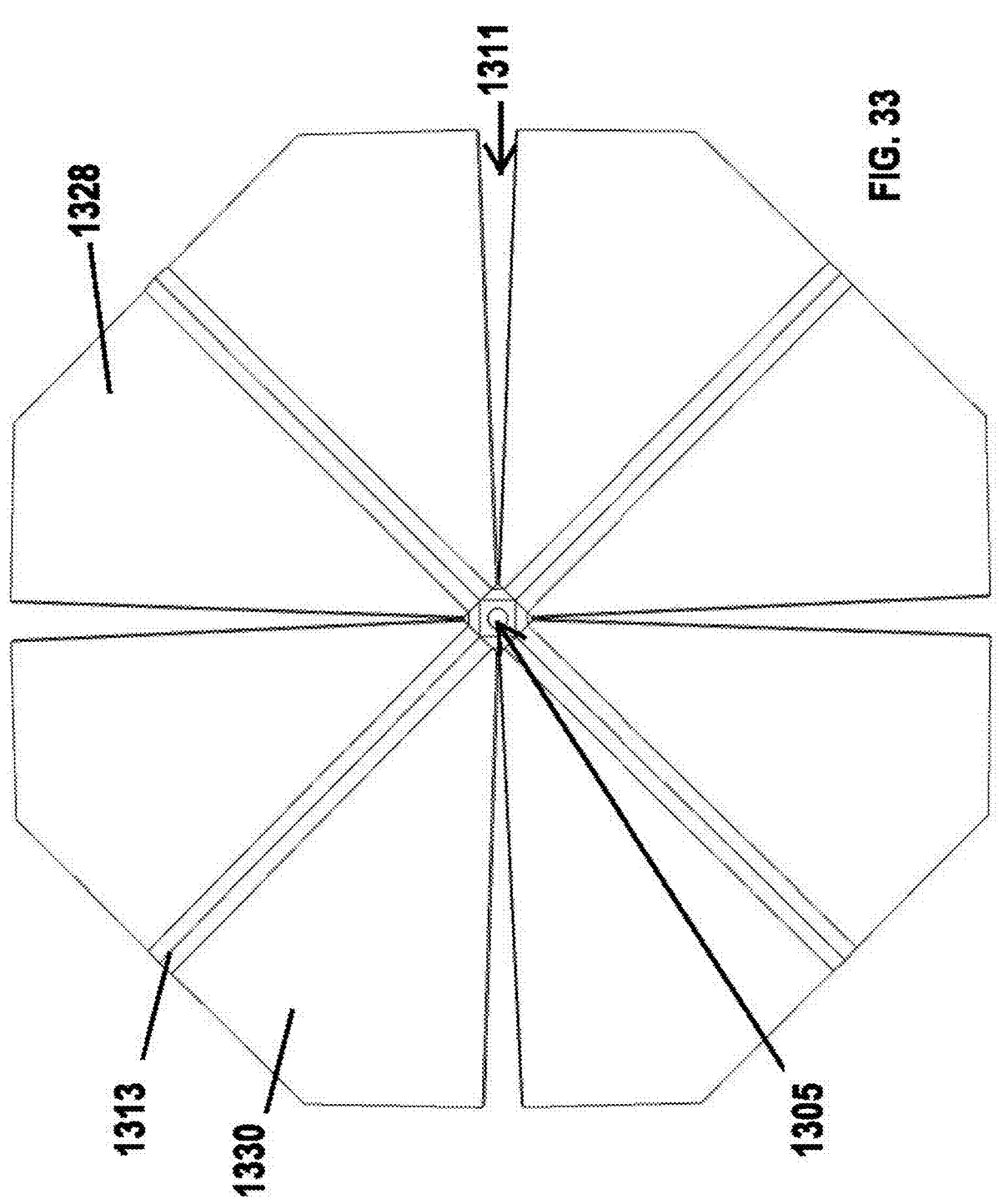
FIG. 33 is a side view of an embodiment of the disclosure.

Elements shown in FIGS. 31-33 are comparable to those of FIGS. 1, 5, 9, 10, 14, 17, 18, 20, 23, 28, 29, and 30 with the first digits in this embodiment being 13 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment, 9 in the device 900 embodiment, 10 in the 1000 embodiment, 11 in the 1100 embodiment, or 12 in the 1200 embodiment. For example, the corkscrew 1302 of the device 1300 are comparable, in formation and composition, to the corkscrew 102 of the device 100 embodiment. Thus, all reference numbers with the last two numbers being the same between device 1200, device 1100, device 1000, device 900, device 800, device 700, device 600, device 500, device 400, device 300, device 200 and the device 100 are comparable, or the same, in formation and composition.

The device 1300 is shown in FIG. 31. The protrusions 1328 are operably connected to a shaft 1320, with that shaft 1320 being operably connected to a substantially planar disc 1324 (or in some embodiments to the corkscrew 1302 directly). In this embodiment of device 1300, a plurality of protrusions 1328 are operably attached to the shaft 1320.

These plurality of protrusions 1328 can be spaced apart from each other on the shaft 1320 by any suitable spacing mechanism or structure. Also, the number of protrusions 1328 can be any suitable value, such as 1, 2, 3, 4, 5, 6, 7, 8, 9, 10, 15, 20 or more. The corkscrew 1302 is configured to penetrate into an upper surface of a substrate upon a rotational force such that the shaft 1320 is partially or wholly under water. Details of the protrusions 1328 are shown in FIGS. 32 and 33.

As can be seen in FIG. 32, the protrusion 1328 includes four plates 1330. In this embodiment protrusion 1328 includes four plates 1330, but in other embodiments, protrusion 1328 can include one plate, two plates, three plates, five plates, or more. Although not shown, each of the plates 1330 can include one or more through holes.

Each of the protrusions 1328 can be the same shape as other protrusions 1328, or they can be different from each other, such as protrusion 128 of the 100 embodiment, for example. Each protrusion 1328 can be substantially concave, as is shown in FIGS. 31 and 32, each protrusion 1328 can be substantially flat, or each protrusion 1328 can be substantially convex.

Each protrusion 1328 includes a shaft cavity 1305, which is configured to extend around the shaft 1320. The shaft cavity 1305 can be configured itself, or in conjunction with another mechanism, to allow rotation of the protrusion 1328 in both a clockwise and a counter-clockwise direction about the shaft 1320, in just a clockwise direction about the shaft 1320, in just a counter-clockwise direction about the shaft 1320, or be fixed so that the protrusion 1328 does not rotate about the shaft 1320.

Any portion of the protrusion 1328 can be at least partially embedded, at least partially formed of and/or at least partially coated with an attractant material that is configured to attract biota, such as but not limited to plankton, nektonic species and/or benthonic species. The benthonic species can include animals of the Mollusca phylum, such as but not limited to bivalves, which include but are not limited to clams, oysters cockles, mussels, and scallops. The attractant material can be any suitable material, such as a calcium comprising material, a carbonate comprising material and a calcium carbonate comprising material. Any portion of the protrusion 1328 can also include grooves and/or indentations and/or a roughened surface, any and all of which can act as a way to increase the ability of biota to attach and/or hold onto the protrusion 1328.

The plates 1330 (if protrusion 1328 includes two or more plates 1330) are spaced apart laterally from each other by an optional plate gap 1311. Each plate can include one or more optional protrusions 1313, that can be located in any dimension, and can be any shape on an upper surface of the plate 1330 and/or a lower surface of the plate 1330.

A top view is shown in FIG. 33 for a further view of the plates 1330. As can be seen in FIG. 33.

Elements shown in FIGS. 34A-34H and 35A-35B are comparable to those of FIGS. 1, 5, 9, 10, 14, 17, 18, 20, 23, 28, 29, 30, and 31-33 with the first digits in this embodiment being 14 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment, 9 in the 900 embodiment, 10 in the 1000 embodiment, 11 in the 1100 embodiment, 12 in the 1200 embodiment, or 13 in the 1300 embodiment. For example, the corkscrew 1402 of the device 1400 are comparable, in formation and composition, to the corkscrew 102 of the device 100 embodiment.

Thus, all reference numbers with the last two numbers being the same between device 1300, device 1200, device 1100, device 1000, device 900, device 800, device 700, device 600, device 500, device 400, device 300, device 200 and the device 100 are comparable, or the same, in formation and composition.

Figure 34A:
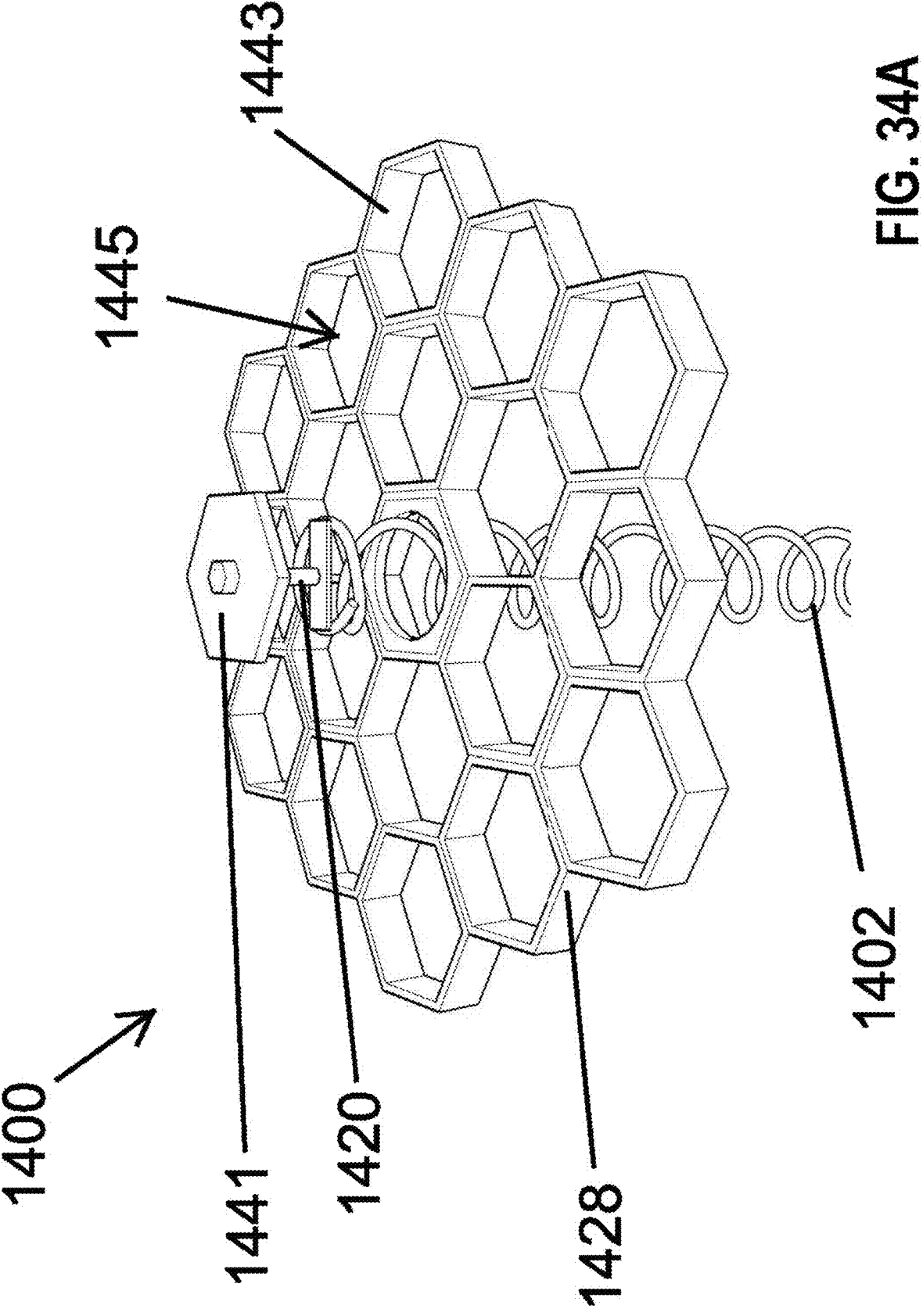
FIG. 34A is a perspective view of an embodiment of the disclosure.

The device 1400 is shown in FIG. 34A. In this embodiment a protrusion 1428 is configured to be secured to a relatively loose-sediment morphology, such as a cliff face. The protrusion 1428 can include one or more protrusion cells 1443, with each protrusion cell having a protrusion aperture 1445. In this embodiment many protrusion cells 1443 are shown, but in other embodiments fewer or more protrusion cells 1443 can be included in one protrusion 1428, in any suitable pattern and size. Additionally, each protrusion cells 1443 is shown as being in a hexagonal shape, but in other embodiments each protrusion cell 1443 can be the same shape as other protrusion cells 1443, or different shapes from other protrusion cells 1443, with each protrusion cell 1443 being any suitable polygonal, curved and/or erratic shape.

The device 1400 also includes a securing flange 1441 at one end of the shaft 1420, with the securing flange 1441 including a torquable element, such as a bolt head, which can translate rotation from the securing flange 1441, to the corkscrew 1402. The device 1400 can be installed into the morphology until a bottom surface of the protrusion 1428 contacts at least a portion of the morphology.

Optionally, a user can fill one or more protrusion apertures 1445 with further morphology and/or vegetation (including seeds). As each protrusion aperture 1445 is open, roots of any vegetation can enter the existing morphology.

The protrusion 1428 can be formed of any suitable material such as plastic, glass, ceramic, metal(s), carbon-based materials, elastomer, rubber, and combinations thereof. The suitable material of the protrusion 1428 can be a biodegradable material, such that the corkscrew 1302 could be removed and the protrusion 1428 could remain in the installed morphology over time.

Although in this embodiment only one device 1400 is shown, several devices 1400 can be installed adjacent and/or touching each other along any portion of the periphery of each device 1400's protrusion 1428.

Figure 34B:
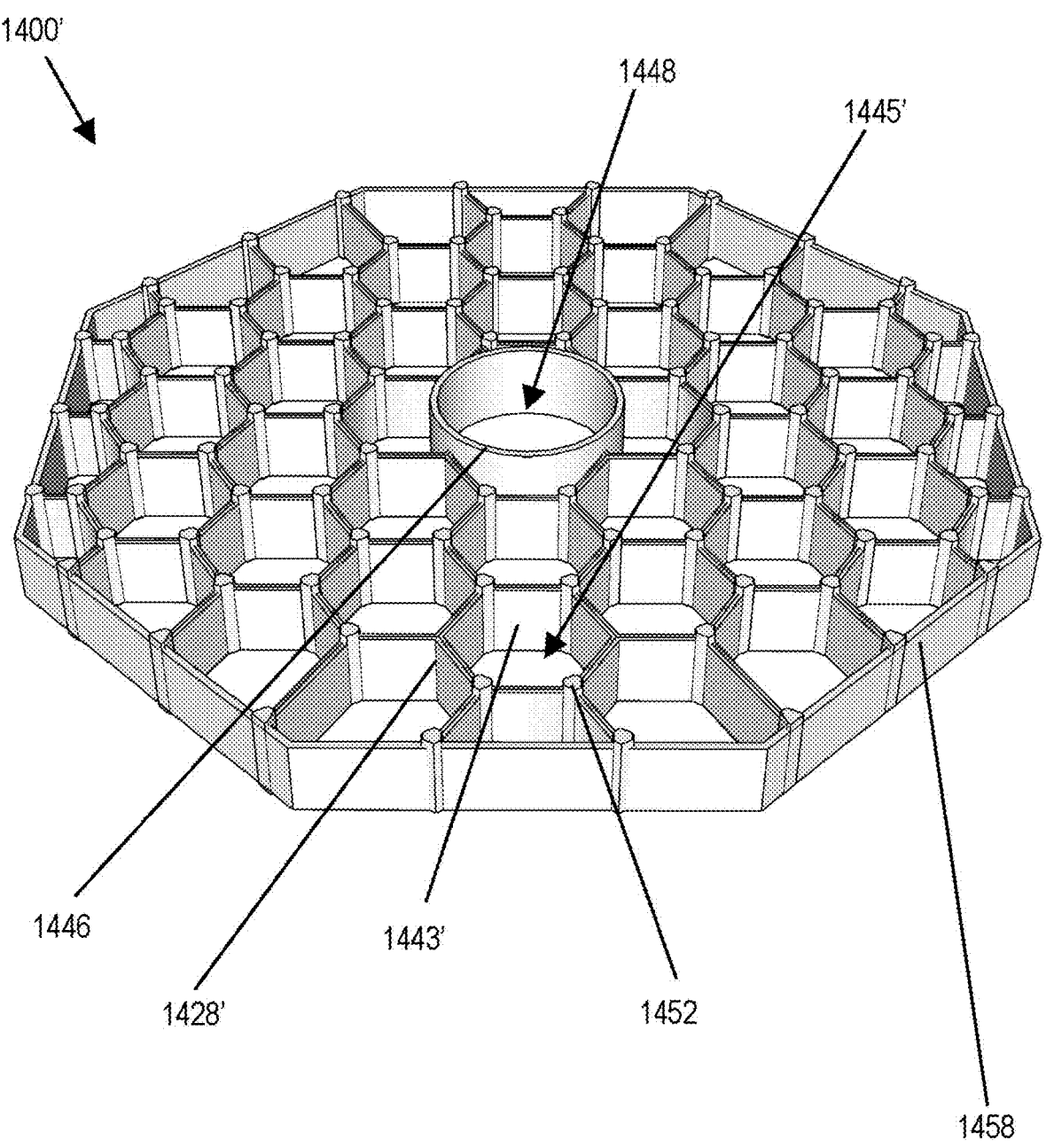
FIGS. 34B-34H are perspective views of another embodiment of the disclosure.

Another embodiment of the device 1400' is shown in FIG. 34B. In this embodiment a protrusion 1428' is shown, separate from a corkscrew. The protrusion 1428' can include one or more protrusion cells 1443', with each protrusion cell having a protrusion aperture 1445'. All or some of the protrusion apertures 1445' are configured to surround plant material when the deice 1400' is in an installed configuration.

In this embodiment many protrusion cells 1443' are shown, but in other embodiments fewer or more protrusion cells 1443' can be included in one protrusion 1428', in any suitable pattern and size. Additionally, each protrusion cells 1443' is shown as being in a hexagonal shape, but in other embodiments each protrusion cell 1443' can be the same shape as other protrusion cells 1443', or different shapes from other protrusion cells 1443', with each protrusion cell 1443' being any suitable polygonal, curved and/or erratic shape.

Included with the protrusion 1428' is the sleeve 1446, which creates a sleeve opening 1448. The sleeve 1446 is shown near the center of the device 1400', but in other embodiments the sleeve 1446 can be in any suitable location. Additionally, the sleeve 1446 is shown as being circular, but in other embodiments, the sleeve 1446 can be any suitable polygonal, curved and/or erratic shape, and any suitable size.

The device 1400' also includes a perimeter 1458 that includes substantially straight portions, and in this embodiment, forms an octagonal shape. However, the perimeter 1458 can be any suitable polygonal, curved and/or erratic shape, and any suitable size.

Near the intersections of each of the one or more protrusion cells 1443' an extension 1452 extends a distance away from an upper edge of the protrusion cell 1443'. These extension s 1452 can occur near each intersection of the one or more protrusion cells 1443', or a portion of the one or more protrusion cells 1443'. Additionally, the extensions 1452 can appear on the under side of the device 1400', as shown more clearly in FIG. 35B. The extensions 1452 can be any suitable shape and size. The extension 1452 shown in FIG. 34B can be useful for providing traction for walking upon the device 1400' when it is installed in a substrate. The extension 1452 on the underside of the device 1400', which is shown in 35B, can be useful for providing a stronger anchor/greater grip and/or traction into the substrate when the device 1400' is installed in a substrate. The extensions 1452 can be formed of the same, continuous material as the protrusion 1428', and/or the projections can be additional material added to the protrusion 1428'.

The protrusion 1428' can be formed of any suitable material such as plastic, glass, wood, wood containing materials, cardboard, waxed, corrugated cardboard, bamboo, ceramic, metal(s), carbon-based materials, elastomer, rubber, and combinations thereof. The suitable material of the protrusion 1428' can be a biodegradable material, such that a corkscrew could be removed and the protrusion 1428' could remain in the installed morphology over time.

Figure 34C:
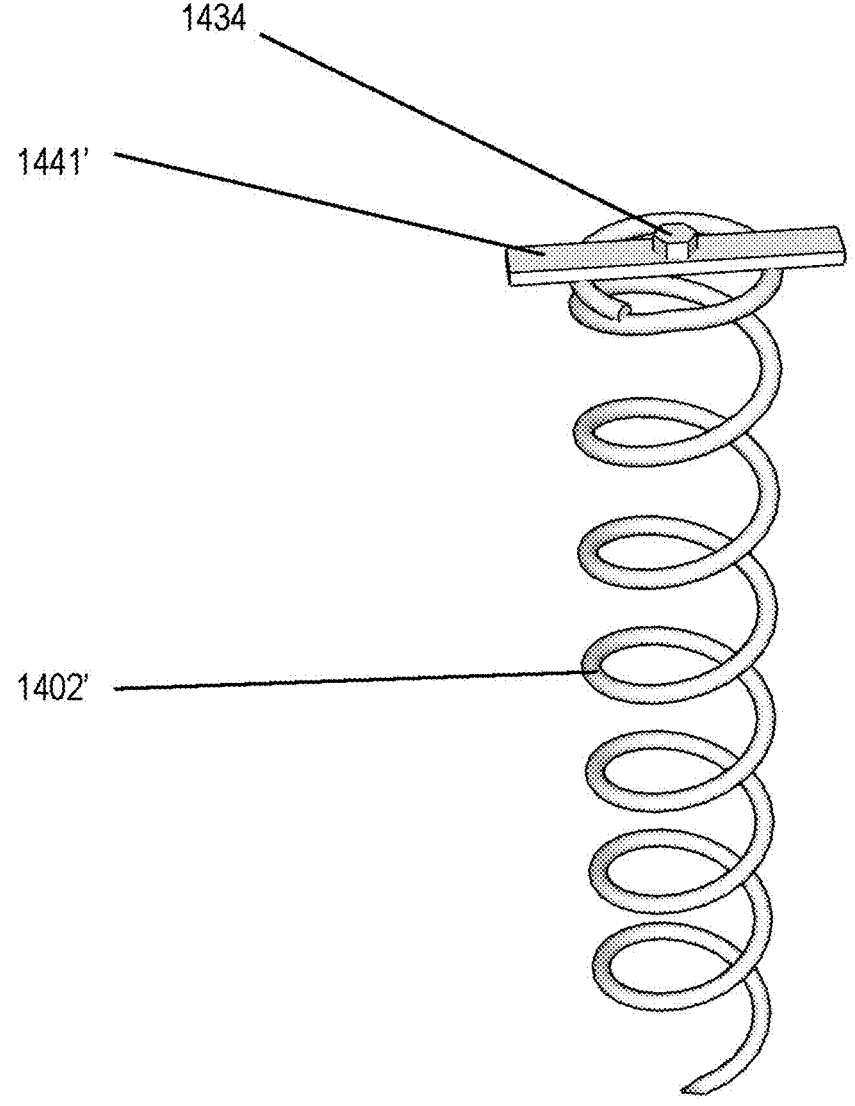

In FIG. 34C, separately shown is a corkscrew 1402'. The corkscrew 1402' comprises a securing flange 1441', which is attached to an end of the corkscrew 1402', opposite the open, driving end of the corkscrew 1402', with the securing flange 1441' being equal to or greater in length than a diameter (or other dimension if the sleeve 1446 is not a circular shape) of the sleeve of 1446. Thus, upon installation of the device 1400', the securing flange 1441' can provide a maintaining force on the sleeve 1446, and thus the remainder of the protrusion 1428'. Although not shown in these figures, a shaft can be present between the securing flange 1441' and the corkscrew 1402', if desired.

The corkscrew 1402' can be formed of any suitable material, such as plastic, glass, ceramic, metal(s), carbon-based materials, wood, grass (such as bamboo), cardboard, elastomer, rubber, and combinations thereof, and can be rigid, substantially rigid, flexible, or substantially flexible. In embodiments where the corkscrew 1402' is formed of a suitably biodegradable material, such as wood, grass (such as bamboo) and/or cardboard, the corkscrew 1402' can remain installed after removal of the protrusion 1428'. In this embodiment, the securing flange 1441' can be removed and the protrusion 1428' can then be removed.

The securing flange 1441' is attached to a torquing mechanism 1434. The torquing mechanism 1434 is configured to receive a torque from any suitable wrench or tool, either powered or hand-driven. The torquing mechanism 1434 is configured to provide torque to the corkscrew 1402' and drive the corkscrew 1402 entirely or partially into a morphology, with the securing flange 1441' contacting the sleeve 1446 to maintain the protrusion 1428' in this installed configuration. The installed configuration being a configuration wherein, some, most or all of the 1428' is contacting the morphology through reception of a pressure transmitted from the securing flange 1441' contacting the sleeve 1446.

Figure 34D:
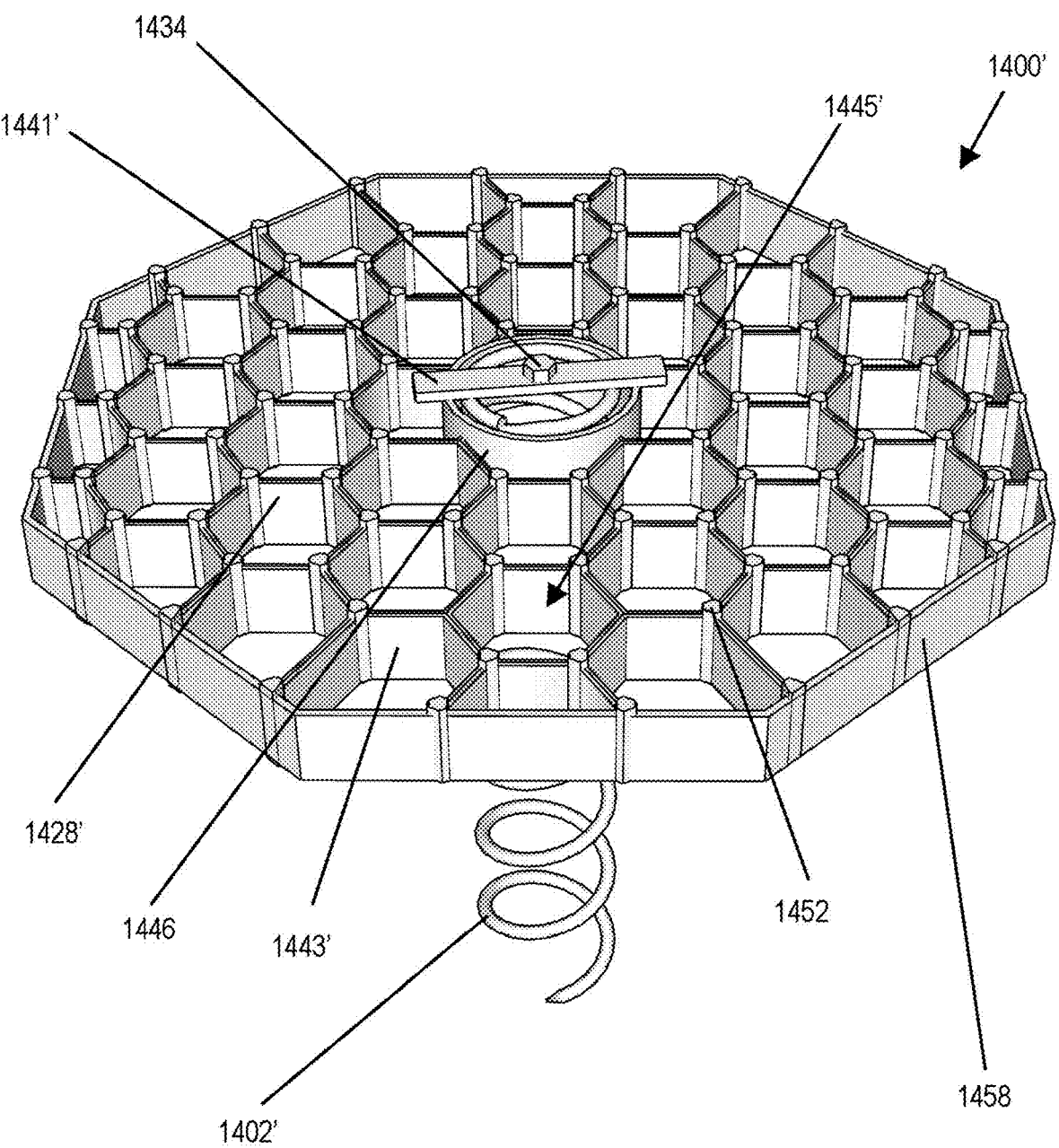

In FIG. 34D, the combination of the corkscrew 1402' and the device 1400' is shown, which is configured to be secured by the corkscrew 1402' to a relatively loose-sediment morphology above water and/or below, such as a cliff face, dune, berm, levee, river bank, beach, escarpment, hillside, any other morphology at an angle, or any other morphology where sediments can be eroded due to wind, rain, tidal movement, waves, currents, gravity, and/or any other erosive force.

In this embodiment, the one or more protrusion cells 1443' are made of six walls 1444, in other embodiments more or less walls can be included, and they can be the same or different sizes and/or shapes, they can be substantially straight, curved and/or erratic. Each wall 1444 of each of the one or more protrusion cells 1443' can be secured together permanently, or temporarily, so that one or more walls 1444 can be removed to create larger cells or a modification in the perimeter 1458 shape. In some embodiments the one or more walls 1444 can be removed with relative ease, without cutting, breaking and/or destroying any portion of the wall 1444 or the protrusion cell 1443.

Figure 34E:
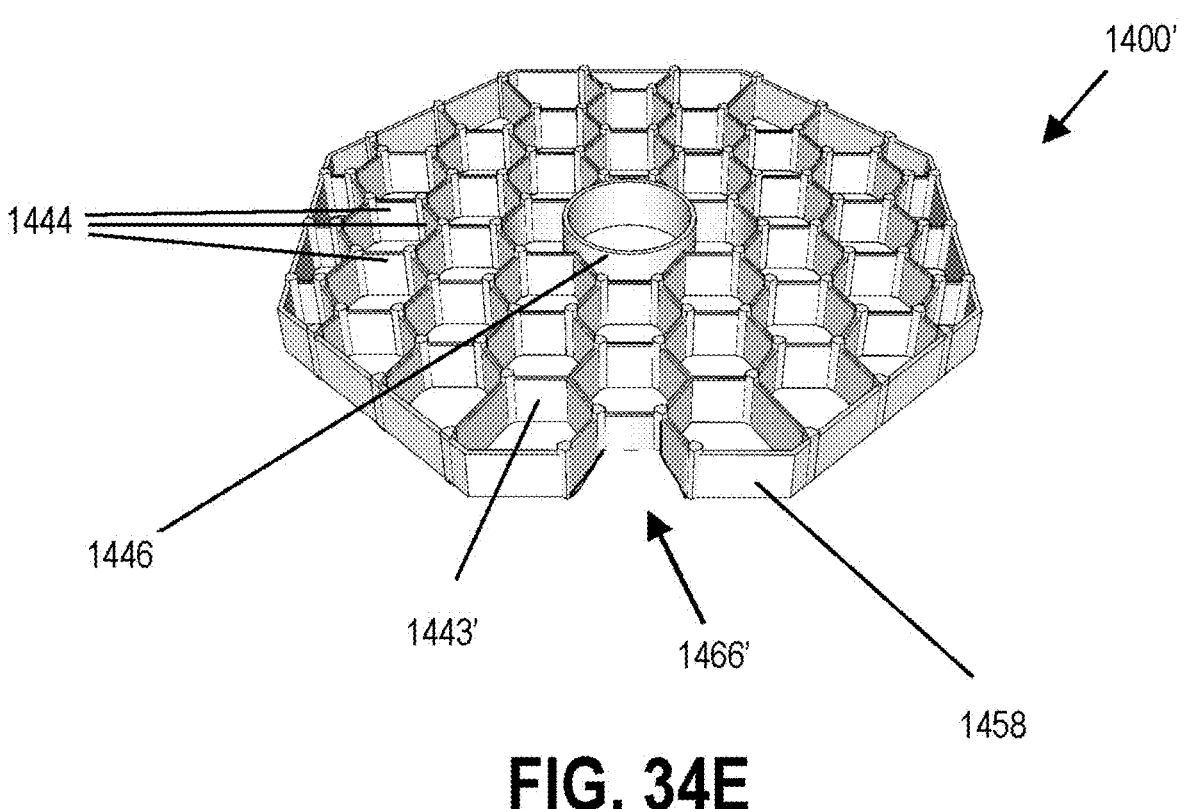
Figure 34F:
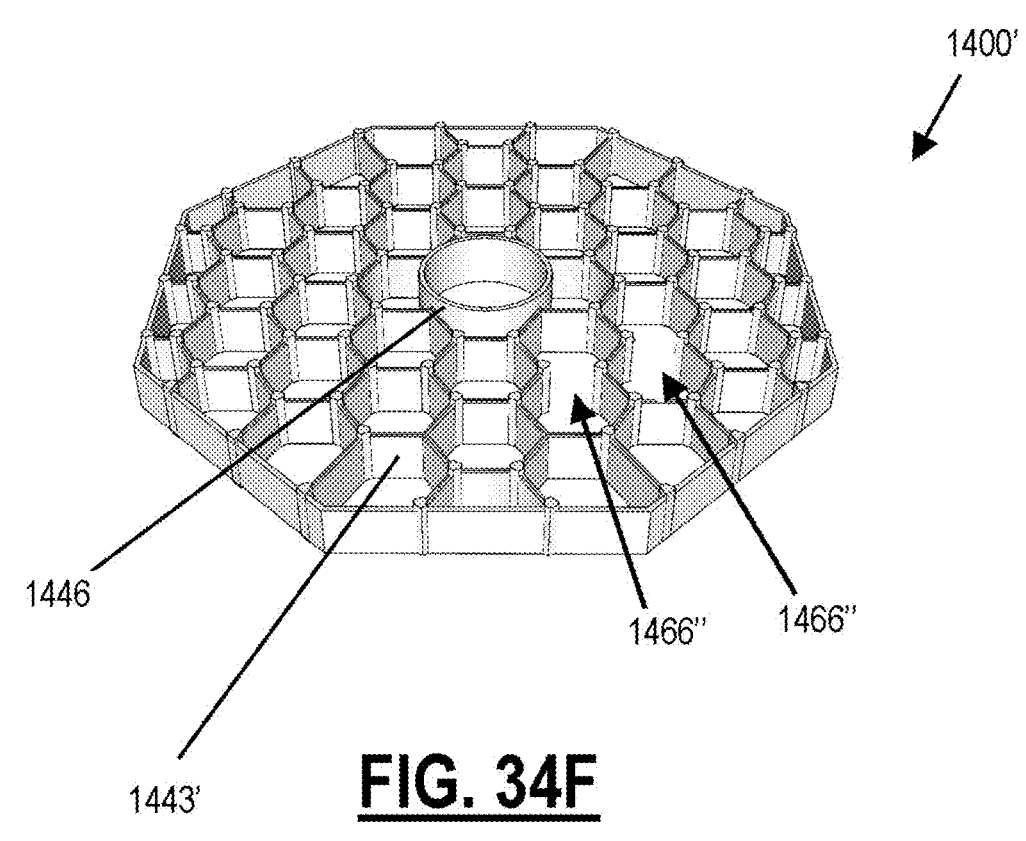

For example, in FIG. 34E an external wall has been removed so that a perimeter opening 1466' is formed. As another example, in FIG. 34F, two internal walls have been removed to form two internal openings 1466" are formed. In other embodiments any number of walls can be removed to form one or more perimeter openings and/or one or more internal openings.

Additionally, to ease removal of the device 1400' after the plant materials have created sufficient root structures, one or more walls 1444 can be removed so that the device 1400' can be moved away from the plant materials without (or by a reduced amount) uprooting the plant materials. Additionally or alternatively, the one or more walls 1444 can each remain during removal of the device 1400'.

Figure 34G:
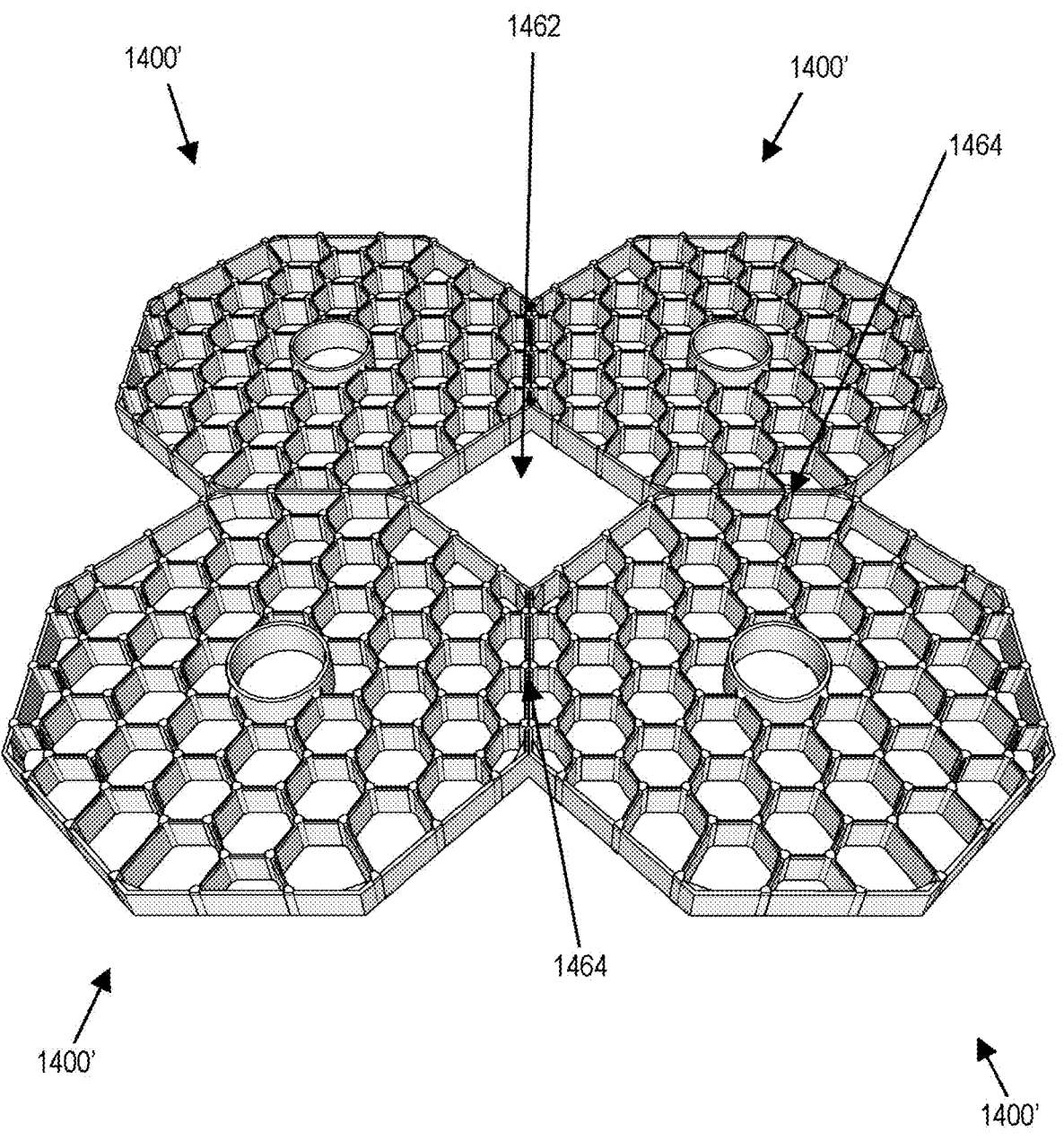
Figure 34H:
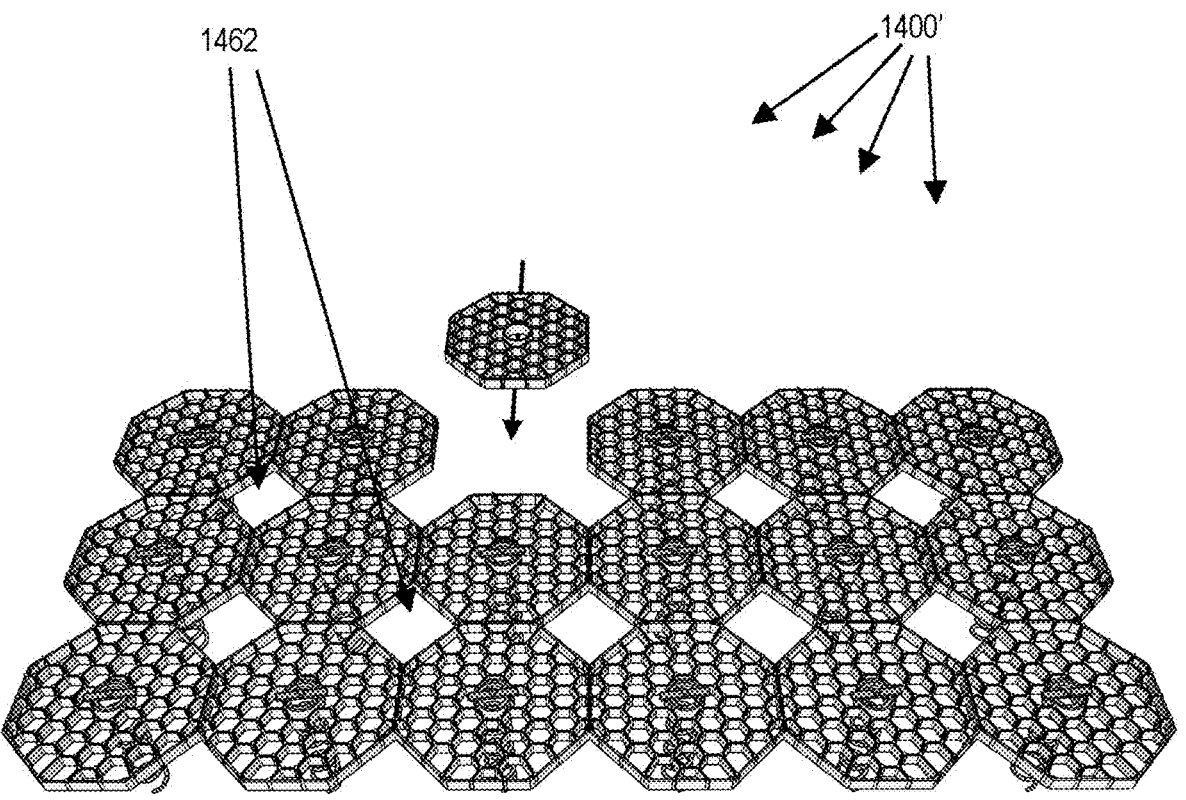

Although in FIG. 34D one device 1400' is shown, in other embodiments, several devices 1400/1400' can be installed adjacent and/or touching each other along any portion of the periphery of each device 1400's extension 1428, such as shown in FIGS. 34G and 34H.

As seen in FIG. 34G, four devices 1400' can be placed adjacent another, so that there are one or more contact areas 1464, and if the devices 1400' are shaped as they are in FIG. 34G, a bounded opening 1462 can be formed between the devices 1400'. The one or more contact areas 1464 can just be a physical contact between the adjacent devices 1400', and/or the contact area 1464 can include an additional connector, such as a clip or bolt, that can maintain adjacent devices 1400' contacting or nearly contacting each other along the contact area 1464. The size and dimensions of the bounded opening 1462 can change based on the size and shape of the devices 1400'. This bounded opening 1462 provides the opportunity for placement of larger vegetation, such as shrubs and/or saplings, for example. As an additional example, a larger array or lattice of devices 1400' is shown in FIG. 34H, which can create multiple bounded openings 1462. Since the utilization and placement of the devices 1400' is flexible and tailorable, the number and layout of the devices 1400' includes a broad range of configurations.

Figure 35A:
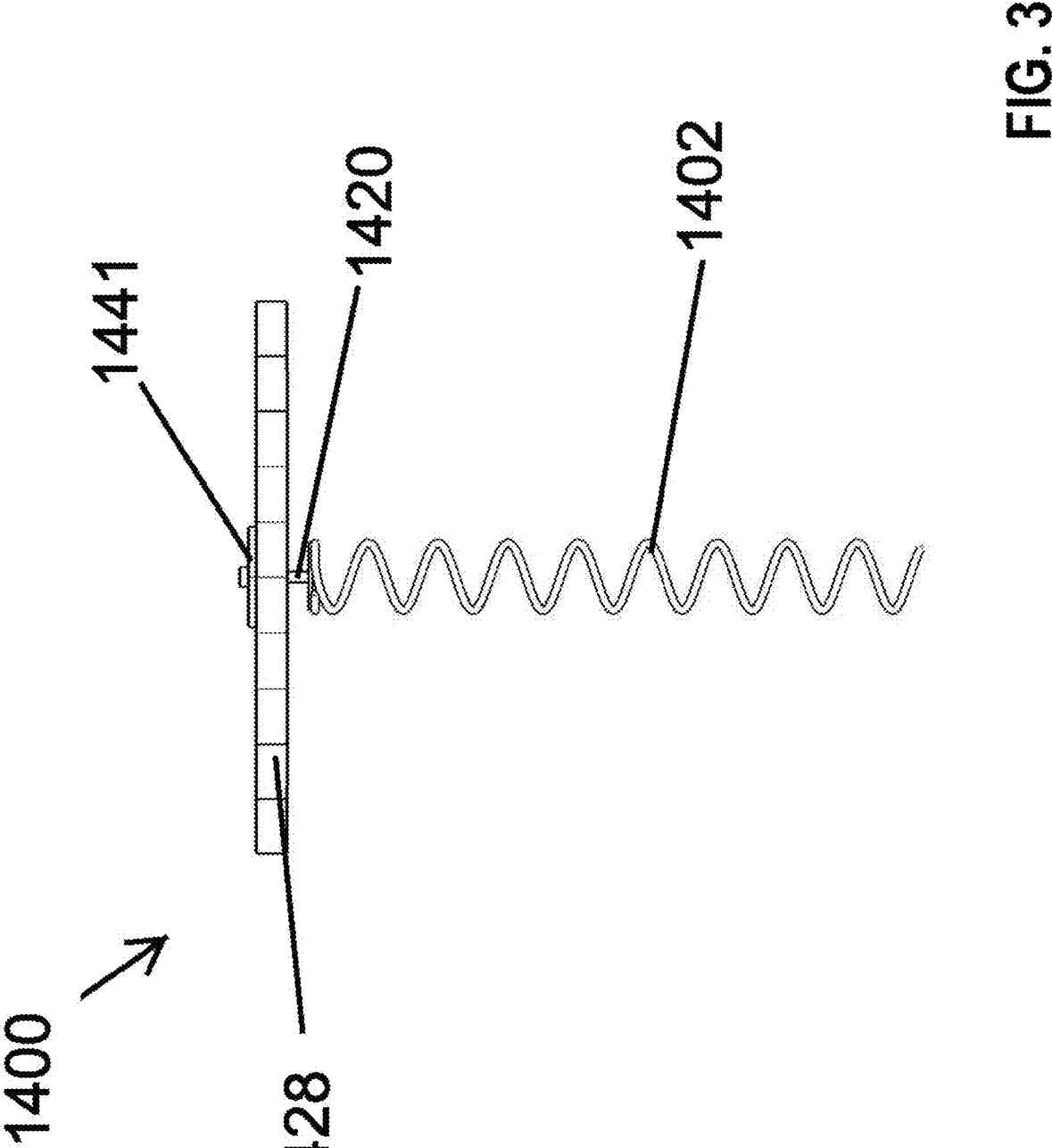
FIG. 35A is a side view of an embodiment of the disclosure shown in FIG. 34A.
Figure 35B:
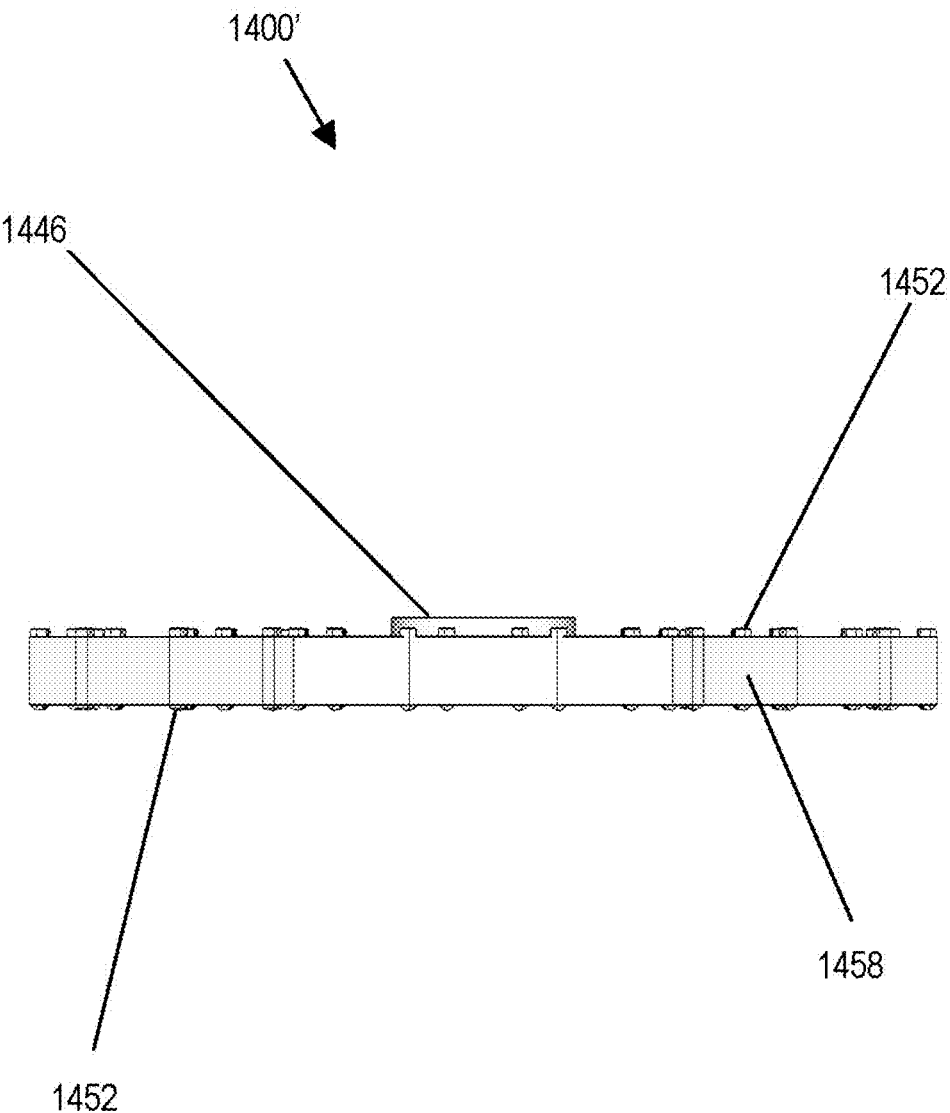
FIG. 35B is a side view of another embodiment of the disclosure shown in FIG. 34B.

A side view of the device 1400' is shown in FIG. 35B. In other embodiments, the extension 1428 can have a concave shape, a convex shape, or an erratic shape. As seen in FIG. 35B, the protrusions 1428 extend vertically downward and in an installed configuration can provide additional engagement with the morphology. This engagement is at least partially reliant on the pressure provided by the securing flange 1441' against the sleeve 1446. The force of engagement can mitigate the device 1400' from rotating, or drifting laterally, relative to the morphology in the installed configuration, and can reduce or prevent the perimeter 1458 from rotating away from the morphology.

Both device 1400 and 1400' are designed to provide plant materials (seeds, plugs, bare root, seedlings, containers, cuttings and/or saplings, etc., and combinations thereof) the time to grow root systems in substrates by providing suitable shelter from erosive forces that would typically erode the plant materials or their substrates away before roots are established. Once the root systems sufficiently grow into the substrate, and the substrate is sufficiently stabilized, either or both of devices 1400 and 1400' can be removed by sliding the one or more protrusion cells 1444/1443' past the plant material, such that the device 1400/1400' can be installed elsewhere, while the plant material can remain. The remaining plant material (and/or the plant material and the device 1400/1400') can increase water infiltration and retention, while reducing sediment and excess nutrient runoff. Additionally, the device 1400/1400' can be formed of materials and/or be textured to increase their water attraction and/or retention.

Figure 36:
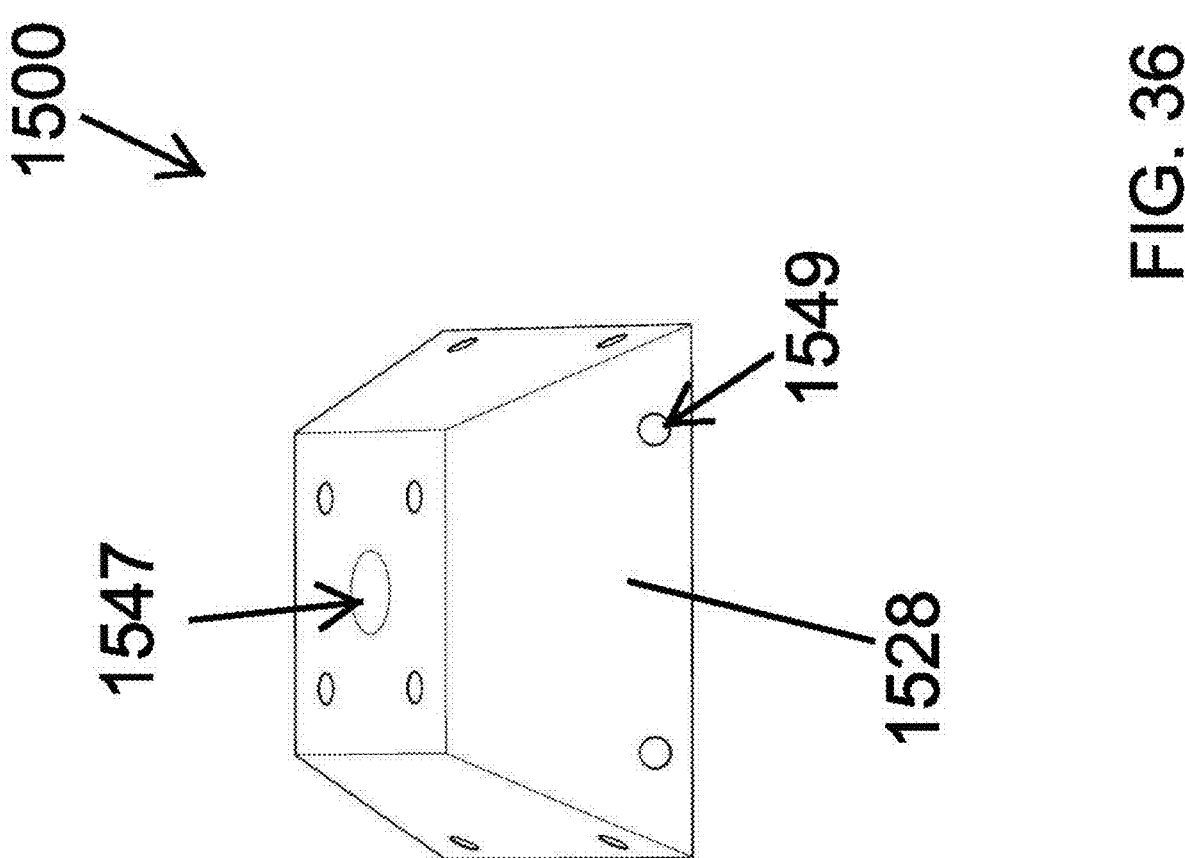
FIG. 36 is a perspective view of an embodiment of the disclosure.
Figure 36:
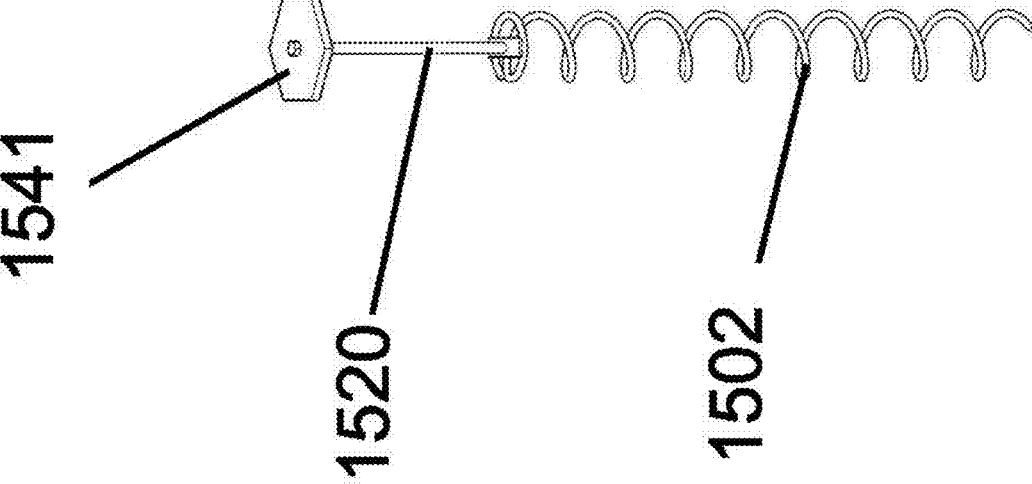
Figure 37:
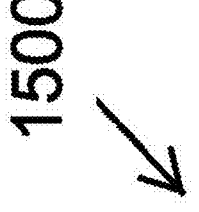
FIG. 37 is a perspective view of an embodiment of the disclosure.
Figure 37:
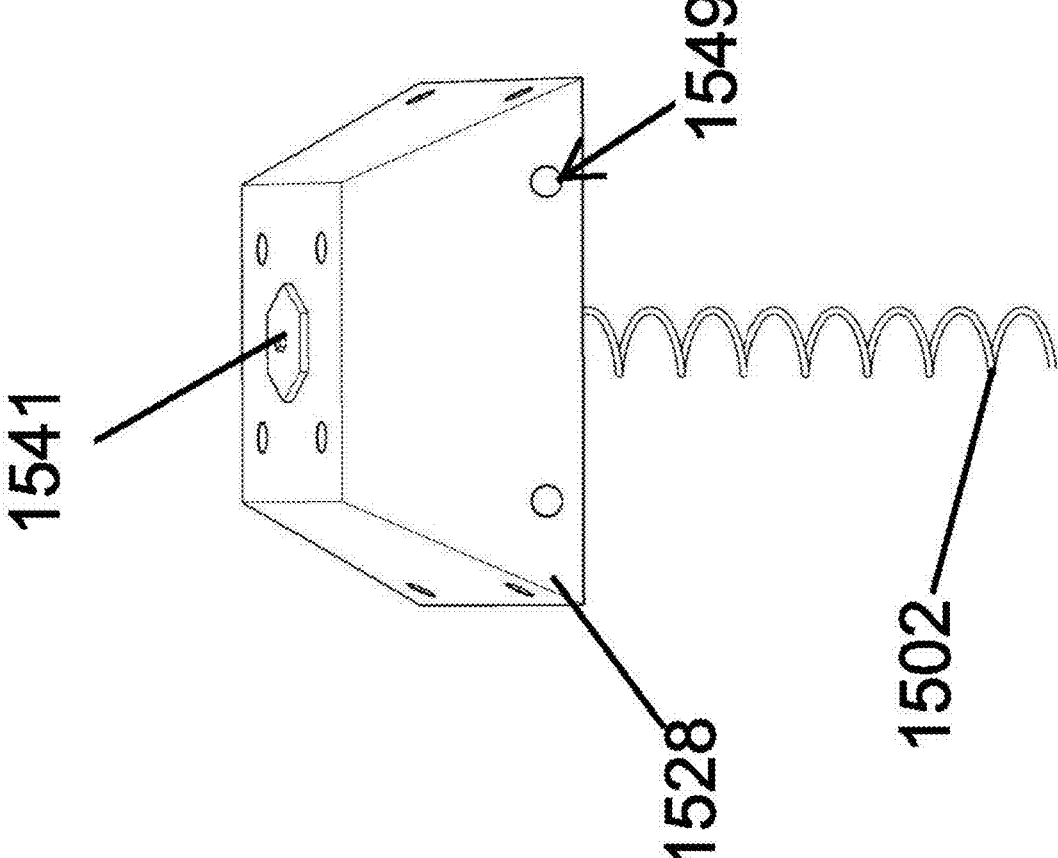

Elements shown in FIGS. 36 and 37 are comparable to those of FIGS. 1, 5, 9, 10, 14, 17, 18, 20, 23, 28, 29, 30, 31-33, and 34-35 with the first digits in this embodiment being 15 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment, 9 in the 900 embodiment, 10 in the 1000 embodiment, 11 in the 1100 embodiment, 12 in the 1200 embodiment, 13 in the 1300 embodiment, or 14 in the 1400 embodiment. For example, the corkscrew 1502 of the device 1500 are comparable, in formation and composition, to the corkscrew 102 of the device 100 embodiment. Thus, all reference numbers with the last two numbers being the same between device 1400, device 1300, device 1200, device 1100, device 1000, device 900, device 800, device 700, device 600, device 500, device 400, device 300, device 200 and the device 100 are comparable, or the same, in formation and composition.

The device 1500 is shown in FIG. 36, in an unassembled state. In this embodiment a protrusion 1528 is configured to be secured to a bed of a body of water and/or an exposed sand/sediment/granular/mud/soil surface. The protrusion 1528 can be solid, partially solid or substantially hollow. In this embodiment the protrusion 1528 is shown in a truncated pyramidal shape, but in other embodiments, the protrusion 1528 can be any suitable polygonal, curved and/or erratic shape, and any suitable size.

The protrusion 1528 includes at least one corkscrew tunnel 1547, but in other embodiments, the protrusion 1528 can include two or more corkscrew tunnels 1547 so that two or more corkscrews 1502 can be used with the protrusion 1528 to secure the protrusion 1528 in the desired location.

The device 1500 also includes a securing flange 1541 at one end of the shaft 1520, with the securing flange 1541 including a torquable element, such as a bolt head, which can translate rotation from the securing flange 1541, to the corkscrew 1502. The device 1500 can be installed into the morphology, such that the corkscrew 1502 passes through the corkscrew tunnel 1547, the securing flange 1541 contacts an upper surface of the protrusion 1528, and until a bottom surface of the protrusion 1528 contacts at least a portion the surface of the bed of the body of water or the exposed sand/sediment/granular/mud/soil surface.

The protrusion 1528 can include one or more protrusion fill holes 1549, which are configured to allow entry of water/sand/sediment/granular/mud/soil to enter an internal cavity of the protrusion 1528.

The protrusion 1528 can be configured to be, when not filled with water and/or sand/sediment/granular/mud/soil, to be relatively light weight and manually portable for a human user.

The device 1500 is shown in FIG. 36, in an assembled state, with the corkscrews 1502 passing through the corkscrew tunnel 1547, and the securing flange 1541 contacting an upper surface of the protrusion 1528.

Figure 38:
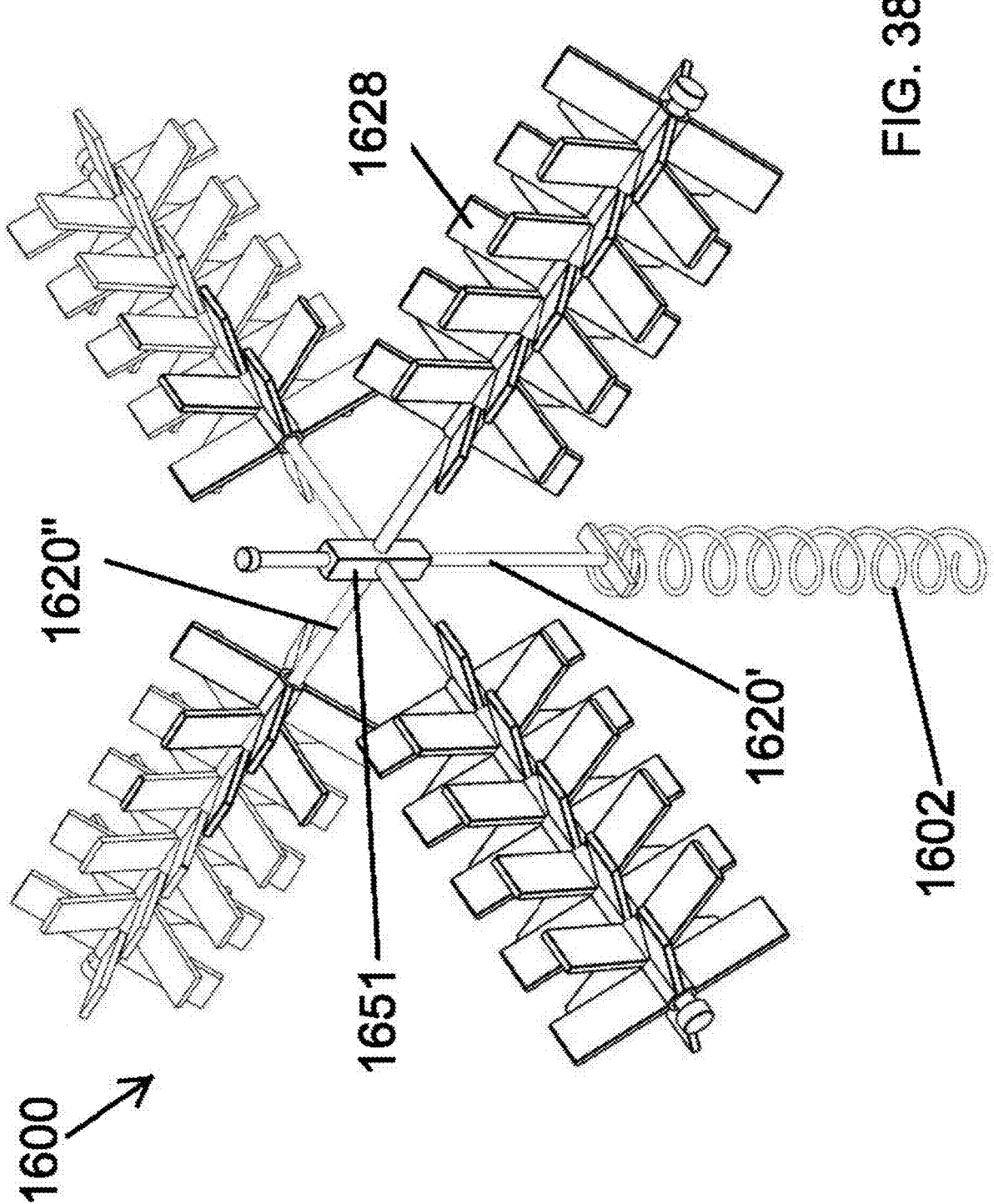
FIG. 38 is a perspective view of an embodiment of the disclosure.
Figure 39:
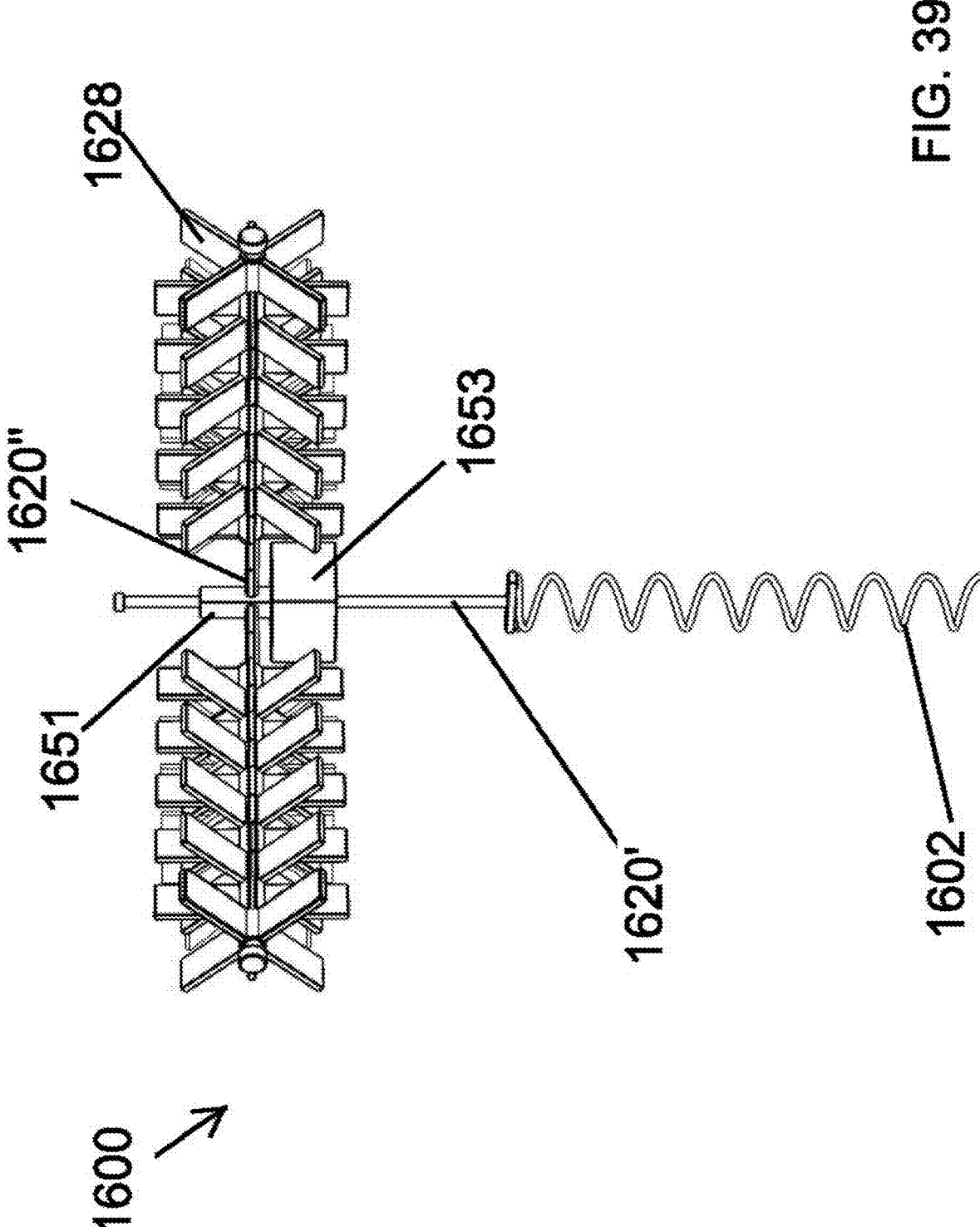
FIG. 39 is a side view of an embodiment of the disclosure.

Elements shown in FIGS. 38 and 39 are comparable to those of FIGS. 1, 5, 9, 10, 14, 17, 18, 20, 23, 28, 29, 30, 31-33, 34-35, and 36-37 with the first digits in this embodiment being 16 rather than 1 in the device 100 embodiment, 2 in the device 200 embodiment, 3 in the device 300 embodiment, 4 in the device 400 embodiment, 5 in the device 500 embodiment, 6 in the device 600 embodiment, 7 in the device 700 embodiment, 8 in the device 800 embodiment, 9 in the device 900 embodiment, 10 in the device 1000 embodiment, 11 in the 1100 embodiment, 12 in the 1200 embodiment, 13 in the 1300 embodiment, 14 in the 1400 embodiment, or 15 in the 1500 embodiment. For example, the corkscrew 1602 of the device 1600 are comparable, in formation and composition, to the corkscrew 102 of the device 100 embodiment. Thus, all reference numbers with the last two numbers being the same between device 1500, device 1400, device 1300, device 1200, device 1100, device 1000, device 900, device 800, device 700, device 600, device 500, device 400, device 300, device 200 and the device 100 are comparable, or the same, in formation and composition.

A perspective view of the device 1600 is shown in FIG. 38. In this embodiment a horizontal shaft 1620' is attached to a vertical shaft 1620', through a shaft connector 1651. The shaft connector 1651 is configured to slide vertically up and down on vertical shaft 1620', depending on the buoyancy of the device 1600, and the height of water the device 1600 is placed in. In some embodiments, the device 1600 can be designed with a sufficient buoyancy so that the horizontal shafts 1620" remain at a varying water level, or within a few inches, or a few feet, of a varying water level.

In this embodiment the shaft connector 1651 is attached to four horizontal shafts 1620", however, in other embodiments, shaft connector 1651 can be attached to one, two, three, five of more horizontal shafts 1620". The horizontal shafts 1620" can act to reduce wave energy and/or current energy of the water the device 1600 is installed in.

Each horizontal shaft 1620" can include a protrusion 1628, which can be fixed to the horizontal shaft 1620", rotate just clockwise about the horizontal shaft 1620", rotate just counter-clockwise about the horizontal shaft 1620", or rotate both clockwise and counter-clockwise about horizontal shaft 1620". Each protrusion 1628 can be any suitable structure and size as any other protrusion noted herein, and include or not include through holes as any other protrusion noted herein.

Another embodiment of device 1600 is shown in the side view of FIG. 39. In this embodiment, a horizontal shaft float 1653 is included. This horizontal shaft float 1653 can be operably connected to one or more of the horizontal shafts 1620" and/or the shaft connector 1651. Horizontal shaft float 1653 can be any suitable structure, shape, size and material that is buoyant.

Two additional embodiments of protrusions are shown in FIGS. 40-43. The protrusions of FIGS. 40-43 are designed to be removable from a shaft and/or placed onto a shaft, to be replaced themselves or to replace originally installed protrusions if any protrusion becomes worn down, and/or breaks, and/or is not functioning as desired due to interaction with the environment.

Figure 40:
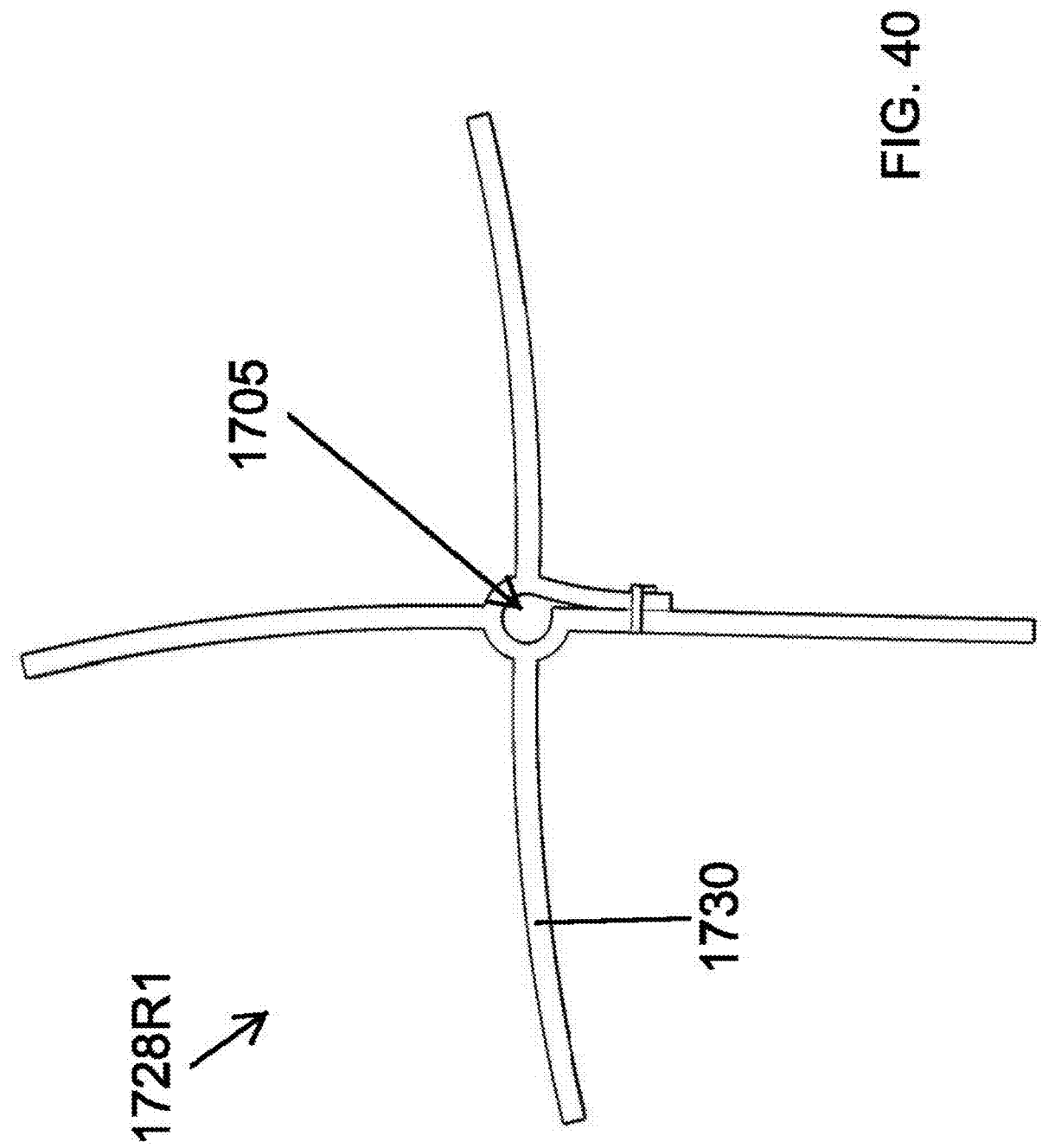
FIG. 40 is a top view of an embodiment of the disclosure.
Figure 41:
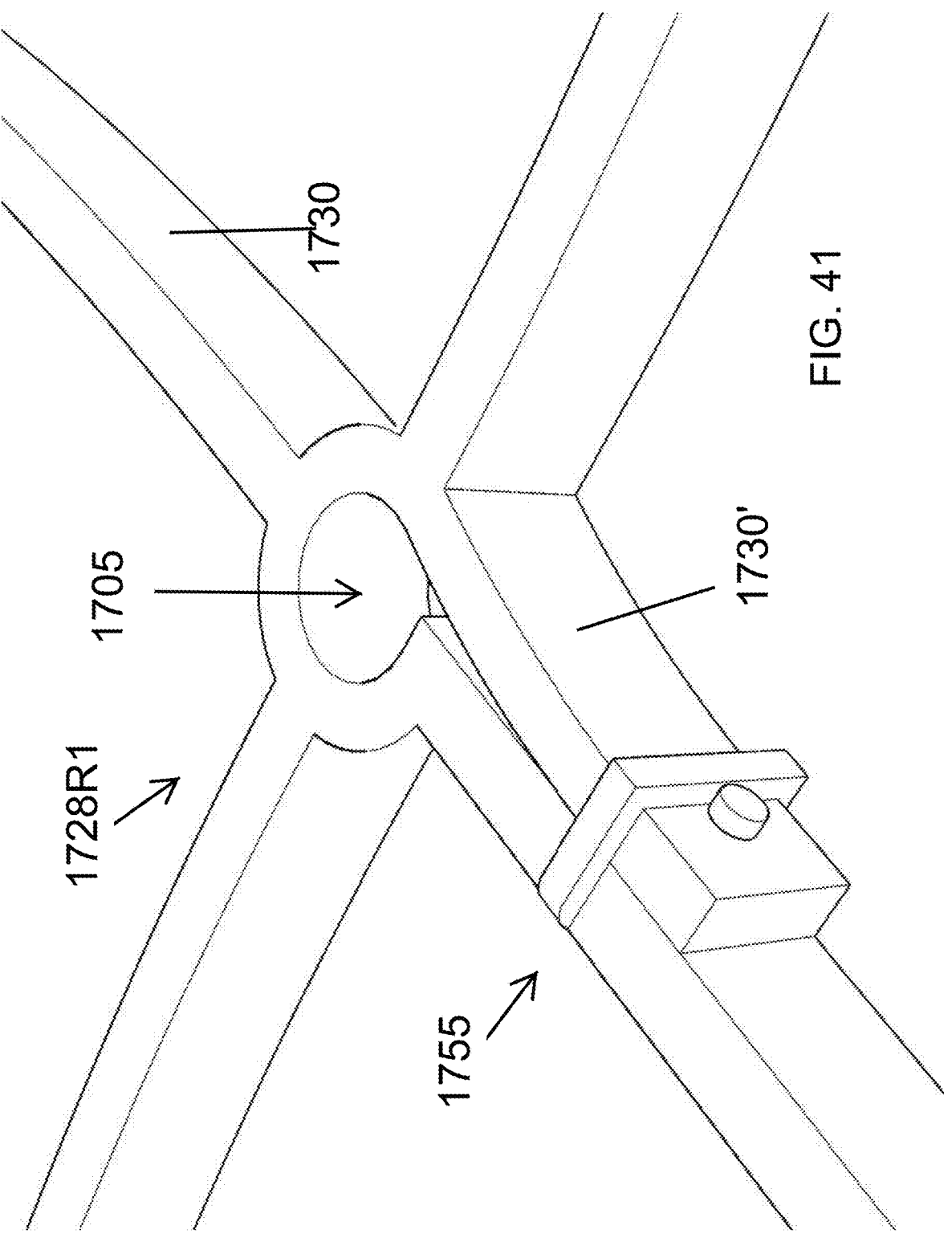
FIG. 41 is a magnified, perspective view of an embodiment of the disclosure.

One embodiment of a replacement protrusion 1728R1 is shown in FIGS. 40 and 41. In this embodiment four plates 1730 are shown, but in other embodiments, one, two, three, five or more plates 1730 can be included. The plates 1730 can be substantially flexible and form a shaft cavity 1705 of a sufficient diameter/circumference to extend around a shaft of any device of the disclosure.

As seen in FIG. 41, a plate extension 1730' extends a distance up an adjacent plate 1730, and is attached by a connecting mechanism 1755. The connecting mechanism 1755 is any structure capable of maintaining the position of plate extension 1730' relative to the adjacent plate 1730', such as a buckle mechanism, a fastener, a ratchet mechanism, a clip mechanism, a zipper mechanism, a zip tie mechanism, an adhesive, etc.

The replacement protrusion 1728R1 can be formed of any suitable material such as plastic, glass, ceramic, metal(s), carbon-based materials, elastomer, rubber, woven materials such as nylon and combinations thereof.

Figure 42:
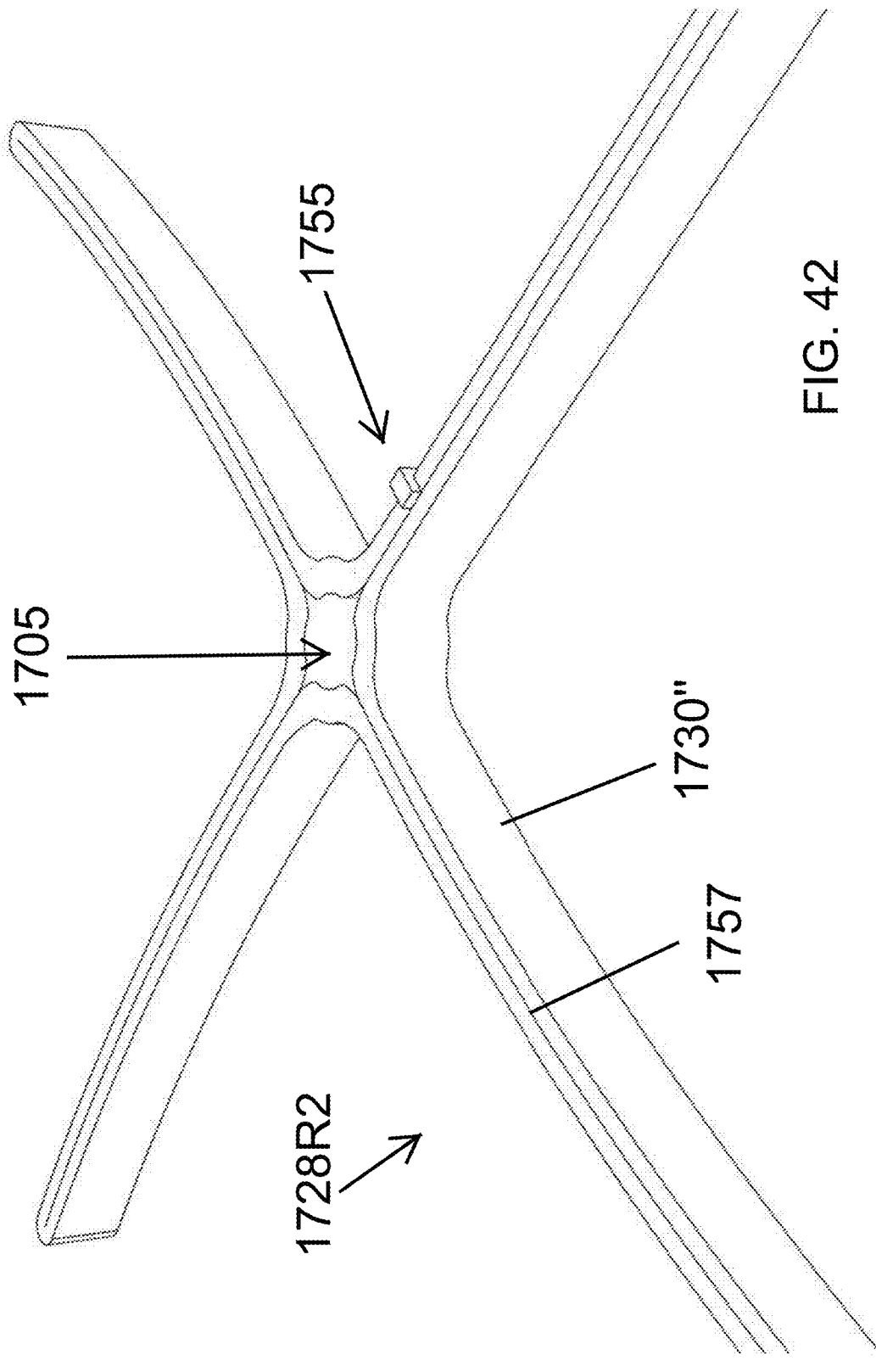
FIG. 42 is a perspective view of an embodiment of the disclosure.
Figure 43:
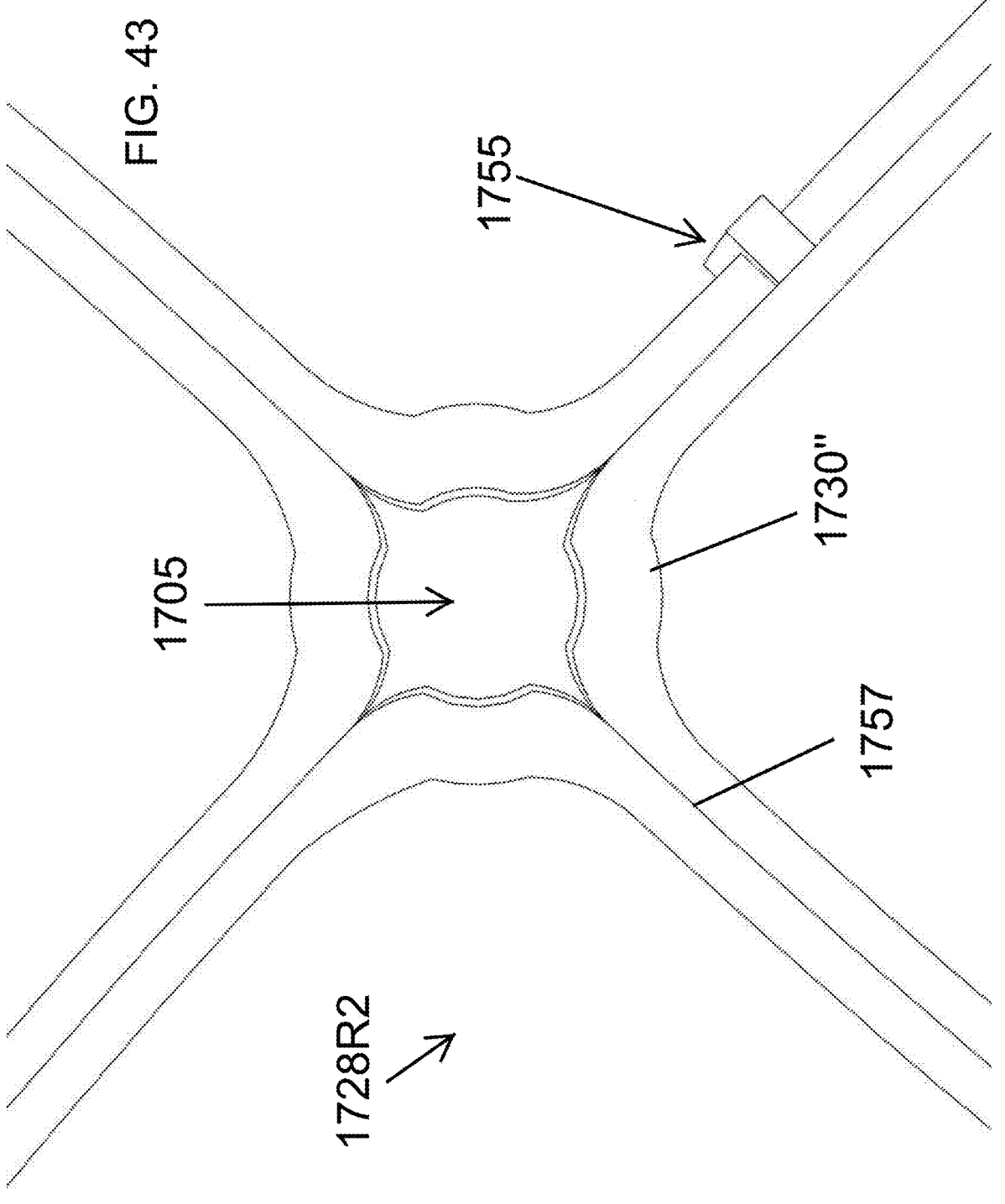
FIG. 43 is a magnified, top view of an embodiment of the disclosure.

A second embodiment of a replacement protrusion 1728R2 is shown in FIGS. 42 and 43. The protrusion 1728R2 of FIG. 42 is one length of a material, which can be folded to contact itself along 4 different plates 1730". The portions of the material that contact each other at plate seams 1757 can be attached to each other through any suitable way, such as by adhesive, sewing, stapling, etc.

The connecting mechanism 1755 is any structure capable of maintaining the position of two portions of the plate 1730" relative to the each other, such as a buckle mechanism, a fastener, a ratchet mechanism, a clip mechanism, a zipper mechanism, a zip tie mechanism, an adhesive, etc.

The replacement protrusion 1728R2 can be formed of any suitable material such as plastic, glass, ceramic, metal(s), carbon-based materials, elastomer, rubber, woven materials such as nylon and combinations thereof.

The plates 1730" can be substantially flexible and form a shaft cavity 1705 of a sufficient diameter/circumference to extend around a shaft of any device of the disclosure.

Figure 44:
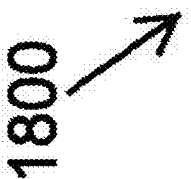
FIG. 44 is a side view of an embodiment of the disclosure.

The device 1800 is shown in FIG. 44. The device 1800 includes a substantially planar base/anchor 1856. In some embodiments, substantially planar base/anchor 1856 is a single, unitary structure. In this embodiment the substantially planar base/anchor 1856 is shown as having a substantially conical section that can penetrate at least a portion of a substrate, but in other embodiments substantially planar base/anchor 1856 can be any suitable shape. The substrate can be any seabed, riverbed, lake floor or ocean floor.

In this embodiment of device 1800, three protrusions 1828 are operably attached to three shafts 1820. In this embodiment three protrusions 1828 are shown, but in other embodiments, one, two, four or more protrusions 1828 can be included.

In this embodiment, three shafts 1820 are shown, but in other embodiments, one, two, four or more shafts 1820 can be included. The shaft 1820 can be substantially flexible and can be formed of any suitable flexible material, such as rope, cable, thread, wire, string, chain, twisted twine, twisted mason line, synthetic fibers, fishing line.

The device 1800 is configured to be placed on a lower surface of a body of water, with the substantially planar base/anchor 1856 being configured to penetrate a portion the lower surface and substantially maintain the location of the device on the lower surface. Each protrusion 1828 is sufficiently buoyant, so as to remain at least partially in the water column. Each protrusion 1828 can be any suitable material (such as foam, plastic, wood, rubber, glass, metal, combinations thereof, etc.) and construction (such as solid, hollow, partially solid, partially hollow) so that the protrusion 1828 is of sufficient buoyancy to maintain at least a portion of the shaft 1820 a distance away from the anchor 1856.

Figure 45:
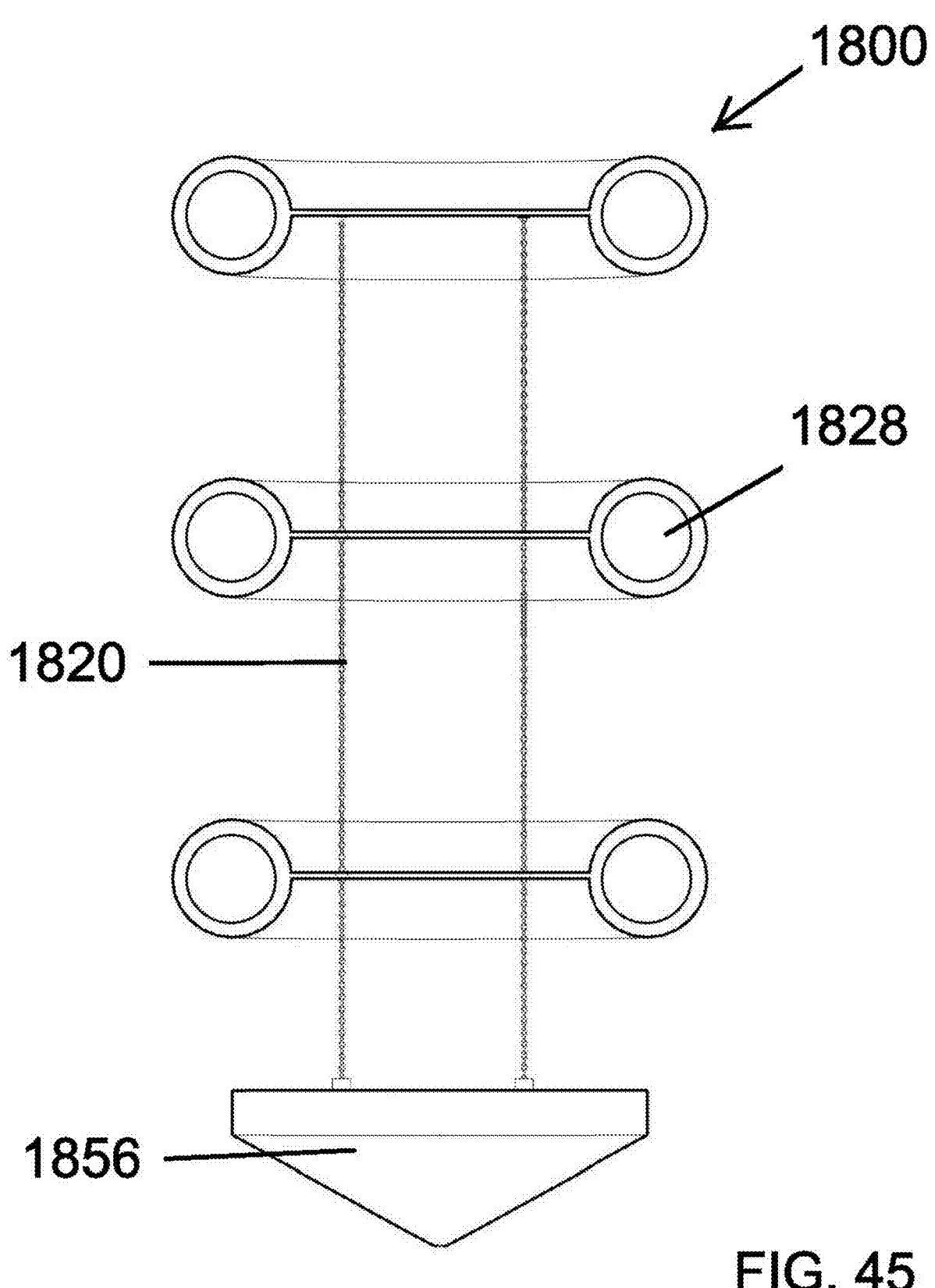
FIG. 45 is a cross-sectional side view of an embodiment of the disclosure.

A vertical cross-section of the device 1800 is shown in FIG. 45. As can be seen in this embodiment, each protrusion 1828 includes a hollow portion to create buoyancy.

Figure 46:
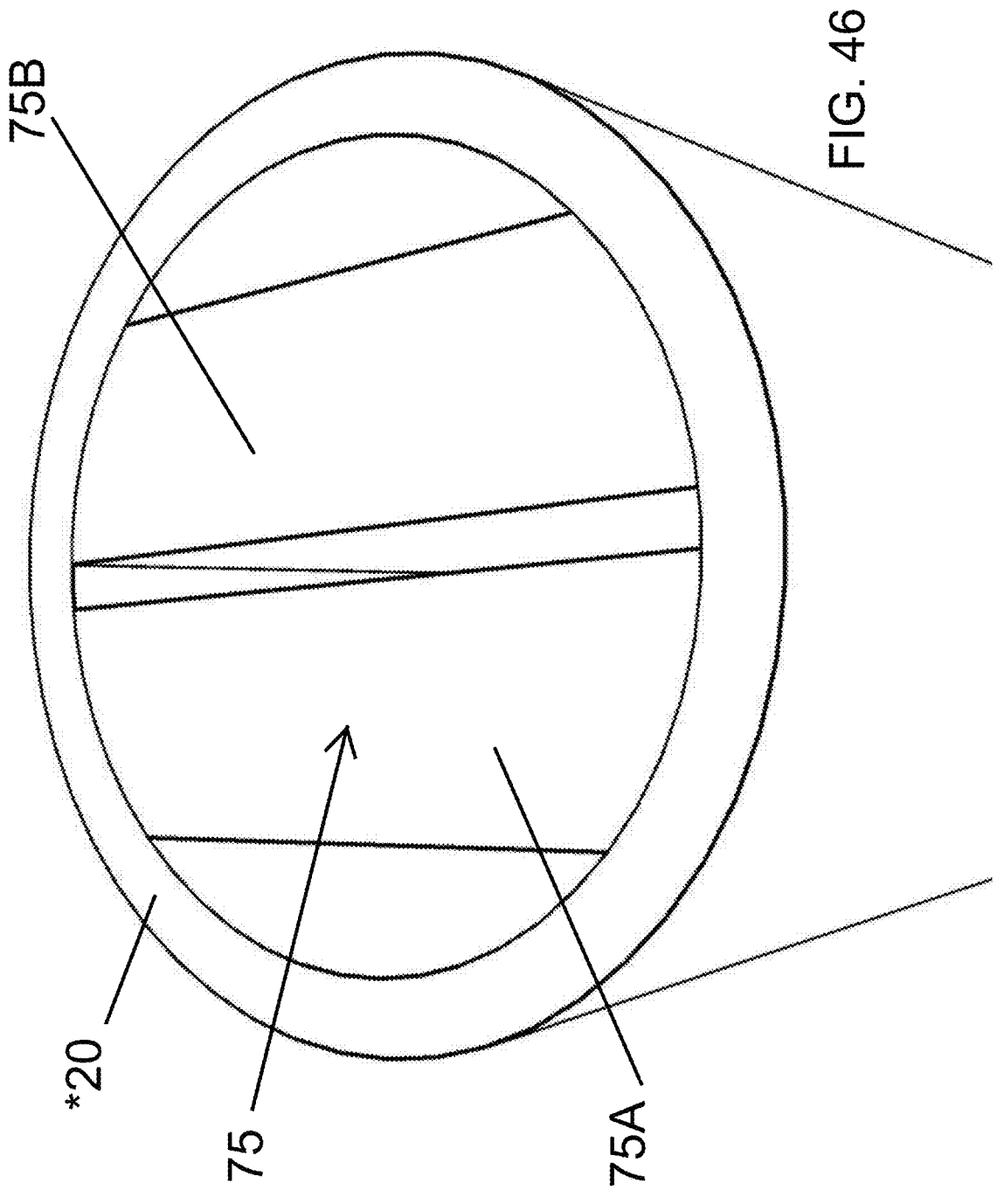
FIG. 46 is a magnified, perspective, horizontal cross-section of a shaft of an embodiment of the disclosure.

A shaft *20 is shown in FIG. 46. Shaft *20 can be any shaft, or a portion of any shaft, in this disclosure. In this embodiment, shaft *20 includes an electricity generation element 75. In this embodiment, the electricity generation element 75 can be a triboelectric nanogenerator (TENG) element. In this embodiment a charge-generating layer 75A and a charge-collecting layer 75B are illustrated, with other components such a charge-trapping layer and a charge storage layer being present but not being illustrated. However, in other embodiments, the electricity generation element 75 can be any structure capable of converting mechanical movement to electrical charge, such as a piezoelectric element.

In addition, the shaft *20 is included with can also include an electricity storage device, such as a battery. Alternatively, the shaft *20 can be electrically connected to wire and/or one or more other shafts *20, to transmit gathered electricity a distance away from each shaft *20.

While in use, the shaft *20 would be subject to many environmental forces, such as wave, tide, current and/or wind forces, for significant amounts of time. Thus, during use, the electricity generation element 75 of the shaft *20 can receive such physical forces and convert them to electrical charges.

Figure 47:
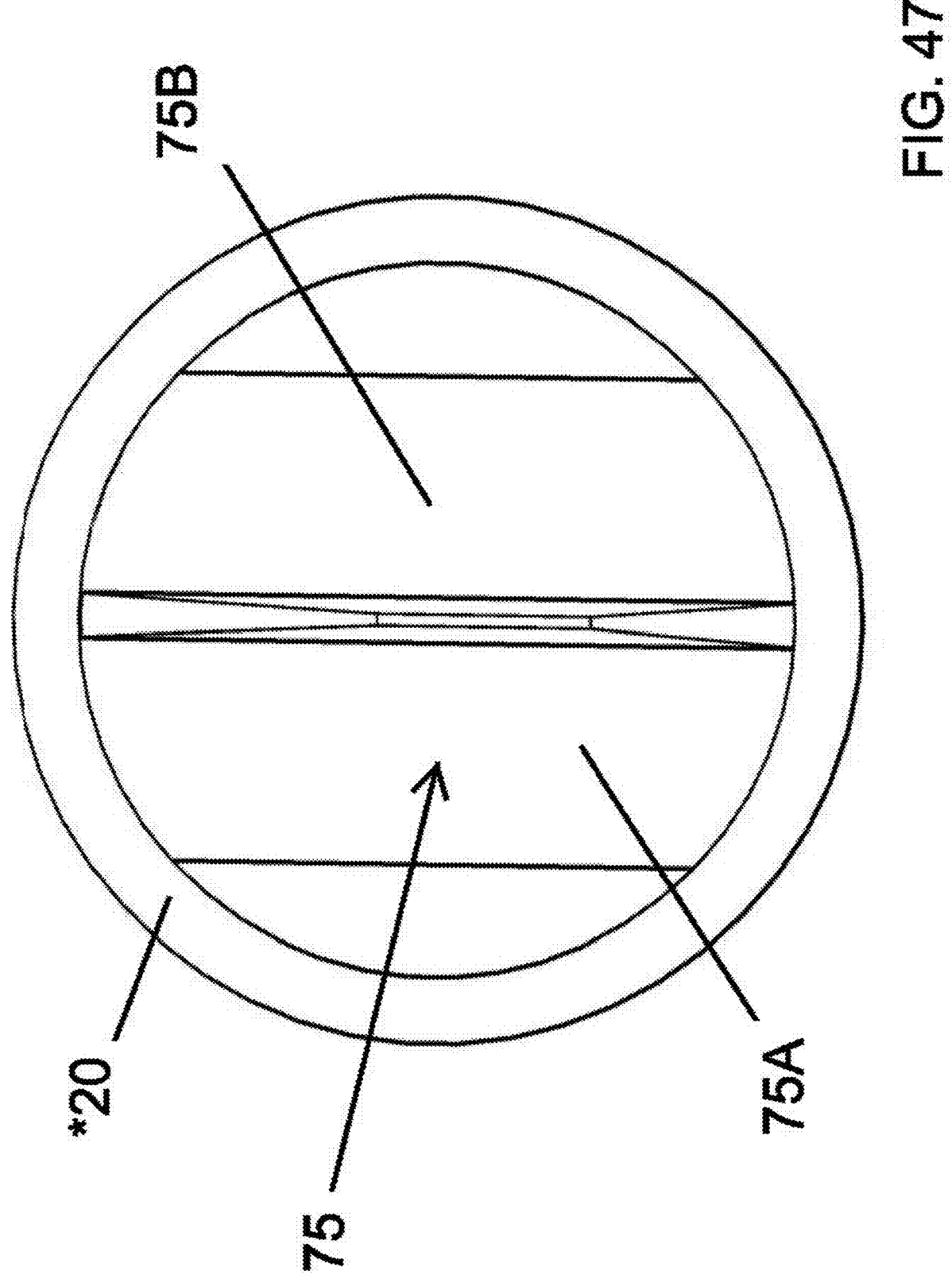
FIG. 47 is a magnified, top, horizontal cross-section of a shaft of an embodiment of the disclosure.

A top view of the shaft *20 is shown in FIG. 47.

Figure 48:
FIG. 48 is a magnified, top, horizontal cross-section of a shaft of an embodiment of the disclosure.

A shaft 20 is shown in FIG. 48. Shaft 20 can be any shaft, or a portion of any shaft, in this disclosure. In this embodiment, shaft 20 is substantially hollow, and is at least partially filled with strands 77, which can extend at least a portion of shaft 20. In this embodiment seven strands 77 are illustrated, but in other embodiments, one, two, three, four, five, six, eight or more strands 77 can be within shaft *20, with each strand 77 being the same cross sectional shape or a different shape, including any polygon, curved, or erratic shape.

Each strand 77 can be the same material as any other strand 77, or a different material, such as plastic, glass, ceramic, metal(s), carbon-based materials, elastomer, rubber, rope, cable, thread, wire, string, chain, twisted twine, twisted mason line, synthetic fibers, fishing line, sisal, coconut fiber and combinations thereof, and can be rigid, substantially rigid, flexible, or substantially flexible.

The strands 77 can be included in shaft **20 to modify the flexibility and/or the rigidity of the shaft *20 depending on environmental conditions and operational targets.

The disclosure is further described in the Example(s) below.

Example 1

For 18 days in March, controlled tests were conducted to determine and measure what impact the devices of the present disclosure have on sediment accretion in a natural system. To conduct this test one device, similar to the device of FIG. 1, was installed after four days of base data measurement. This device included a corkscrew and shaft, with 20 protrusions located along the shaft and with each protrusion including 6 plates. Each of the 6 plates were about 1 inch in height and about 6 inches in length, with each of the 6 plates including six through holes. Each of the protrusions extended around the shaft, with each of the protrusions being configured to rotate freely in both the clockwise direction and the counter-clockwise direction.

On day 1, a section of wetland that formed a portion of a flowing river, which periodically reversed its flow in accordance with the tides, was chosen. The chosen portion is a portion of a tidal river that is in communication with a portion of the Great South Bay of Long Island, New York. A substantially flat section of this wetland/river was specifically selected. Particularly, the site of implementation of the device in the wetland/river was exposed during low tide, and was submerged about 20 inches during high tide. The wetland/river was about 8 feet wide at the location of the installed device.

Figure 49:
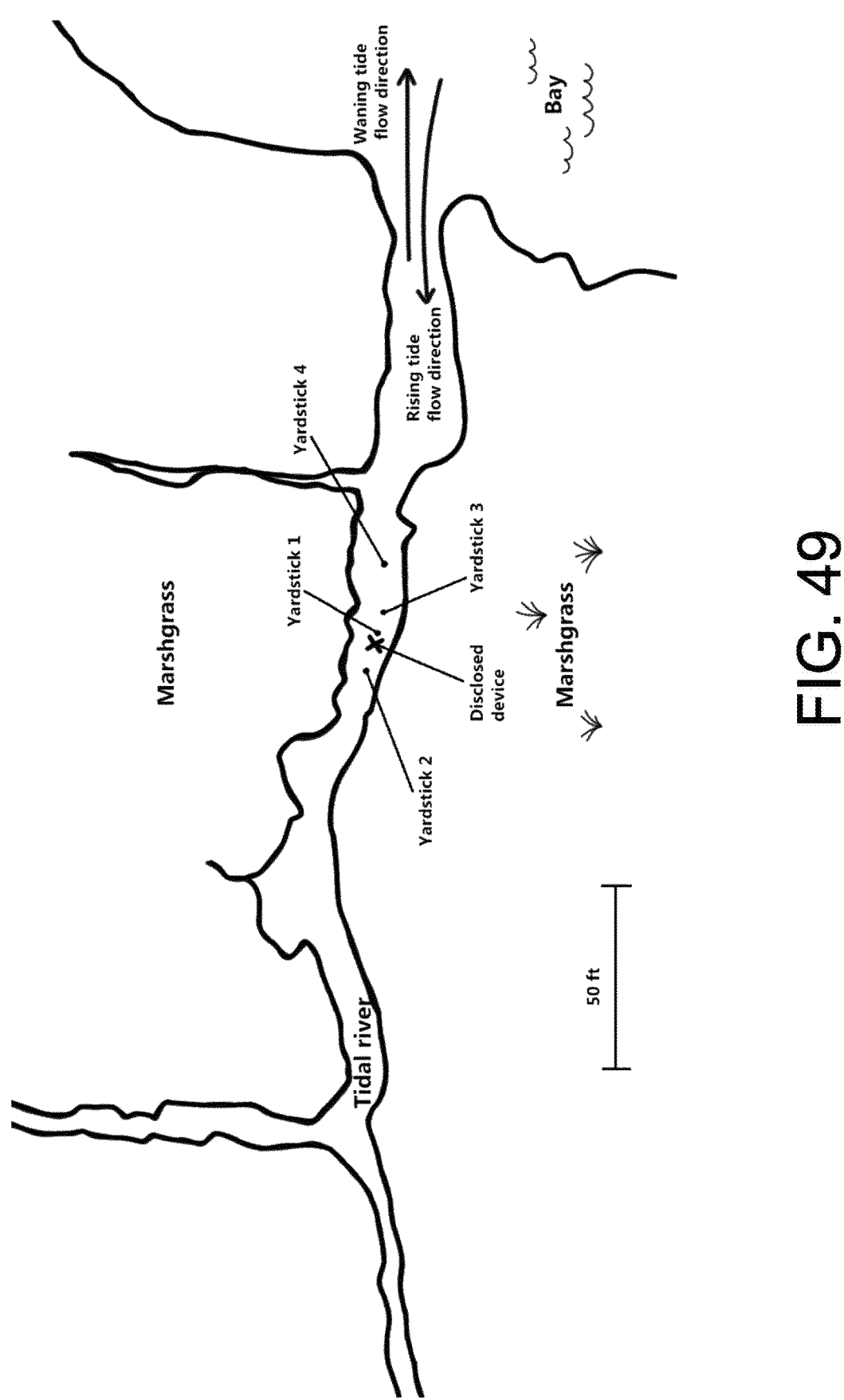
FIG. 49 is a geographic representation that illustrates the approximate geography and the approximate location of installed experimental elements.

On Day 1, four yard sticks (referred to as 1, 2, 3, and 4) were each pushed about 12 inches into the substrate of the wetland/river. Yardstick 1 was placed adjacent to the future site of the installed device, with yardsticks 2, 3, and 4 installed both upstream and downstream, in the locations shown in FIG. 49.

Sediment accretion data was then gathered for the next 4 days without the device of the present disclosure installed. After the 4 days, the disclosed device was installed in a location adjacent to yardstick 1. After installing the device, daily measurements were gathered for a total of 18 days, with each measurement being conducted at low tide conditions. These measurement data are shown in FIG. 50.

Figure 50:
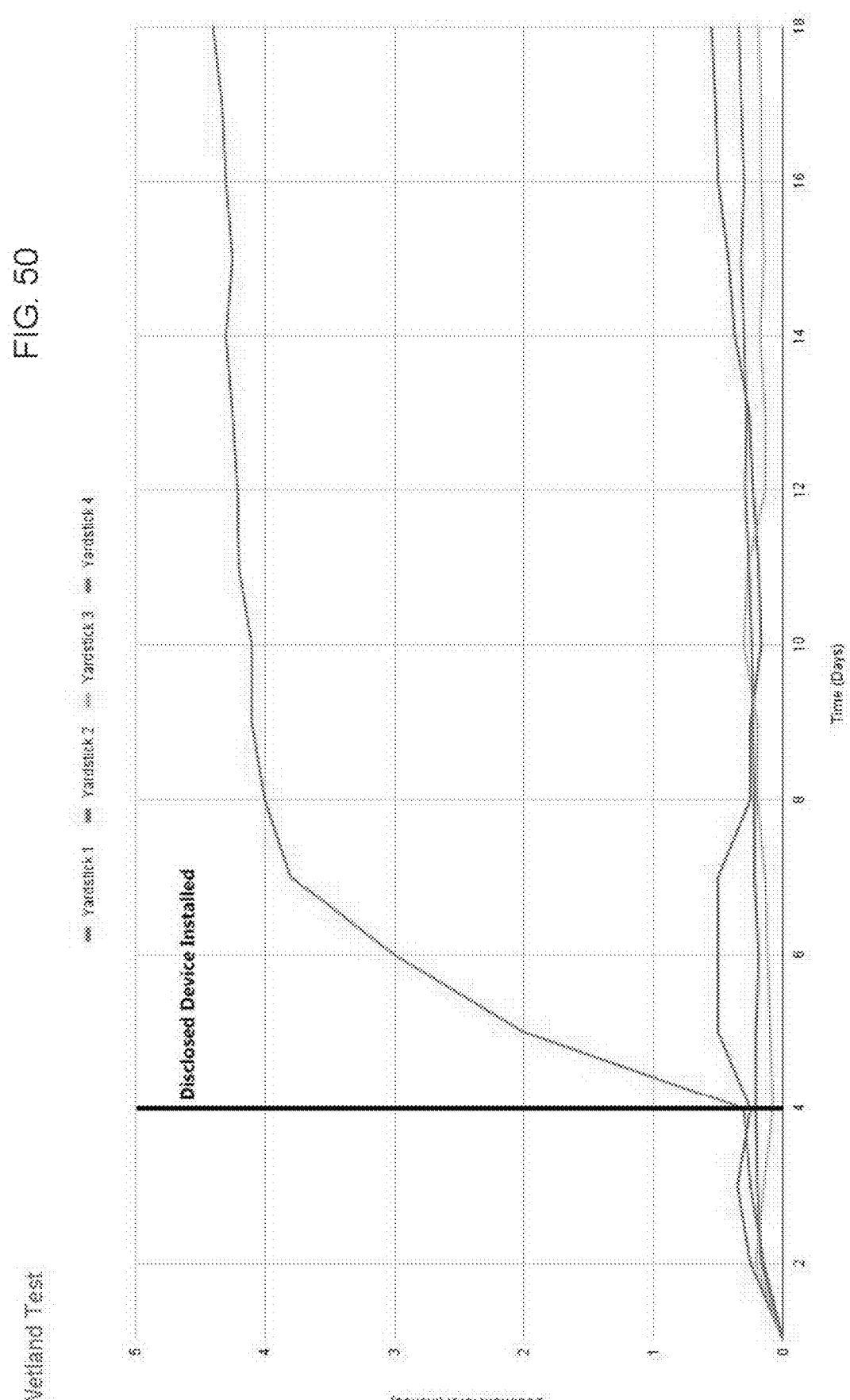
FIG. 50 is a graphical representation of sediment level over time.

As can be seen in FIG. 50, for the location adjacent the disclosed device (Yardstick 1), a significant increase in sediment depth was measured within a few days, and that increased level was substantially maintained, and slightly increased, for the duration of the disclosed device being installed.

The described embodiments and examples of the present disclosure are intended to be illustrative rather than restrictive and are not intended to represent every embodiment or example of the present disclosure. While the fundamental novel features of the disclosure as applied to various specific embodiments thereof have been shown, described, and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

The invention claimed is:

1. A device comprising:

a corkscrew, wherein the corkscrew comprises a securing flange at a first end of the corkscrew;

a protrusion comprising a sleeve and one or more protrusion cells, wherein in an installed configuration the securing flange contacts at least a portion of the sleeve, and wherein the one or more protrusion cells are within a perimeter of the protrusion, wherein the securing flange comprises a torquing mechanism, wherein the torquing mechanism is configured to transmit a torque from the first end of the corkscrew to a second end of the corkscrew.

2. The device of claim 1, wherein the protrusion further comprises an upper extension that extends a distance away from an upper edge of a protrusion cell.

3. The device of claim 1, wherein the protrusion further comprises a lower extension that extends a distance away from a lower edge of a protrusion cell.

4. The device of claim 1, wherein the protrusion further comprises an upper extension that extends a distance away from an upper edge of a protrusion cell and a lower extension that extends a distance away from a lower edge of a protrusion cell.

5. The device of claim 1, wherein each of the one or more protrusion cells comprises one or more walls.

6. The device of claim 5, wherein the one or more walls are configured to be removable.

7. The device of claim 1, wherein each of the one or more protrusion cells comprises a protrusion aperture, wherein the protrusion aperture is configured to surround plant material in an installed configuration.

8. A plurality of devices of claim 1, wherein an adjacent device is configured to contact another adjacent device along a contact area.

9. The plurality of devices of claim 8, wherein the contact area further comprises a connector between the adjacent devices.

10. The plurality of devices of claim 8, wherein a bounded opening is formed between adjacent devices.

11. A device comprising:

a corkscrew, wherein the corkscrew comprises a securing flange at a first end of the corkscrew;

a protrusion comprising a sleeve and one or more protrusion cells, wherein in an installed configuration the securing flange contacts at least a portion of the sleeve, and wherein the one or more protrusion cells are within a perimeter of the protrusion, wherein the protrusion further comprises an upper extension that extends a distance away from an upper edge of a protrusion cell.

12. The device of claim 11, wherein the protrusion further comprises a lower extension that extends a distance away from a lower edge of a protrusion cell.

13. The device of claim 11, wherein the protrusion further comprises an upper extension that extends a distance away from an upper edge of a protrusion cell and a lower extension that extends a distance away from a lower edge of a protrusion cell.

14. The device of claim 11, wherein each of the one or more protrusion cells comprises one or more walls that are configured to be removable.

15. A plurality of devices of claim 11, wherein an adjacent device is configured to contact another adjacent device along a contact area.

16. A plurality of devices, each device comprising:

a corkscrew, wherein the corkscrew comprises a securing flange at a first end of the corkscrew;

a protrusion comprising a sleeve and one or more protrusion cells, wherein in an installed configuration the securing flange contacts at least a portion of the sleeve, and wherein the one or more protrusion cells are within a perimeter of the protrusion, wherein an adjacent device is configured to contact another adjacent device along a contact area, and wherein a bounded opening is formed between adjacent devices.

17. The plurality of devices of claim 16, wherein each of the one or more protrusion cells comprises one or more walls that are configured to be removable.

18. The plurality of devices of claim 16, wherein the protrusion further comprises an upper extension that extends a distance away from an upper edge of a protrusion cell.

19. The plurality of devices of claim 16, wherein the protrusion further comprises a lower extension that extends a distance away from a lower edge of a protrusion cell.

* * * * *